United States Patent
Ji et al.

(10) Patent No.: US 12,452,016 B2
(45) Date of Patent: Oct. 21, 2025

(54) QCL INDICATION METHOD AND RELATED DEVICE

(71) Applicant: HUAWEI TECHNOLOGIES CO., LTD., Guangdong (CN)

(72) Inventors: Liuliu Ji, Shanghai (CN); Xiaoyan Bi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 274 days.

(21) Appl. No.: 18/161,776

(22) Filed: Jan. 30, 2023

(65) Prior Publication Data

US 2023/0308242 A1 Sep. 28, 2023

Related U.S. Application Data

(63) Continuation of application No. PCT/CN2021/109944, filed on Jul. 31, 2021.

(30) Foreign Application Priority Data

Jul. 31, 2020 (CN) .......................... 202010762047.7

(51) Int. Cl.
- H04L 5/00 (2006.01)
- H04B 7/01 (2006.01)
- H04B 7/024 (2017.01)
- H04L 25/02 (2006.01)

(52) U.S. Cl.
CPC ............. H04L 5/0051 (2013.01); H04B 7/01 (2013.01)

(58) Field of Classification Search
CPC ................................ H04L 5/0051; H04B 7/01

USPC ......................................................... 370/329
See application file for complete search history.

(56) References Cited

U.S. PATENT DOCUMENTS

| 2013/0279437 | A1 | 10/2013 | Ng et al. |
| 2018/0227929 | A1 | 8/2018 | Yoo et al. |
| 2023/0120801 | A1* | 4/2023 | Matsumura ........... H04W 72/23 370/329 |
| 2023/0134318 | A1* | 5/2023 | Kang ................. H04W 72/1263 370/329 |

(Continued)

FOREIGN PATENT DOCUMENTS

| CN | 109565432 A | 4/2019 |
| CN | 110291744 A | 9/2019 |

OTHER PUBLICATIONS

Huawei et al, "Reference Signal for Fine Time and Frequency Tracking", 3GPP TSG RAN WG1 Meeting AH NR#3 R1-1715475, Sep. 11, 2017, total 6 pages.

(Continued)

*Primary Examiner* — Xuan Lu

(57) ABSTRACT

This application provides a quasi co-location (QCL) indication method and a related device, and may be applied to coordinated multistation transmission. In the method, a terminal receives QCL indication information, where the QCL indication information indicates that time-frequency spread information of a demodulation reference signal (DMRS) is associated with time-frequency spread information of N tracking reference signals (TRSs) (or a TRS corresponding to the DMRS) and that delay-frequency offset information of the DMRS is associated with delay-frequency offset information of M TRSs.

17 Claims, 19 Drawing Sheets

(56) References Cited

U.S. PATENT DOCUMENTS

2023/0224866 A1* 7/2023 Hakola ................ H04W 72/02
370/329

OTHER PUBLICATIONS

Ericsson, "Multi-TRP and Multi-panel Transmission", 3GPP TSG-RAN WG1 NR Ad Hoc #3 R1-1716345, Sep. 12, 2017, total 7 pages.
3GPP TS 38.211 V16.2.0 :"3rd Generation Partnership Project; Technical Specification Group Radio Access Network; NR; Physical channels and modulation (Release 16)",Jun. 2020, total 131 pages.
3GPP TS 38.212 V15.9.0:"3rd Generation Partnership Project; Technical Specification Group Radio Access Network; NR;Multiplexing and channel coding(Release 15)",Jun. 2020, total 133 pages.
3GPP TS 38.213 V16.2.0:"3rd Generation Partnership Project; Technical Specification Group Radio Access Network; NR; Physical layer procedures for control (Release 16)",Jun. 2020, total 176 pages.
3GPP TSGRAN Physical layer procedures for data(Release 16) 3GPP TS 38.214 V16.2.0 Jun. 30, 2020(Jun. 30, 2020) section 6.2.1, total 163 pages.
Samsung: "Test case design for multi-TRP/Panel transmission (eMBB)", 3GPP Draft; R4-2004928, Apr. 14, 2020, XP051876239, total 6 pages.

\* cited by examiner

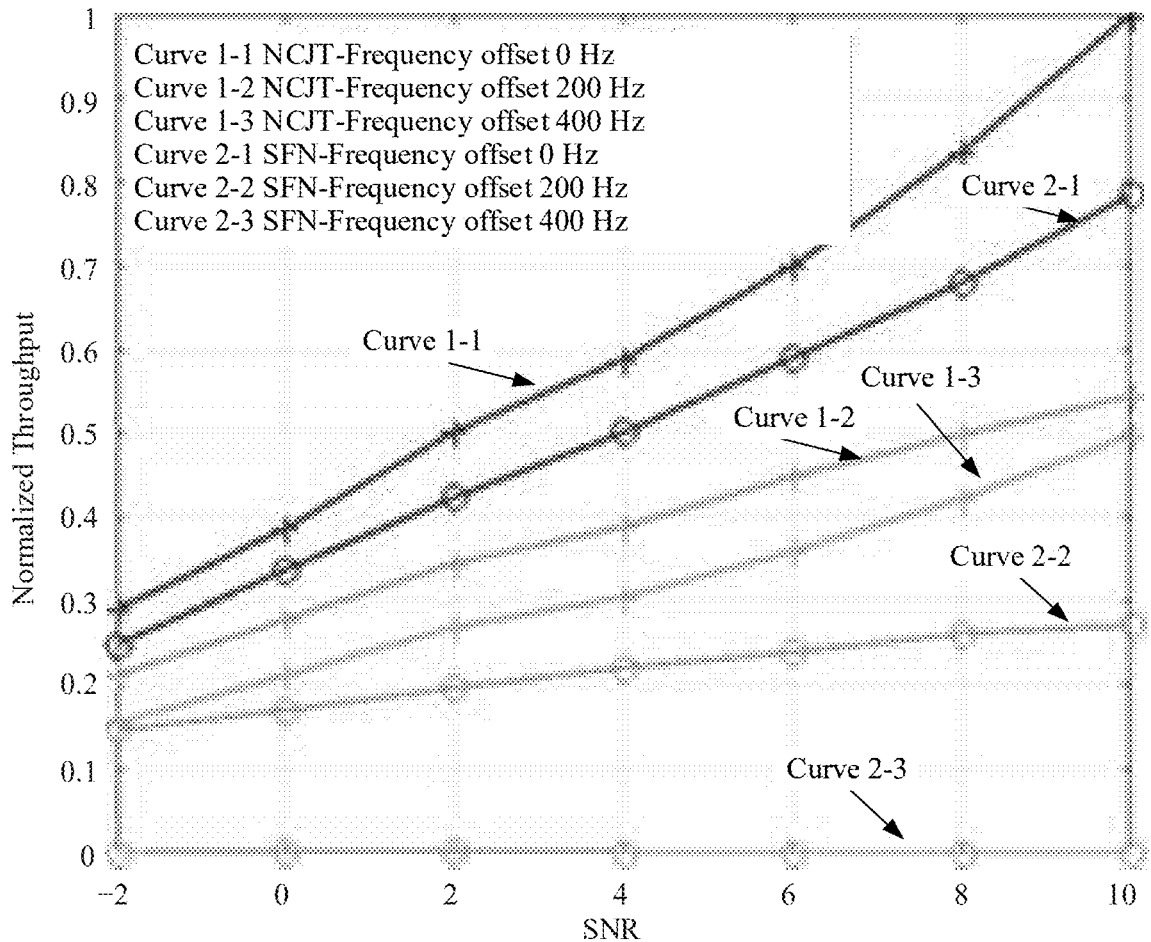

NCJT-Frequency offset: non-coherent joint transmission-frequency offset
SFN-Frequency offset: single frequency network-frequency offset
Delay spread: delay spread
Correct TCI: correct transmission configuration indication
Wrong TCI: wrong transmission configuration indication
SNR: signal to interference plus noise ratio
Normalized throughput: normalized throughput

FIG. 24

QCL INDICATION METHOD AND RELATED DEVICE

CROSS-REFERENCE TO RELATED APPLICATIONS

This application is a continuation of International Application No. PCT/CN2021/109944 filed on Jul. 31, 2021, which claims priority to Chinese Patent Application No. 202010762047.7 filed on Jul. 31, 2020. The disclosures of the aforementioned applications are hereby incorporated by reference in their entireties.

TECHNICAL FIELD

This disclosure relates to the field of communication technologies, and in particular, to a quasi co-location (QCL) indication method and a related device.

BACKGROUND

In a current communication system, to improve spectrum utilization, a plurality of cells in a network may be deployed in a same frequency band, that is, intra-frequency deployment. However, when receiving a signal of a local cell, a terminal may be interfered with by a neighboring cell signal outside the local cell, resulting in a poor channel condition and low transmission performance. To resolve a problem of interference between cells in an intra-frequency deployment scenario, a coordinated multipoint transmission/reception (COMP) technology may be widely applied.

The coordinated multipoint transmission/reception technology means that a plurality of transmission and reception points (TRPs) may coordinate to provide a downlink service for the terminal, or coordinate to receive an uplink signal of the terminal, to effectively reduce interference of a plurality of neighboring cell signals to the terminal or the TRPs, and improve system performance. However, in an actual application scenario, because the TRPs may be deployed at different geographical locations, and channels from the TRPs to the terminal are different, signals from different TRPs to the terminal experience different channel features. For example, delays and Dopplers in large-scale channel features are different. As a result, inter-carrier interference, inter-symbol interference, and the like are generated, and transmission performance of coordinated transmission is affected.

Therefore, in a coordinated multipoint transmission/reception scenario, how to improve multistation transmission performance is a problem that urgently needs to be resolved currently.

SUMMARY

This disclosure provides a quasi co-location (QCL) indication method and a related device to help improve multistation transmission performance.

According to a first aspect, this disclosure provides a quasi co-location (QCL) indication method. The method includes: A terminal receives quasi co-location (QCL) indication information, where the QCL indication information indicates that a delay spread of a demodulation reference signal DMRS is associated with delay spreads of N tracking reference signals TRSs and that a Doppler shift of the DMRS is associated with Doppler shifts of M TRSs, N is greater than or equal to 2, and M is greater than or equal to 1.

In coordinated multistation transmission, DMRS ports corresponding to the N TRSs are the same. The method helps track delay spreads of channels between N network devices and the terminal by using the N TRSs, and the delay spread of the DMRS is obtained by combining the N delay spreads. This is more compliant with a multipath delay feature of separately sending a same DMRS by the N network devices, and helps improve DMRS channel estimation accuracy.

In addition, the method helps some of the N network devices send DMRSs and physical downlink shared channels PDSCHs through frequency offset compensation, so that Doppler shifts of channels through which DMRSs and PDSCHs from different network devices arrive at the terminal are the same, and the terminal can obtain, by using the Doppler shifts of the M TRSs, a corresponding reference frequency offset to receive the DMRSs and the PDSCHs. This helps avoid performance deterioration caused by receiving the DMRSs by using a wrong reference frequency offset. Therefore, the method helps improve multistation transmission performance.

In an implementation, the method further includes: The terminal determines the delay spread of the DMRS based on the delay spreads of the N TRSs, and determines the Doppler shift of the DMRS based on the Doppler shifts of the M TRSs. It can be learned that the delay spreads between the N network devices and the terminal are considered for the delay spread that is of the DMRS and that is determined in this implementation, and the Doppler shift of the DMRS may be accurately learned of, so that multistation transmission performance is improved.

In this aspect, the QCL indication information may use N TRSs of QCL type E and M TRSs of QCL type C to indicate the foregoing association relationship. To be specific, the delay spread of the DMRS is associated with the delay spreads of the N TRSs, and the Doppler shift of the DMRS is associated with the Doppler shifts of the M TRSs. A large-scale channel parameter of QCL type E includes a delay spread, and a large-scale channel parameter of QCL type C includes a Doppler shift.

The QCL indication information indicates N transmission configuration indication TCI states, QCL information indicated by each TCI state includes one TRS, and the TRS is associated with QCL type E. In addition, the M TRSs of QCL type C are indicated by M TCI states, or may be indicated by M additional TCI states. This implementation may be described in two cases, that is, Implementation 1.1 and Implementation 1.2.

Implementation 1.1: The QCL indication information indicates the N TCI states, the QCL information indicated by each TCI state includes one TRS, and the TRS is associated with QCL type E. In addition, in M of the N TCI states, QCL information indicated by each TCI state further includes one TRS, and the TRS is associated with QCL type C.

The TRS of QCL type E and the TRS of QCL type C may be a same TRS, or may be different TRSs.

It can be learned that in this implementation, some TCI states can indicate TRSs of two types of QCL relationships, to avoid using an additional TCI state to indicate the TRS of the QCL type C relationship, and help reduce signaling overheads required by the QCL indication information.

Implementation 1.2: The QCL indication information indicates the N TCI states, and further includes the M additional TCI states. The QCL information indicated by each of the N TCI states includes one TRS, and the TRS is associated with QCL type E; and QCL information indicated by each of the M TCI states includes one TRS, and the TRS is associated with QCL type C.

The TRS of QCL type E and the TRS of QCL type C may be a same TRS, or may be different TRSs.

It can be learned that in this implementation, an additional TCI state may indicate the TRS of the QCL type C relationship, to help improve indication flexibility of a reference frequency offset.

Optionally, the N TRSs of QCL type E and the M TRSs of QCL type C may be indicated by using a plurality of TCI fields, or may be indicated by using one TCI field. Alternatively, the N TRSs of QCL type E and the M TRSs of QCL type C may be indicated by using one TCI state.

A case in which the N TRSs of QCL type E and the M TRSs of QCL type C are indicated by using the plurality of TCI fields may be as follows: Some TCI fields indicate TCI states corresponding to the TRSs of QCL type E, and some TCI fields indicate TCI states corresponding to the TRSs of QCL type C.

Optionally, in this aspect, in addition to indicating the foregoing two association relationships, the QCL indication information may further indicate that a spatial parameter of a TRS is associated with a spatial parameter of a DMRS. An indication manner of the QCL indication information may include: QCL information indicated by some of the N TCI states further includes a TRS of QCL type D; or the QCL indication information further includes another TCI state, and indicated QCL information further includes a TRS associated with QCL type D. A large-scale channel parameter of QCL type D includes a spatial receive parameter. The method may be used in a high-frequency transmission scenario, and can improve multistation transmission performance.

According to a second aspect, this disclosure provides a quasi co-location (QCL) indication method. The method includes: A terminal receives quasi co-location (QCL) indication information, where the QCL indication information indicates that a delay spread of each of N demodulation reference signals DMRSs is associated with a delay spread of a corresponding TRS and that a Doppler shift of the DMRS is associated with Doppler shifts of M TRSs, N is greater than or equal to 2, and M is greater than or equal to 1.

A difference between the method and the first aspect lies in that in the method, TRSs separately sent by N network devices correspond to different DMRS ports. In this way, after the terminal obtains the QCL indication information, the terminal may determine a delay spread of a corresponding DMRS based on a delay spread of each TRS. That is, DMRS channel estimation is performed by using the delay spread of the corresponding TRS. However, the Doppler shift of the DMRS is still also obtained based on the Doppler shifts of the M TRSs. In other words, in the method, the delay spread of the DMRS may be different, but the Doppler shift of the DMRS is the same. In this way, when the TRSs correspond to the different DMRS ports, channel estimation is more accurate by using the delay spread of the corresponding TRS. The method helps some of the N network devices send DMRSs and physical downlink shared channels PDSCHs through frequency offset compensation, so that Doppler shifts of channels through which DMRSs and PDSCHs from different network devices arrive at the terminal are the same, and the terminal can obtain, by using the Doppler shifts of the M TRSs, a corresponding reference frequency offset to receive the DMRSs and the PDSCHs. This avoids performance deterioration caused by receiving the DMRSs by using a wrong reference frequency offset. Therefore, the method helps improve multistation transmission performance.

In an implementation, the method further includes: The terminal determines the delay spread of the corresponding DMRS based on the delay spread of the TRS, and determines the Doppler shift of the DMRS based on the Doppler shifts of the M TRSs. It can be learned that a delay spread between a corresponding network device and the terminal is separately considered for the delay spread that is of the DMRS and that is determined in this implementation, and the Doppler shift of the DMRS may be correspondingly determined, so that multistation transmission performance is improved.

In this aspect, the QCL indication information may use N TRSs of a QCL type E relationship and M TRSs of a QCL type C relationship to indicate the foregoing association relationship. To be specific, the delay spread of the DMRS is associated with the delay spread of the corresponding TRS, and the Doppler shift of the DMRS is associated with the Doppler shifts of the M TRSs. A large-scale channel parameter of QCL type E includes a delay spread, and a large-scale channel parameter of QCL type C includes a Doppler shift. In this aspect, different TRSs correspond to different DMRS ports, namely, different DMRSs. However, a manner in which the QCL indication information indicates the TRS is the same as that in the first aspect. For details, refer to the implementation of the first aspect. Details are not described herein again.

According to a third aspect, this disclosure provides a quasi co-location (QCL) indication method. The method includes: A terminal receives quasi co-location (QCL) indication information, where the QCL indication information indicates that a Doppler spread of a demodulation reference signal DMRS is associated with Doppler spreads of N tracking reference signals TRSs and that an average delay of the DMRS is associated with average delays of M TRSs, N is greater than or equal to 2, and M is greater than or equal to 1.

The QCL indication method is applicable to a case in which the N TRSs correspond to a same DMRS port, namely, a same DMRS, in coordinated multistation transmission. In this case, after obtaining the QCL indication information, the terminal may track Doppler spreads between N network devices and the terminal by using the N TRSs, and obtain the Doppler spread of the DMRS by combining the N Doppler spreads. This is more compliant with a multipath Doppler feature of separately sending a same DMRS by the N network devices, and helps improve DMRS channel estimation accuracy.

In addition, the method helps some of the N network devices send DMRSs and physical downlink shared channels PDSCHs through delay compensation, so that delays of DMRSs and PDSCHs from different network devices to the terminal are the same, and the terminal can obtain a corresponding reference delay by using the average delays of the M TRSs to receive the DMRSs and the PDSCHs. This helps avoid performance deterioration caused by receiving the DMRSs by using a wrong reference delay. Therefore, the method helps improve multistation transmission performance.

In an implementation, the method further includes: The terminal determines the Doppler spread of the DMRS based on the Doppler spreads of the N TRSs, and determines the average delay of the DMRS based on the average delays of the M TRSs. It can be learned that this implementation improves multistation transmission performance.

In addition, in the QCL indication method in this aspect, after obtaining the QCL indication information, the terminal combines the Doppler spreads of the N TRSs to obtain the Doppler spread of the DMRS, and determines the average delay of the DMRS by using the average delays of the M TRSs. Therefore, a difference between an indication manner of the QCL indication information in this aspect and the implementation of the first aspect lies in that a large-scale channel parameter of QCL type E includes a Doppler spread and that a large-scale channel parameter of QCL type C includes an average delay. Therefore, the indication manner of the QCL indication information in this aspect is not described in detail again.

According to a fourth aspect, this disclosure provides a quasi co-location (QCL) indication method. The method includes: A terminal receives quasi co-location (QCL) indication information, where the QCL indication information indicates that a Doppler spread of each of N demodulation reference signals DMRSs is associated with a Doppler spread of a corresponding tracking reference signal TRS in N TRSs and that an average delay of the DMRS is associated with average delays of M of the N TRSs, N is greater than or equal to 2, and M is greater than or equal to 1.

It can be learned that a difference between the method and the third aspect lies in that in the method, after the terminal obtains the QCL indication information, the Doppler spread of the DMRS is determined by using the Doppler spread of the corresponding TRS. That is, DMRS channel estimation is performed by using the Doppler spread of the corresponding TRS. However, the average delay of the DMRS is still also obtained based on the average delays of the M TRSs. In other words, in the method, the Doppler spread of the DMRS may be different, but the average delay of the DMRS is the same. In this way, when the TRSs correspond to different DMRS ports, channel estimation is more accurate by using the Doppler spread of the corresponding TRS.

According to the method, DMRSs and PDSCHs can be further received based on a uniform average delay, to avoid a problem of transmission performance deterioration caused by using a wrong reference delay by the terminal when a network device performs delay compensation to send the DMRSs and the PDSCHs. Therefore, the method helps improve multistation transmission performance.

In addition, in the QCL indication method in this aspect, after receiving the QCL indication information, the terminal separately determines Doppler spreads of corresponding DMRSs by using Doppler spreads of the N TRSs, and determines average delays of all DMRSs by using the average delays of the M TRSs. Therefore, a difference between an indication manner of the QCL indication information in this aspect and the indication manner of the QCL indication information in the second aspect lies in that a large-scale channel parameter of QCL type E includes a Doppler spread and that a large-scale channel parameter of QCL type C includes an average delay.

In an implementation, the method further includes: The terminal determines the Doppler spread of the corresponding DMRS based on the Doppler spread of the TRS, and determines the average delay of the DMRS based on the average delays of the M TRSs. It can be learned that the method can ensure channel transmission performance in coordinated multistation transmission.

According to a fifth aspect, this disclosure further provides a quasi co-location (QCL) indication method. The method includes: A terminal receives quasi co-location (QCL) indication information, where the QCL indication information indicates that a delay spread of a demodulation reference signal DMRS is associated with delay spreads of N tracking reference signals TRSs, that a Doppler spread of the DMRS is associated with Doppler spreads of the N TRSs, that an average delay of the DMRS is associated with average delays of M TRSs, and that a Doppler shift of the DMRS is associated with Doppler shifts of the M TRSs, N is greater than or equal to 2, and M is greater than or equal to 1.

In coordinated multistation transmission, TRSs separately sent by N network devices correspond to a same DMRS port. After obtaining the QCL indication information, the terminal may track Doppler spreads and delay spreads between the N network devices and the terminal by using the N TRSs, and obtain the Doppler spread and the delay spread of the DMRS by combining the N Doppler spreads and delay spreads. This is more compliant with a multipath feature of separately sending a same DMRS by the N network devices, and helps improve DMRS channel estimation accuracy.

In addition, the method helps a network device send a DMRS and a physical downlink shared channel PDSCH through delay-frequency offset compensation, so that delays and frequency offsets of DMRSs and PDSCHs from different network devices to the terminal are the same. In addition, the terminal may determine, by using the average delays and the Doppler shifts of the M TRSs, a corresponding reference delay and reference frequency offset to receive the DMRSs and the PDSCHs. This avoids performance deterioration caused by using a wrong reference delay and reference frequency offset by the terminal. Therefore, the method helps improve multistation transmission performance.

In an implementation, the terminal determines the delay spread and the Doppler spread of the DMRS based on the delay spreads and the Doppler spreads of the N TRSs, and determines the average delay and the Doppler shift of the DMRS based on the average delays and the Doppler shifts of the M TRSs. In this way, multistation transmission performance is improved.

Optionally, an indication manner of the QCL indication information may include but is not limited to the following Implementation 2.1 to Implementation 2.3 based on different types of QCL relationship associated with the TRS.

Implementation 2.1: The QCL indication information may use M TRSs of QCL type A and L TRSs of QCL type E to indicate the foregoing association relationship. L is greater than or equal to 1, and a sum of L and M is equal to N. A large-scale channel parameter of QCL type E includes a delay spread and a Doppler spread, and a large-scale channel parameter of QCL type A includes an average delay, a Doppler shift, a delay spread, and a Doppler spread.

In this implementation, the QCL indication information indicates N TCI states, where QCL information indicated by each of M TCI states includes one TRS, and the TRS is associated with QCL type A; QCL information indicated by each of L remaining TCI states includes one TRS, and the TRS is associated with QCL type E; and the average delay and the Doppler shift in QCL type A are applicable to a TCI state corresponding to a TRS of QCL type E.

It can be learned that this implementation helps determine the delay spread and the Doppler spread of the DMRS by using delay spreads and Doppler spreads of TRSs indicated by the N TCI states, and helps consider the multipath feature from the N network devices to the terminal when the TRSs sent by the N network devices correspond to the same DMRS port, to improve DMRS channel estimation accuracy. In addition, this helps the network device perform delay-frequency offset compensation before sending the DMRS and the PDSCH. The terminal may use Doppler shifts of TRSs indicated by the M TCI states as a reference frequency offset, and use average delays of the TRSs indicated by the M TCI states as a reference delay. This prevents the terminal from receiving the DMRS and the PDSCH by using a wrong reference frequency offset and reference delay, thereby improving multistation transmission performance.

Implementation 2.2: The QCL indication information may use N TRSs of a QCL type A relationship to indicate the foregoing association relationship.

The QCL indication information indicates N TCI states, QCL information indicated by each TCI state includes one TRS, and the TRS is associated with QCL type A. Doppler shifts and average delays of TRSs respectively indicated by L of the N TCI states are not used, and Doppler shifts and average delays of TRSs respectively indicated by M of the N TCI states are applicable to the L remaining TCI states. L is greater than or equal to 1, and a sum of L and M is equal to N.

Optionally, the terminal may learn, through signaling notification or in a predefined manner, that the Doppler shifts and the average delays of the TRSs respectively indicated by the L TCI states are not used or are not applicable and that the Doppler shifts and the average delays of the TRSs respectively indicated by the M TCI states are applicable to the L remaining TCI states.

Optionally, the terminal may learn, by using the following Implementation 2.2.1 to Implementation 2.2.2, that the Doppler shifts and the average delays of the TRSs respectively indicated by the M TCI states are applicable to the L remaining TCI states.

Implementation 2.2.1: QCL information indicated by each of M of the N TCI states includes one TRS, the TRS is associated with QCL type C, and a priority of the QCL type C is higher than a priority of QCL type A (or a definition is that a TRS of QCL type C may cover a TRS of QCL type A). A large-scale channel parameter of QCL type C includes a Doppler shift and an average delay. Therefore, in this implementation, a Doppler shift and an average delay in QCL type A are not used or are not applicable, and the Doppler shift and the average delay of the TRS of QCL type C are used.

The TRS of QCL type C and the TRS of QCL type A may be a same TRS, or may be different TRSs.

It can be learned that in this implementation, some TCI states can indicate TRSs of two types of QCL relationships, to avoid using an additional TCI state to indicate the TRS of the QCL type C relationship, and help reduce signaling overheads required by the QCL indication information.

Implementation 2.2.2: In addition to indicating the N TCI states, the QCL indication information further indicates M additional TCI states. QCL information indicated by each of the M TCI states includes one TRS, the TRS is associated with QCL type C, and a priority of QCL type C is higher than a priority of QCL type A (or a definition is that a TRS of QCL type C may cover a TRS of QCL type A). The TRS of QCL type C and the TRS of QCL type A may be a same TRS, or may be different TRSs.

It can be learned that in this implementation, an additional TCI state may indicate the TRS of the QCL type C relationship, to help improve indication flexibility of a reference Doppler shift.

It can be learned that Implementation 2.2 helps determine the delay spread and the Doppler spread of the DMRS by using delay spreads and Doppler spreads of TRSs indicated by the N TCI states, and helps consider the multipath feature from the N network devices to the terminal when the TRSs sent by the N network devices correspond to the same DMRS port, to improve DMRS channel estimation accuracy. In addition, this helps the network device perform delay-frequency offset compensation before sending the DMRS and the PDSCH. In the method, the Doppler shifts of the TRSs indicated by the M TCI states are used as the reference frequency offset, and the average delays of the TRSs indicated by the M TCI states are used as the reference delay. This prevents the terminal from receiving the DMRS and the PDSCH by using the wrong reference frequency offset and reference delay, thereby improving multistation transmission performance.

Implementation 2.3: The QCL indication information indicates N TCI states, QCL information indicated by each TCI state includes one TRS, and the TRS is associated with QCL type E, where QCL information indicated by each of M TCI states further includes one TRS, and the TRS is associated with QCL type C. Alternatively, the QCL indication information further additionally indicates M TCI states, QCL information indicated by each TCI state includes one TRS, and the TRS is associated with QCL type C.

A large-scale channel parameter of QCL type E includes a delay spread and a Doppler spread, and a large-scale channel parameter of QCL type C includes a Doppler shift and an average delay.

In addition, a TRS of QCL type C and a TRS of QCL type E may be a same TRS, or may be different TRSs.

Some of the N TCI states can indicate TRSs of two types of QCL relationships, to avoid using an additional TCI state to indicate the TRS of the QCL type C relationship, and help reduce signaling overheads required by the QCL indication information. The additional TCI state indicates the TRS of the QCL type C relationship, to help improve indication flexibility of a reference Doppler shift and the reference delay.

Optionally, in the QCL indication information, TRSs of various types of QCL may be indicated by using a plurality of TCI fields, or may be indicated by using one TCI field. Alternatively, in the QCL indication information, the TRSs of the various types of QCL may be indicated by using one TCI state.

A case in which the plurality of TCI fields are for indication in the foregoing implementation may include: Some TCI fields indicate a TCI state corresponding to the TRS of QCL type A, and some TCI fields indicate the TCI state corresponding to the TRS of QCL type E. Alternatively, some TCI fields indicate the TCI state corresponding to the TRS of the QCL type E, and some TCI fields indicate a TCI state corresponding to the TRS of QCL type C. Alternatively, some TCI fields indicate a TCI state corresponding to the TRS of QCL type A, and some TCI fields indicate a TCI state corresponding to the TRS of QCL type C.

Optionally, in this aspect, in addition to indicating the association relationship between the large-scale channel parameters, the QCL indication information may further indicate that a spatial parameter of a TRS is associated with a spatial parameter of a DMRS. An indication manner of the QCL indication information may include: Some of the N TCI states further indicate a TRS associated with QCL type D relationship; or the QCL indication information further indicates another TCI state indicating a TRS associated with QCL type D. A large-scale channel parameter of QCL type D includes a spatial receive parameter. The method may be used in a high-frequency transmission scenario, and can improve multistation transmission performance.

According to a sixth aspect, this disclosure further provides a quasi co-location (QCL) indication method. The method includes: A terminal receives quasi co-location (QCL) indication information, where the QCL indication information indicates that a delay spread of each of N demodulation reference signals DMRSs is associated with a delay spread of a corresponding TRS, that a Doppler spread of the DMRS is associated with a Doppler spread of the corresponding TRS, that an average delay of the DMRS is associated with average delays of M TRSs, and that a Doppler shift of the DMRS is associated with Doppler shifts of the M TRSs, N is greater than or equal to 2, and M is greater than or equal to 1.

It can be learned that a difference between the method and the fifth aspect lies in that in the method, TRSs separately sent by N network devices correspond to different DMRS ports. In this way, after the terminal obtains the QCL indication information, the terminal may determine the Doppler spread and the delay spread of the corresponding DMRS based on the Doppler spread and the delay spread of the TRS. That is, DMRS channel estimation is performed by using the Doppler spread and the delay spread of the corresponding TRS. However, the Doppler shift and the average delay of the DMRS are still also obtained based on the Doppler shifts and the average delays of the M TRSs.

In other words, in the method, the Doppler spread and the delay spread of the DMRS may be different, but the Doppler shift and the average delay of the DMRS are the same. In this way, when the TRSs correspond to the different DMRS ports, channel estimation is more accurate by using the Doppler spread and the delay spread of the corresponding TRS. In addition, the method helps a network device send a DMRS and a physical downlink shared channel PDSCH through delay-frequency offset compensation, so that delays and frequency offsets of DMRSs and PDSCHs from different network devices to the terminal are the same. In addition, the terminal may determine, by using the average delays and the Doppler shifts of the M TRSs, a corresponding reference delay and reference frequency offset to receive the DMRSs and the PDSCHs. This avoids performance deterioration caused by using a wrong reference delay and reference frequency offset by the terminal. Therefore, the method helps improve multistation transmission performance.

In an implementation, the method further includes: The terminal determines the delay spread and the Doppler spread of the corresponding DMRS based on the delay spread and the Doppler spread of the TRS, and determines the average delay and the Doppler shift of the DMRS based on the average delays and the Doppler shifts of the M TRSs. It can be learned that a delay spread and a Doppler spread between a corresponding network device and the terminal are separately considered for the delay spread and the Doppler spread that are of the DMRS and that are determined in this implementation, and the average delay and the Doppler shift of the DMRS may be learned of, so that multistation transmission performance is improved.

In this aspect, the delay spread and the Doppler spread of the DMRS are associated with the delay spread and the Doppler spread of the corresponding TRS, and the average delay and the Doppler shift of the DMRS are associated with the average delays and the Doppler shifts of the M TRSs. That is, a difference between this aspect and the fifth aspect lies in that different TRSs correspond to different DMRS ports, namely, different DMRSs. However, an indication manner of the QCL indication information is the same as that in the fifth aspect. For details, refer to the implementation of the fifth aspect. Details are not described herein again.

According to a seventh aspect, this disclosure provides a quasi co-location (QCL) indication method. The method includes: A terminal receives quasi co-location (QCL) indication information, where the QCL indication information indicates that a delay spread of a demodulation reference signal DMRS is associated with delay spreads of N tracking reference signals TRSs and that an average delay of the DMRS is associated with average delays of M TRSs, N is greater than or equal to 2, and M is greater than or equal to 1.

It can be learned that the QCL indication method is applicable to a case in which the N TRSs correspond to a same DMRS port, namely, a same DMRS, in coordinated multistation transmission. In this case, after receiving the QCL indication information, the terminal may track delay spreads between N network devices and the terminal by using the N TRSs, and obtain the delay spread of the DMRS by combining the N delay spreads. This is more compliant with a multipath delay feature of separately sending a same DMRS by the N network devices, and helps improve DMRS channel estimation accuracy.

The method further helps a network device send a DMRS and a physical downlink shared channel PDSCH through delay compensation, so that delays of DMRSs and PDSCHs from different network devices to the terminal are the same. In addition, the terminal may determine, by using the average delays of the M TRSs, a corresponding reference delay to receive the DMRSs and the PDSCHs. This avoids performance deterioration caused by using a wrong reference delay by the terminal. Therefore, the method helps improve multistation transmission performance.

In addition, in the QCL indication method in this aspect, after receiving the QCL indication information, the terminal combines the delay spreads of the N TRSs to obtain the delay spread of the DMRS, and determines the average delay of the DMRS by using the average delays of the M TRSs. Therefore, a difference between an indication manner of the QCL indication information in this aspect and the implementations 1.1 and 1.2 of the first aspect lies in that a large-scale channel parameter of QCL type E includes a delay spread and that a large-scale channel parameter of QCL type C includes an average delay.

In an implementation, the method further includes: The terminal determines the delay spread of the DMRS based on the delay spreads of the N TRSs, and determines the average delay of the DMRS based on the average delays of the M TRSs. It can be learned that this implementation improves multistation transmission performance.

According to an eighth aspect, this disclosure further provides a quasi co-location (QCL) indication method. The method includes: A terminal receives quasi co-location (QCL) indication information, where the QCL indication information indicates that a delay spread of each of N demodulation reference signals DMRSs is associated with a delay spread of a corresponding TRS and that an average delay of the DMRS is associated with average delays of M TRSs, N is greater than or equal to 2, and M is greater than or equal to 1.

It can be learned that a difference between the method and the seventh aspect lies in that in the method, after the terminal receives the QCL indication information, the delay spread of the DMRS is determined by using the delay spread of the corresponding TRS. That is, DMR channel estimation is performed by using the delay spread of the corresponding TRS. However, the average delay of the DMRS is still also obtained based on the average delays of the M TRSs. In other words, in the method, the delay spread of the DMRS may be different, but the average delay of the DMRS is the same. In this way, when the TRSs correspond to different DMRS ports, channel estimation is more accurate by using the delay spread of the corresponding TRS.

The method helps a network device send a DMRS and a physical downlink shared channel PDSCH through delay compensation, so that delays of DMRSs and PDSCHs from different network devices to the terminal are the same. In addition, the terminal may determine, by using the average delays of the M TRSs, a corresponding reference delay to receive the DMRSs and the PDSCHs. This avoids performance deterioration caused by using a wrong reference delay by the terminal. Therefore, the method helps improve multistation transmission performance.

In addition, in the QCL indication method in this aspect, after receiving the QCL indication information, the terminal separately determines delay spreads of corresponding DMRSs by using delay spreads of N TRSs, and determines average delays of all DMRSs by using the average delays of the M TRSs. Therefore, a difference between an indication manner of the QCL indication information in this aspect and the indication manner of the QCL indication information in the second aspect lies in that a large-scale channel parameter of QCL type E includes a delay spread and that a large-scale channel parameter of QCL type C includes an average delay.

In an implementation, the method further includes: The terminal determines time-frequency spread information of the corresponding DMRS based on the delay spread of the TRS, and determines the average delay of the DMRS based on the average delays of the M TRSs. It can be learned that the method can ensure channel transmission performance in coordinated multistation transmission.

According to a ninth aspect, this disclosure further provides a quasi co-location (QCL) indication method. The method includes: A terminal receives quasi co-location (QCL) indication information, where the QCL indication information indicates that a Doppler spread of a demodulation reference signal DMRS is associated with Doppler spreads of N tracking reference signals TRSs and that a Doppler shift of the DMRS is associated with Doppler shifts of M TRSs, N is greater than or equal to 2, and M is greater than or equal to 1.

In coordinated multistation transmission, TRSs separately sent by N network devices correspond to a same DMRS port. After receiving the QCL indication information, the terminal may track Doppler spreads between the N network devices and the terminal by using the N TRSs, and obtain the Doppler spread of the DMRS by combining the N Doppler spreads. This is more compliant with a multipath Doppler feature of separately sending a same DMRS by the N network devices, and helps improve DMRS channel estimation accuracy. In addition, the method helps a network device send a DMRS and a physical downlink shared channel PDSCH through frequency offset compensation, so that frequency offsets of DMRSs and PDSCHs from different network devices to the terminal are the same. In addition, the terminal may determine, by using the Doppler shifts of the M TRSs, a corresponding reference frequency offset to receive the DMRSs and the PDSCHs. This avoids performance deterioration caused by using a wrong reference frequency offset by the terminal. Therefore, the method helps improve multistation transmission performance.

In addition, in the QCL indication method in this aspect, after receiving the QCL indication information, the terminal combines the Doppler spreads of the N TRSs to obtain the Doppler spread of the DMRS, and determines the Doppler shift of the DMRS by using the Doppler shifts of the M TRSs. Therefore, a difference between an indication manner of the QCL indication information in this aspect and the implementation of the first aspect lies in that a large-scale channel parameter of QCL type E includes a Doppler spread and that a large-scale channel parameter of QCL type C includes a Doppler shift.

In an implementation, the method further includes: The terminal determines the Doppler spread of the DMRS based on the Doppler spreads of the N TRSs, and determines the Doppler shift of the DMRS based on the Doppler shifts of the M TRSs. It can be learned that this implementation improves multistation transmission performance.

According to a tenth aspect, this disclosure further provides a quasi co-location (QCL) indication method. The method includes: A terminal receives quasi co-location QCL indication information, where the QCL indication information indicates that a Doppler spread of each of N demodulation reference signals DMRSs is associated with a Doppler spread of a corresponding TRS and that a Doppler shift of the DMRS is associated with Doppler shifts of M TRSs, N is greater than or equal to 2, and M is greater than or equal to 1.

It can be learned that a difference between the method and the ninth aspect lies in that in the method, after the terminal receives the QCL indication information, the Doppler spread of the DMRS is determined by using the Doppler spread of the corresponding TRS. That is, DMRS channel estimation is performed by using the Doppler spread of the corresponding TRS. However, the Doppler shift of the DMRS is still also obtained based on the Doppler shifts of the M TRSs. In other words, in the method, the Doppler spread of the DMRS may be different, but the Doppler shift of the DMRS is the same. In this way, when the TRSs correspond to different DMRS ports, channel estimation is more accurate by using the Doppler spread of the corresponding TRS. The method further helps a network device send a DMRS and a physical downlink shared channel PDSCH through frequency offset compensation, so that frequency offsets of DMRSs and PDSCHs from different network devices to the terminal are the same. In addition, the terminal may determine, by using the Doppler shifts of the M TRSs, a corresponding reference frequency offset to receive the DMRSs and the PDSCHs. This avoids performance deterioration caused by using a wrong reference frequency offset by the terminal. Therefore, the method helps improve multistation transmission performance.

In addition, in the QCL indication method in this aspect, after receiving the QCL indication information, the terminal separately determines Doppler spreads of corresponding DMRSs by using Doppler spreads of N TRSs, and determines Doppler shifts of all DMRSs by using the Doppler shifts of the M TRSs. Therefore, a difference between an indication manner of the QCL indication information in this aspect and the indication manner of the QCL indication information in the second aspect lies in that a large-scale channel parameter of QCL type E includes a Doppler spread and that a large-scale channel parameter of QCL type C includes a Doppler shift.

In an implementation, the method further includes: The terminal determines the Doppler spread of the corresponding DMRS based on the Doppler spread of the TRS, and determines the Doppler shift of the DMRS based on the Doppler shifts of the M TRSs. It can be learned that the method can ensure channel transmission performance in coordinated multistation transmission.

According to an eleventh aspect, this disclosure further provides a quasi co-location (QCL) indication method. The method includes: A terminal receives quasi co-location (QCL) indication information, where the QCL indication information indicates that a delay spread of a demodulation reference signal DMRS is associated with delay spreads of N tracking reference signals TRSs, that a Doppler spread of the DMRS is associated with Doppler spreads of the N TRSs, and that an average delay of the DMRS is associated with average delays of M TRSs, N is greater than or equal to 2, and M is greater than or equal to 1.

In coordinated multistation transmission, TRSs separately sent by N network devices correspond to a same DMRS port. After obtaining the QCL indication information, the terminal may track Doppler spreads and delay spreads between the N network devices and the terminal by using the N TRSs, and obtain the Doppler spread and the delay spread of the DMRS by combining the N Doppler spreads and delay spreads. This is more compliant with a multipath feature of separately sending a same DMRS by the N network devices, and helps improve DMRS channel estimation accuracy.

In addition, the method helps a network device send a DMRS and a physical downlink shared channel PDSCH through delay compensation, so that delays of DMRSs and PDSCHs from different network devices to the terminal are the same. In addition, the terminal may determine, by using the average delays of the M TRSs, a corresponding reference delay to receive the DMRSs and the PDSCHs. This avoids performance deterioration caused by using a wrong reference delay by the terminal. Therefore, the method helps improve multistation transmission performance.

In an implementation, the terminal determines the delay spread and the Doppler spread of the DMRS based on the delay spreads and the Doppler spreads of the N TRSs, and determines the average delay of the DMRS based on the average delays of the M TRSs. In this way, multistation transmission performance is improved.

Optionally, an indication manner of the QCL indication information may include but is not limited to Implementation 1.1 and Implementation 1.2 of the first aspect based on different types of QCL relationships associated with the TRS. However, a difference lies in that in this aspect, a large-scale channel parameter of QCL type E includes a delay spread and a Doppler spread, and a large-scale channel parameter of QCL type C includes an average delay.

According to a twelfth aspect, this disclosure further provides a quasi co-location (QCL) indication method. The method includes: A terminal receives quasi co-location (QCL) indication information, where the QCL indication information indicates that a delay spread of each of N demodulation reference signals DMRSs is associated with a delay spread of a corresponding TRS, that a Doppler spread of the DMRS is associated with a Doppler spread of the corresponding TRS, and that an average delay of the DMRS is associated with average delays of M TRSs, N is greater than or equal to 2, and M is greater than or equal to 1.

It can be learned that a difference between the method and the eleventh aspect lies in that in the method, TRSs separately sent by N network devices correspond to different DMRS ports. In this way, after the terminal obtains the QCL indication information, the terminal may determine, based on the Doppler spread and the delay spread of the TRS, the Doppler spread and the delay spread that correspond to the DMRS. That is, DMRS channel estimation is performed by using the Doppler spread and the delay spread of the corresponding TRS. However, the average delay of the DMRS is still also obtained based on the average delays of the M TRSs.

In other words, in the method, the Doppler spread and the delay spread of the DMRS may be different, but the average delay of the DMRS is the same. In this way, when the TRSs correspond to the different DMRS ports, channel estimation is more accurate by using the Doppler spread and the delay spread of the corresponding TRS. In addition, the method helps a network device send a DMRS and a physical downlink shared channel PDSCH through delay compensation, so that delays of DMRSs and PDSCHs from different network devices to the terminal are the same. In addition, the terminal may determine, by using the average delays of the M TRSs, a corresponding reference delay to receive the DMRSs and the PDSCHs. This avoids performance deterioration caused by using a wrong reference delay by the terminal. Therefore, the method helps improve multistation transmission performance.

In an implementation, the method further includes: The terminal determines the delay spread and the Doppler spread of the corresponding DMRS based on the delay spread and the Doppler spread of the TRS, and determines the average delay of the DMRS based on the average delays of the M TRSs. It can be learned that a delay spread and a Doppler spread between a corresponding network device and the terminal are separately considered for the delay spread and the Doppler spread that are of the DMRS and that are determined in this implementation, and the average delay of the DMRS may be learned of, so that multistation transmission performance is improved.

In this aspect, the delay spread and the Doppler spread of the DMRS are associated with the delay spread and the Doppler spread of the corresponding TRS, and the average delay of the DMRS is associated with the average delays of the M TRSs. That is, a difference between this aspect and the eleventh aspect lies in that different TRSs correspond to different DMRS ports, namely, different DMRSs. However, an indication manner of the QCL indication information is the same as that in the eleventh aspect. For details, refer to the implementation of the eleventh aspect. Details are not described herein again.

According to a thirteenth aspect, this disclosure further provides a quasi co-location (QCL) indication method. The method includes: A terminal receives quasi co-location QCL indication information, where the QCL indication information indicates that a delay spread of a demodulation reference signal DMRS is associated with delay spreads of N tracking reference signals TRSs, that a Doppler spread of the DMRS is associated with Doppler spreads of the N TRSs, and that a Doppler shift of the DMRS is associated with Doppler shifts of M TRSs, N is greater than or equal to 2, and M is greater than or equal to 1.

In coordinated multistation transmission, TRSs separately sent by N network devices correspond to a same DMRS port. After obtaining the QCL indication information, the terminal may track Doppler spreads and delay spreads between the N network devices and the terminal by using the N TRSs, and obtain the Doppler spread and the delay spread of the DMRS by combining the N Doppler spreads and delay spreads. This is more compliant with a multipath feature of separately sending a same DMRS by the N network devices, and helps improve DMRS channel estimation accuracy. In addition, the method helps a network device send a DMRS and a physical downlink shared channel PDSCH through frequency offset compensation, so that frequency offsets of DMRSs and PDSCHs from different network devices to the terminal are the same. In addition, the terminal may determine, by using the Doppler shifts of the M TRSs, a corresponding reference frequency offset to receive the DMRSs and the PDSCHs. This avoids performance deterioration caused by using a wrong reference frequency offset by the terminal. Therefore, the method helps improve multistation transmission performance.

In an implementation, the terminal determines the delay spread and the Doppler spread of the DMRS based on the delay spreads and the Doppler spreads of the N TRSs, and determines the Doppler shift of the DMRS based on the Doppler shifts of the M TRSs. In this way, multistation transmission performance is improved.

Optionally, an indication manner of the QCL indication information may include but is not limited to the implementation of the first aspect based on different types of QCL relationships associated with the TRS. However, a difference lies in that in this aspect, a large-scale channel parameter of QCL type E includes a delay spread and a Doppler spread, and a large-scale channel parameter of QCL type C includes a Doppler shift.

According to a fourteenth aspect, this disclosure further provides a quasi co-location (QCL) indication method. The method includes: A terminal receives quasi co-location (QCL) indication information, where the QCL indication information indicates that a delay spread of each of N demodulation reference signals DMRSs is associated with a delay spread of a corresponding TRS, that a Doppler spread of the DMRS is associated with a Doppler spread of the corresponding TRS, and that a Doppler shift of the DMRS is associated with Doppler shifts of M TRSs, N is greater than or equal to 2, and M is greater than or equal to 1.

It can be learned that a difference between the method and the thirteenth aspect lies in that in the method, TRSs separately sent by N network devices correspond to different DMRS ports. In this way, after the terminal obtains the QCL indication information, the terminal may determine the Doppler spread and the delay spread of the corresponding DMRS based on the Doppler spread and the delay spread of the TRS. That is, DMRS channel estimation is performed by using the Doppler spread and the delay spread of the corresponding TRS. However, the Doppler shift of the DMRS is still also obtained based on the Doppler shifts of the M TRSs. In other words, in the method, the Doppler spread and the delay spread of the DMRS may be different, but the Doppler shift of the DMRS is the same. In this way, when the TRSs correspond to the different DMRS ports, channel estimation is more accurate by using the Doppler spread and the delay spread of the corresponding TRS.

In addition, the method helps a network device send a DMRS and a physical downlink shared channel PDSCH through frequency offset compensation, so that frequency offsets of DMRSs and PDSCHs from different network devices to the terminal are the same. In addition, the terminal may determine, by using the Doppler shifts of the M TRSs, a corresponding reference frequency offset to receive the DMRSs and the PDSCHs. This avoids performance deterioration caused by using a wrong reference frequency offset by the terminal. Therefore, the method helps improve multistation transmission performance.

In an implementation, the method further includes: The terminal determines the delay spread and the Doppler spread of the corresponding DMRS based on the delay spread and the Doppler spread of the TRS, and determines the Doppler shift of the DMRS based on the Doppler shifts of the M TRSs. It can be learned that a delay spread and a Doppler spread between a corresponding network device and the terminal are separately considered for the delay spread and the Doppler spread that are of the DMRS and that are determined in this implementation, and the Doppler shift of the DMRS may be learned of, so that multistation transmission performance is improved.

In this aspect, the delay spread and the Doppler spread of the DMRS are associated with the delay spread and the Doppler spread of the corresponding TRS, and the Doppler shift of the DMRS is associated with the Doppler shifts of the M TRSs. That is, a difference between this aspect and the thirteenth aspect lies in that different TRSs correspond to different DMRS ports, namely, different DMRSs. However, an indication manner of the QCL indication information is the same as that in the thirteenth aspect. For details, refer to the implementation of the thirteenth aspect. Details are not described herein again.

According to a fifteenth aspect, this disclosure further provides a quasi co-location (QCL) indication method. The method includes: A terminal receives quasi co-location (QCL) indication information, where the QCL indication information indicates that a delay spread of a demodulation reference signal DMRS is associated with delay spreads of N tracking reference signals TRSs, that an average delay of the DMRS is associated with average delays of M TRSs, and that a Doppler shift of the DMRS is associated with Doppler shifts of the M TRSs, N is greater than or equal to 2, and M is greater than or equal to 1.

In coordinated multistation transmission, TRSs separately sent by N network devices correspond to a same DMRS port. After obtaining the QCL indication information, the terminal may track delay spreads between the N network devices and the terminal by using the N TRSs, and obtain the delay spread of the DMRS by combining the N delay spreads. This is more compliant with a multipath feature of separately sending a same DMRS by the N network devices, and helps improve DMRS channel estimation accuracy.

In addition, the method helps a network device send a DMRS and a physical downlink shared channel PDSCH through delay-frequency offset compensation, so that delays and frequency offsets of DMRSs and PDSCHs from different network devices to the terminal are the same. In addition, the terminal may determine, by using the average delays and the Doppler shifts of the M TRSs, a corresponding reference delay and reference frequency offset to receive the DMRSs and the PDSCHs. This avoids performance deterioration caused by using a wrong reference delay and reference frequency offset by the terminal. Therefore, the method helps improve multistation transmission performance.

In an implementation, the terminal determines the delay spread of the DMRS based on the delay spreads of the N TRSs, and determines the average delay and the Doppler shift of the DMRS based on the average delays and the Doppler shifts of the M TRSs. In this way, multistation transmission performance is improved.

Optionally, an indication manner of the QCL indication information may include but is not limited to the implementation of the first aspect based on different types of QCL relationships associated with the TRS. However, a difference lies in that in this aspect, a large-scale channel parameter of QCL type E includes a delay spread, and a large-scale channel parameter of QCL type C includes an average delay and a Doppler shift.

According to a sixteenth aspect, this disclosure further provides a quasi co-location (QCL) indication method. The method includes: A terminal receives quasi co-location (QCL) indication information, where the QCL indication information indicates that a delay spread of each of N demodulation reference signals DMRSs is associated with a delay spread of a corresponding TRS, that an average delay of the DMRS is associated with average delays of M TRSs, and that a Doppler shift of the DMRS is associated with Doppler shifts of the M TRSs, N is greater than or equal to 2, and M is greater than or equal to 1.

It can be learned that a difference between the method and the fifteenth aspect lies in that in the method, TRSs separately sent by N network devices correspond to different DMRS ports. In this way, after the terminal obtains the QCL indication information, the terminal may determine the delay spread of the corresponding TRS based on the delay spread of the DMRS. That is, DMRS channel estimation is performed by using the delay spread of the corresponding TRS. However, the average delay and the Doppler shift of the DMRS are still also obtained based on the average delays and the Doppler shifts of the M TRSs.

In other words, in the method, the delay spread of the DMRS may be different, but the average delay and the Doppler shift of the DMRS are the same. In this way, when the TRSs correspond to the different DMRS ports, channel estimation is more accurate by using the delay spread of the corresponding TRS. In addition, the method helps a network device send a DMRS and a physical downlink shared channel PDSCH through delay-frequency offset compensation, so that delays and frequency offsets of DMRSs and PDSCHs from different network devices to the terminal are the same. In addition, the terminal may determine, by using the Doppler shifts of the M TRSs, a corresponding reference delay and reference frequency offset to receive the DMRSs and the PDSCHs. This avoids performance deterioration caused by using a wrong reference delay and reference frequency offset by the terminal. Therefore, the method helps improve multistation transmission performance.

In an implementation, the method further includes: The terminal determines the delay spread of the corresponding DMRS based on the delay spread of the TRS, and determines the average delay and the Doppler shift of the DMRS based on the average delays and the Doppler shifts of the M TRSs. It can be learned that a delay spread between a corresponding network device and the terminal is separately considered for the delay spread that is of the DMRS and that is determined in this implementation, and the average delay and the Doppler shift of the DMRS may be learned of, so that multistation transmission performance is improved.

In this aspect, the delay spread of the DMRS is associated with the delay spread of the corresponding TRS, and the average delay and the Doppler shift of the DMRS are associated with the average delays and the Doppler shifts of the M TRSs. That is, a difference between this aspect and the fifteenth aspect lies in that different TRSs correspond to different DMRS ports, namely, different DMRSs. However, an indication manner of the QCL indication information is the same as that in the fifteenth aspect. For details, refer to the implementation of the fifteenth aspect. Details are not described herein again.

According to a seventeenth aspect, this disclosure further provides a quasi co-location (QCL) indication method. The method includes: A terminal receives quasi co-location (QCL) indication information, where the QCL indication information indicates that a Doppler spread of a demodulation reference signal DMRS is associated with Doppler spreads of N tracking reference signals TRSs, that an average delay of the DMRS is associated with average delays of M TRSs, and that a Doppler shift of the DMRS is associated with Doppler shifts of the M TRSs, N is greater than or equal to 2, and M is greater than or equal to 1.

In coordinated multistation transmission, TRSs separately sent by N network devices correspond to a same DMRS port. After obtaining the QCL indication information, the terminal may track Doppler spreads between the N network devices and the terminal by using the N TRSs, and obtain the Doppler spread of the DMRS by combining the N Doppler spreads. This is more compliant with a multipath feature of separately sending a same DMRS by the N network devices, and helps improve DMRS channel estimation accuracy. In addition, the method helps a network device send a DMRS and a physical downlink shared channel PDSCH through delay-frequency offset compensation, so that delays and frequency offsets of DMRSs and PDSCHs from different network devices to the terminal are the same. In addition, the terminal may determine, by using the average delays and the Doppler shifts of the M TRSs, a corresponding reference delay and reference frequency offset to receive the DMRSs and the PDSCHs. This avoids performance deterioration caused by using a wrong reference delay and reference frequency offset by the terminal. Therefore, the method helps improve multistation transmission performance.

In an implementation, the terminal determines the Doppler spread of the DMRS based on the Doppler spreads of the N TRSs, and determines the average delay and the Doppler shift of the DMRS based on the average delays and the Doppler shifts of the M TRSs. In this way, multistation transmission performance is improved.

Optionally, an indication manner of the QCL indication information may include but is not limited to the implementation of the first aspect based on different types of QCL relationships associated with the TRS. However, a difference lies in that in this aspect, a large-scale channel parameter of QCL type E includes a Doppler spread, and a large-scale channel parameter of QCL type C includes an average delay and a Doppler shift.

According to an eighteenth aspect, this disclosure further provides a quasi co-location (QCL) indication method. The method includes: A terminal receives quasi co-location (QCL) indication information, where the QCL indication information indicates that a Doppler spread of each of N demodulation reference signals DMRSs is associated with a Doppler spread of a corresponding TRS, that an average delay of the DMRS is associated with average delays of M TRSs, and that a Doppler shift of the DMRS is associated with Doppler shifts of the M TRSs, N is greater than or equal to 2, and M is greater than or equal to 1.

It can be learned that a difference between the method and the fifteenth aspect lies in that in the method, TRSs separately sent by N network devices correspond to different DMRS ports. In this way, after the terminal obtains the QCL indication information, the terminal may determine the Doppler spread of the corresponding TRS based on the Doppler spread of the DMRS. That is, DMRS channel estimation is performed by using the Doppler spread of the corresponding TRS. However, the average delay and the Doppler shift of the DMRS are still also obtained based on the average delays and the Doppler shifts of the M TRSs.

In other words, in the method, the Doppler spread of the DMRS may be different, but the average delay and the Doppler shift of the DMRS are the same. In this way, when the TRSs correspond to the different DMRS ports, channel estimation is more accurate by using the Doppler spread of the corresponding TRS. In addition, the method helps a network device send a DMRS and a physical downlink shared channel PDSCH through delay-frequency offset compensation, so that delays and frequency offsets of DMRSs and PDSCHs from different network devices to the terminal are the same. In addition, the terminal may determine, by using the Doppler shifts of the M TRSs, a corresponding reference delay and reference frequency offset to receive the DMRSs and the PDSCHs. This avoids performance deterioration caused by using a wrong reference delay and reference frequency offset by the terminal. Therefore, the method helps improve multistation transmission performance.

In an implementation, the method further includes: The terminal determines the Doppler spread of the corresponding DMRS based on the Doppler spread of the TRS, and determines the average delay and the Doppler shift of the DMRS based on the average delays and the Doppler shifts of the M TRSs. It can be learned that a Doppler spread between a corresponding network device and the terminal is separately considered for the Doppler spread that is of the DMRS and that is determined in this implementation, and the average delay and the Doppler shift of the DMRS may be learned of, so that multistation transmission performance is improved.

In this aspect, the Doppler spread of the DMRS is associated with the Doppler spread of the corresponding TRS, and the average delay and the Doppler shift of the DMRS are associated with the average delays and the Doppler shifts of the M TRSs. That is, a difference between this aspect and the seventeenth aspect lies in that different TRSs correspond to different DMRS ports, namely, different DMRSs. However, an indication manner of the QCL indication information is the same as that in the seventeenth aspect. For details, refer to the implementation of the seventeenth aspect. Details are not described herein again.

In addition, in the QCL indication methods according to the first aspect to the eighteenth aspect, the QCL indication information indicates that time-frequency spread information of the N TRSs is associated with time-frequency spread information of one or more DMRSs and that delay-frequency offset information of the M TRSs is associated with delay-frequency offset information of the DMRSs. This helps enable the terminal to learn how to perform DMRS channel estimation, to improve channel estimation performance, and notifies the terminal of at least the reference frequency offset or the reference delay that need/needs to be used, to prevent the terminal from receiving the DMRSs by using the wrong reference frequency offset and reference delay, thereby improving multistation transmission performance. Therefore, the foregoing QCL indication methods need to resolve a same problem, to be specific, improve multistation transmission performance, have corresponding specific technical features, and achieve an effect of improving multistation transmission performance. Therefore, the QCL indication methods in the foregoing aspects belong to a same inventive concept and satisfy a requirement of unity.

According to a nineteenth aspect, this disclosure provides a quasi co-location (QCL) indication method. The method corresponds to the first aspect, and is described from a perspective of a network device. The method includes: The network device determines (QCL) indication information, where the QCL indication information indicates that a delay spread of a demodulation reference signal DMRS is associated with delay spreads of N tracking reference signals TRSs and that a Doppler shift of the DMRS is associated with Doppler shifts of M TRSs, N is greater than or equal to 2, and M is greater than or equal to 1. The network device sends the QCL indication information.

Like the first aspect, the QCL indication method in this aspect can improve multistation transmission performance. For details, refer to the analysis of the first aspect. Details are not described herein again.

For a related implementation of the QCL indication information in this aspect, also refer to the related content in the first aspect. Details are not described herein again.

According to a twentieth aspect, this disclosure provides a quasi co-location (QCL) indication method. The method corresponds to the second aspect, and is described from a perspective of a network device. The method includes: The network device determines quasi co-location (QCL) indication information, where the QCL indication information indicates that a delay spread of each of N demodulation reference signals DMRSs is associated with a delay spread of a corresponding TRS and that a Doppler shift of the DMRS is associated with Doppler shifts of M TRSs, N is greater than or equal to 2, and M is greater than or equal to 1. The network device sends the QCL indication information.

Like the second aspect, the QCL indication method in this aspect can improve multistation transmission performance. For details, refer to the analysis of the second aspect. Details are not described herein again.

For a related implementation of the QCL indication information in this aspect, also refer to the related content in the second aspect. Details are not described herein again.

According to a twenty-first aspect, this disclosure provides a quasi co-location (QCL) indication method. The method corresponds to the third aspect, and is described from a perspective of a network device. The method includes: The network device determines quasi co-location (QCL) indication information, where the QCL indication information indicates that a Doppler spread of a demodulation reference signal DMRS is associated with Doppler spreads of N tracking reference signals TRSs and that an average delay of the DMRS is associated with average delays of M TRSs, N is greater than or equal to 2, and M is greater than or equal to 1. The network device sends the QCL indication information.

Like the third aspect, the QCL indication method in this aspect can improve multistation transmission performance. For details, refer to the analysis of the third aspect. Details are not described herein again.

For a related implementation of the QCL indication information in this aspect, also refer to the related content in the third aspect. Details are not described herein again.

According to a twenty-second aspect, this disclosure provides a quasi co-location (QCL) indication method. The method corresponds to the fourth aspect, and is described from a perspective of a network device. The method includes: The network device determines quasi co-location (QCL) indication information, where the QCL indication information indicates that a Doppler spread of each of N demodulation reference signals DMRSs is associated with a Doppler spread of a corresponding tracking reference signal TRS in N TRSs and that an average delay of the DMRS is associated with average delays of M of the N TRSs, N is greater than or equal to 2, and M is greater than or equal to 1. The network device sends the QCL indication information.

Like the fourth aspect, the QCL indication method in this aspect can improve multistation transmission performance. For details, refer to the analysis of the fourth aspect. Details are not described herein again.

For a related implementation of the QCL indication information in this aspect, also refer to the related content in the fourth aspect. Details are not described herein again.

According to a twenty-third aspect, this disclosure further provides a quasi co-location (QCL) indication method. The method corresponds to the fifth aspect, and is described from a perspective of a network device. The method includes: The network device determines QCL indication information, where the QCL indication information indicates that a delay spread of a demodulation reference signal DMRS is associated with delay spreads of N tracking reference signals TRSs, that a Doppler spread of the DMRS is associated with Doppler spreads of the N TRSs, that an average delay of the DMRS is associated with average delays of M TRSs, and that a Doppler shift of the DMRS is associated with Doppler shifts of the M TRSs, N is greater than or equal to 2, and M is greater than or equal to 1. The network device sends the QCL indication information.

Like the fifth aspect, the QCL indication method in this aspect can improve multistation transmission performance. For details, refer to the analysis of the fifth aspect. Details are not described herein again.

For a related implementation of the QCL indication information in this aspect, also refer to the related content in the fifth aspect. Details are not described herein again.

According to a twenty-fourth aspect, this disclosure further provides a quasi co-location (QCL) indication method. The method corresponds to the sixth aspect, and is described from a perspective of a network device. The method includes: The network device determines quasi co-location (QCL) indication information, where the QCL indication information indicates that a delay spread of each of N demodulation reference signals DMRSs is associated with a delay spread of a corresponding TRS, that a Doppler spread of the DMRS is associated with a Doppler spread of the corresponding TRS, that an average delay of the DMRS is associated with average delays of M TRSs, and that a Doppler shift of the DMRS is associated with Doppler shifts of the M TRSs, N is greater than or equal to 2, and M is greater than or equal to 1. The network device sends the QCL indication information.

Like the sixth aspect, the QCL indication method in this aspect can improve multistation transmission performance. For details, refer to the analysis of the sixth aspect. Details are not described herein again.

For a related implementation of the QCL indication information in this aspect, also refer to the related content in the sixth aspect. Details are not described herein again.

According to a twenty-fifth aspect, this disclosure provides a quasi co-location (QCL) indication method. The method corresponds to the seventh aspect, and is described from a perspective of a network device. The method includes: The network device determines QCL indication information, where the QCL indication information indicates that a delay spread of a demodulation reference signal DMRS is associated with delay spreads of N tracking reference signals TRSs and that an average delay of the DMRS is associated with average delays of M TRSs, N is greater than or equal to 2, and M is greater than or equal to 1. The network device sends the QCL indication information.

Like the seventh aspect, the QCL indication method in this aspect can improve multistation transmission performance. For details, refer to the analysis of the seventh aspect. Details are not described herein again.

For a related implementation of the QCL indication information in this aspect, also refer to the related content in the seventh aspect. Details are not described herein again.

According to a twenty-sixth aspect, this disclosure further provides a quasi co-location (QCL) indication method. The method corresponds to the eighth aspect, and is described from a perspective of a network device. The method includes: The network device determines quasi co-location (QCL) indication information, where the QCL indication information indicates that a delay spread of each of N demodulation reference signals DMRSs is associated with a delay spread of a corresponding TRS and that an average delay of the DMRS is associated with average delays of M TRSs, N is greater than or equal to 2, and M is greater than or equal to 1. The network device sends the QCL indication information.

Like the eighth aspect, the QCL indication method in this aspect can improve multistation transmission performance. For details, refer to the analysis of the eighth aspect. Details are not described herein again.

For a related implementation of the QCL indication information in this aspect, also refer to the related content in the eighth aspect. Details are not described herein again.

According to a twenty-seventh aspect, this disclosure further provides a quasi co-location (QCL) indication method. The method corresponds to the ninth aspect, and is described from a perspective of a network device. The method includes: The network device determines (QCL) indication information, where the QCL indication information indicates that a Doppler spread of a demodulation reference signal DMRS is associated with Doppler spreads of N tracking reference signals TRSs and that a Doppler shift of the DMRS is associated with Doppler shifts of M TRSs, N is greater than or equal to 2, and M is greater than or equal to 1. The network device sends the QCL indication information.

Like the ninth aspect, the QCL indication method in this aspect can improve multistation transmission performance. For details, refer to the analysis of the ninth aspect. Details are not described herein again.

For a related implementation of the QCL indication information in this aspect, also refer to the related content in the ninth aspect. Details are not described herein again.

According to a twenty-eighth aspect, this disclosure further provides a quasi co-location (QCL) indication method. The method corresponds to the tenth aspect, and is described from a perspective of a network device. The method includes: The network device determines QCL indication information, where the QCL indication information indicates that a Doppler spread of each of N demodulation reference signals DMRSs is associated with a Doppler spread of a corresponding TRS and that a Doppler shift of the DMRS is associated with Doppler shifts of M TRSs, N is greater than or equal to 2, and M is greater than or equal to 1. The network device sends the QCL indication information.

Like the tenth aspect, the QCL indication method in this aspect can improve multistation transmission performance. For details, refer to the analysis of the tenth aspect. Details are not described herein again.

For a related implementation of the QCL indication information in this aspect, also refer to the related content in the tenth aspect. Details are not described herein again.

According to a twenty-ninth aspect, this disclosure further provides a quasi co-location (QCL) indication method. The method corresponds to the eleventh aspect, and is described from a perspective of a network device. The method includes: The network device determines QCL indication information, where the QCL indication information indicates that a delay spread of a demodulation reference signal DMRS is associated with delay spreads of N tracking reference signals TRSs, that a Doppler spread of the DMRS is associated with Doppler spreads of the N TRSs, and that an average delay of the DMRS is associated with average delays of M TRSs, N is greater than or equal to 2, and M is greater than or equal to 1. The network device sends the QCL indication information.

Like the eleventh aspect, the QCL indication method in this aspect can improve multistation transmission performance. For details, refer to the analysis of the eleventh aspect. Details are not described herein again.

For a related implementation of the QCL indication information in this aspect, also refer to the related content in the eleventh aspect. Details are not described herein again.

According to a thirtieth aspect, this disclosure further provides a quasi co-location (QCL) indication method. The method corresponds to the twelfth aspect, and is described from a perspective of a network device. The method includes: The network device determines QCL indication information, where the QCL indication information indicates that a delay spread of each of N demodulation reference signals DMRSs is associated with a delay spread of a corresponding TRS, that a Doppler spread of the DMRS is associated with a Doppler spread of the corresponding TRS, and that an average delay of the DMRS is associated with average delays of M TRSs, N is greater than or equal to 2, and M is greater than or equal to 1. The network device sends the QCL indication information.

Like the twelfth aspect, the QCL indication method in this aspect can improve multistation transmission performance. For details, refer to the analysis of the twelfth aspect. Details are not described herein again.

For a related implementation of the QCL indication information in this aspect, also refer to the related content in the twelfth aspect. Details are not described herein again.

According to a thirty-first aspect, this disclosure further provides a quasi co-location (QCL) indication method. The method corresponds to the thirteenth aspect, and is described from a perspective of a network device. The method includes: The network device determines QCL indication information, where the QCL indication information indicates that a delay spread of a demodulation reference signal DMRS is associated with delay spreads of N tracking reference signals TRSs, that a Doppler spread of the DMRS is associated with Doppler spreads of the N TRSs, and that a Doppler shift of the DMRS is associated with Doppler shifts of M TRSs, N is greater than or equal to 2, and M is greater than or equal to 1. The network device sends the QCL indication information.

Like the thirteenth aspect, the QCL indication method in this aspect can improve multistation transmission performance. For details, refer to the analysis of the thirteenth aspect. Details are not described herein again.

For a related implementation of the QCL indication information in this aspect, also refer to the related content in the thirteenth aspect. Details are not described herein again.

According to a thirty-second aspect, this disclosure further provides a quasi co-location (QCL) indication method. The method corresponds to the fourteenth aspect, and is described from a perspective of a network device. The method includes: The network device determines quasi co-location QCL indication information, where the QCL indication information indicates that a delay spread of each of N demodulation reference signals DMRSs is associated with a delay spread of a corresponding TRS, that a Doppler spread of the DMRS is associated with a Doppler spread of the corresponding TRS, and that a Doppler shift of the DMRS is associated with Doppler shifts of M TRSs, N is greater than or equal to 2, and M is greater than or equal to 1. The network device sends the QCL indication information.

Like the fourteenth aspect, the QCL indication method in this aspect can improve multistation transmission performance. For details, refer to the analysis of the fourteenth aspect. Details are not described herein again.

For a related implementation of the QCL indication information in this aspect, also refer to the related content in the fourteenth aspect. Details are not described herein again.

According to a thirty-third aspect, this disclosure further provides a quasi co-location (QCL) indication method. The method corresponds to the fifteenth aspect, and is described from a perspective of a network device. The method includes: The network device determines QCL indication information, where the QCL indication information indicates that a delay spread of a demodulation reference signal DMRS is associated with delay spreads of N tracking reference signals TRSs, that an average delay of the DMRS is associated with average delays of M TRSs, and that a Doppler shift of the DMRS is associated with Doppler shifts of the M TRSs, N is greater than or equal to 2, and M is greater than or equal to 1. The network device sends the QCL indication information.

Like the fifteenth aspect, the QCL indication method in this aspect can improve multistation transmission performance. For details, refer to the analysis of the fifteenth aspect. Details are not described herein again.

For a related implementation of the QCL indication information in this aspect, also refer to the related content in the fifteenth aspect. Details are not described herein again.

According to a thirty-fourth aspect, this disclosure further provides a quasi co-location (QCL) indication method. The method corresponds to the sixteenth aspect, and is described from a perspective of a network device. The method includes: The network device determines quasi co-location QCL indication information, where the QCL indication information indicates that a delay spread of each of N demodulation reference signals DMRSs is associated with a delay spread of a corresponding TRS, that an average delay of the DMRS is associated with average delays of M TRSs, and that a Doppler shift of the DMRS is associated with Doppler shifts of the M TRSs, N is greater than or equal to 2, and M is greater than or equal to 1. The network device sends the QCL indication information.

Like the sixteenth aspect, the QCL indication method in this aspect can improve multistation transmission performance. For details, refer to the analysis of the sixteenth aspect. Details are not described herein again.

For a related implementation of the QCL indication information in this aspect, also refer to the related content in the sixteenth aspect. Details are not described herein again.

According to a thirty-fifth aspect, this disclosure further provides a quasi co-location (QCL) indication method. The method corresponds to the seventeenth aspect, and is described from a perspective of a network device. The method includes: The network device determines QCL indication information, where the QCL indication information indicates that a Doppler spread of a demodulation reference signal DMRS is associated with Doppler spreads of N tracking reference signals TRSs, that an average delay of the DMRS is associated with average delays of M TRSs, and that a Doppler shift of the DMRS is associated with Doppler shifts of the M TRSs, N is greater than or equal to 2, and M is greater than or equal to 1. The network device sends the QCL indication information.

Like the seventeenth aspect, the QCL indication method in this aspect can improve multistation transmission performance. For details, refer to the analysis of the seventeenth aspect. Details are not described herein again.

For a related implementation of the QCL indication information in this aspect, also refer to the related content in the seventeenth aspect. Details are not described herein again.

According to a thirty-sixth aspect, this disclosure further provides a quasi co-location (QCL) indication method. The method corresponds to the eighteenth aspect, and is described from a perspective of a network device. The method includes: The network device determines quasi co-location (QCL) indication information, where the QCL indication information indicates that a Doppler spread of each of N demodulation reference signals DMRSs is associated with a Doppler spread of a corresponding TRS, that an average delay of the DMRS is associated with average delays of M TRSs, and that a Doppler shift of the DMRS is associated with Doppler shifts of the M TRSs, N is greater than or equal to 2, and M is greater than or equal to 1.

Like the eighteenth aspect, the QCL indication method in this aspect can improve multistation transmission performance. For details, refer to the analysis of the eighteenth aspect. Details are not described herein again.

For a related implementation of the QCL indication information in this aspect, also refer to the related content in the eighteenth aspect. Details are not described herein again.

In addition, in any one of the nineteenth aspect to the thirty-sixth aspect, the network device may further receive an uplink signal based on the QCL indication information. It can be learned that the uplink signal received in this implementation may be sent by the terminal after the terminal obtains at least a reference frequency offset or a reference delay based on the QCL indication information, so that delays of uplink signals sent by the terminal to TRPs are the same, and this helps improve multistation transmission performance.

According to a thirty-seventh aspect, this disclosure further provides a terminal. The terminal implements some or all functions of the terminal in the method example in any one of the first aspect to the eighteenth aspect. For example, the function of the terminal may include functions in some or all embodiments of this application, or may include a function of separately implementing any embodiment of this application. The function may be implemented by using hardware, or may be implemented by hardware executing corresponding software. The hardware or the software includes one or more units or modules corresponding to the foregoing function.

In a possible design, a structure of the terminal may include a processing unit and a communication unit. The processing unit is configured to support the terminal in performing a corresponding function in the foregoing method. The communication unit is configured to support communication between the terminal and another device. The terminal may further include a storage unit. The storage unit is configured to couple to the processing unit and a sending unit, and stores program instructions and data that are necessary for the terminal.

In an implementation, the terminal includes:
a communication unit, configured to receive quasi co-location QCL indication information, where the QCL indication information indicates that a delay spread of a demodulation reference signal DMRS is associated with delay spreads of N tracking reference signals TRSs, that a Doppler spread of the DMRS is associated with Doppler spreads of the N TRSs, that an average delay of the DMRS is associated with average delays of M TRSs, and that a Doppler shift of the DMRS is associated with Doppler shifts of the M TRSs, N is greater than or equal to 2, and M is greater than or equal to 1.

Optionally, the terminal further includes a processing unit.

The processing unit is configured to determine the delay spread and the Doppler spread of the DMRS based on the delay spreads and the Doppler spreads of the N TRSs, and determine the average delay and the Doppler shift of the DMRS based on the average delays and the Doppler shifts of the M TRSs.

Optionally, the terminal may alternatively perform related content in the first aspect to the fourth aspect or the sixth aspect to the eighteenth aspect by using at least the communication unit or the processing unit. A difference lies in that content indicated by the QCL indication information is different. Details are not described herein again.

In an example, the processing unit may be a processor, the communication unit may be a transceiver, and the storage unit may be a memory.

In an implementation, the terminal includes:
a transceiver, configured to receive quasi co-location QCL indication information, where the QCL indication information indicates that a delay spread of a demodulation reference signal DMRS is associated with delay spreads of N tracking reference signals TRSs, that a Doppler spread of the DMRS is associated with Doppler spreads of the N TRSs, that an average delay of the DMRS is associated with average delays of M TRSs, and that a Doppler shift of the DMRS is associated with Doppler shifts of the M TRSs, N is greater than or equal to 2, and M is greater than or equal to 1.

Optionally, the terminal further includes a processor.

The processor is configured to determine the delay spread and the Doppler spread of the DMRS based on the delay spreads and the Doppler spreads of the N TRSs, and determine the average delay and the Doppler shift of the DMRS based on the average delays and the Doppler shifts of the M TRSs.

In another optional implementation, the terminal may alternatively perform related content in the first aspect to the fourth aspect or the sixth aspect to the eighteenth aspect by using at least the transceiver or the processor. A difference lies in that content indicated by the QCL indication information is different. Details are not described herein again.

According to a thirty-eighth aspect, this disclosure further provides a network device. The network device implements some or all functions of the network device in the method in any one of the nineteenth aspect to the thirty-sixth aspect. For example, the function of the network device may include functions in some or all embodiments of the network device in this application, or may include a function of separately implementing any embodiment of this application. The function may be implemented by using hardware, or may be implemented by hardware executing corresponding software. The hardware or the software includes one or more units or modules corresponding to the foregoing function.

In a possible design, a structure of the network device may include a processing unit and a communication unit. The communication unit is configured to support the network device in performing a corresponding function in the foregoing method. The communication unit is configured to support communication between the network device and another device. The network device may further include a storage unit. The storage unit is configured to couple to an obtaining unit and a sending unit, and stores program instructions and data that are necessary for the network device.

In an implementation, the network device includes:
a processing unit, configured to determine quasi co-location QCL indication information, where the QCL indication information indicates that a delay spread of a demodulation reference signal DMRS is associated with delay spreads of N tracking reference signals TRSs, that a Doppler spread of the DMRS is associated with Doppler spreads of the N TRSs, that an average delay of the DMRS is associated with average delays of M TRSs, and that a Doppler shift of the DMRS is associated with Doppler shifts of the M TRSs, N is greater than or equal to 2, and M is greater than or equal to 1; and
a communication unit, configured to send the QCL indication information.

In another optional implementation, the terminal may alternatively perform related content in any one of the nineteenth aspect to the twenty-second aspect or any one of the twenty-fourth aspect to the thirty-sixth aspect by using the processing unit and the communication unit. A difference lies in that content indicated by the QCL indication information is different. Details are not described herein again.

In an example, the communication unit may be a transceiver, and the processing unit may be a processor.

In an implementation, the network device includes:
a processor, configured to determine quasi co-location QCL indication information, where the QCL indication information indicates that a delay spread of a demodulation reference signal DMRS is associated with delay spreads of N tracking reference signals TRSs, that a Doppler spread of the DMRS is associated with Doppler spreads of the N TRSs, that an average delay of the DMRS is associated with average delays of M TRSs, and that a Doppler shift of the DMRS is associated with Doppler shifts of the M TRSs, N is greater than or equal to 2, and M is greater than or equal to 1; and
a transceiver, configured to send the QCL indication information.

In another optional implementation, the network device may alternatively perform related content in any one of the nineteenth aspect to the twenty-second aspect or any one of the twenty-fourth aspect to the thirty-sixth aspect by using the processor and the transceiver. A difference lies in that content indicated by the QCL indication information is different. Details are not described herein again.

In a specific implementation process, the processor may be configured to perform, for example, but not limited to, baseband related processing, and the transceiver may be configured to perform, for example, but not limited to, radio frequency receiving and sending. The foregoing components may be separately disposed on chips independent of each other, or at least some or all of the components may be disposed on a same chip. For example, the processor may be further divided into an analog baseband processor and a digital baseband processor. The analog baseband processor and the transceiver may be integrated on a same chip, and the digital baseband processor may be disposed on an independent chip. With continuous development of integrated circuit technologies, more components may be integrated on a same chip. For example, the digital baseband processor and a plurality of application processors (for example, but not limited to, a graphics processor and a multimedia processor) may be integrated on a same chip. Such a chip may be referred to as a system on chip. Whether the components are separately disposed on different chips or integrated and disposed on one or more chips usually depends on a specific requirement of a product design. Specific implementation forms of the foregoing components are not limited in this embodiment of the present application.

According to a thirty-ninth aspect, this disclosure further provides a processor, configured to perform the foregoing methods. In a process of performing the methods, processes of sending the foregoing information and receiving the foregoing information in the foregoing methods may be understood as a process of outputting the foregoing information by the processor and a process of receiving the foregoing input information by the processor. Specifically, when outputting the foregoing information, the processor outputs the information to a transceiver, so that the transceiver transmits the information. Further, after the foregoing information is output by the processor, other processing may further need to be performed on the information before the information arrives at the transceiver. Similarly, when the processor receives the foregoing input information, the transceiver receives the foregoing information, and inputs the foregoing information into the processor. Further, after the transceiver receives the foregoing information, other processing may need to be performed on the foregoing information before the information is input into the processor.

Based on the foregoing principle, for example, the receiving the QCL indication information mentioned in the foregoing methods may be understood as inputting the QCL indication information by the processor. For another example, the sending the QCL indication information may be understood as outputting the QCL indication information by the processor.

In this way, unless otherwise specified, or if operations such as transmitting, sending, and receiving related to the processor do not contradict an actual function or internal logic of the operations in related descriptions, all the operations may be more generally understood as operations such as outputting, receiving, and inputting of the processor, instead of operations such as transmitting, sending, and receiving directly performed by a radio frequency circuit and an antenna.

In a specific implementation process, the processor may be a processor specially configured to perform the methods, or may be a processor, for example, a general purpose processor, that executes computer instructions in a memory to perform the methods. The memory may be a non-transitory memory such as a read-only memory (ROM). The memory and the processor may be integrated on a same chip, or may be separately disposed on different chips. A type of the memory and a manner in which the memory and the processor are disposed are not limited in this embodiment of the present application.

According to a fortieth aspect, an embodiment of the present disclosure provides a computer storage medium, configured to store computer software instructions used by the foregoing terminal. The computer storage medium includes a program for performing any one of the first aspect to the eighteenth aspect of the foregoing methods.

According to a forty-first aspect, an embodiment of the present disclosure provides a computer storage medium, configured to store computer software instructions used by the foregoing network device. The computer storage medium includes a program for performing any one of the nineteenth aspect to the thirty-sixth aspect of the foregoing methods.

According to a forty-second aspect, this disclosure further provides a computer program product including instructions. When the computer program product runs on a computer, the computer is enabled to perform the method in any one of the first aspect to the eighteenth aspect.

According to a forty-third aspect, this disclosure further provides a computer program product including instructions. When the computer program product runs on a computer, the computer is enabled to perform the method in any one of the nineteenth aspect to the thirty-sixth aspect.

According to a forty-fourth aspect, this disclosure provides a chip system. The chip system includes a processor and an interface, and is configured to support a terminal in implementing the function in any one of the first aspect to the eighteenth aspect, for example, determining or processing at least one of the data and the information in the foregoing methods. In a possible design, the chip system further includes a memory. The memory is configured to store program instructions and data that are necessary for the terminal. The chip system may include a chip, or may include the chip and another discrete device.

According to a forty-fifth aspect, this disclosure provides a chip system. The chip system includes a processor and an interface, and is configured to support a network device in implementing the function in any one of the nineteenth aspect to the thirty-sixth aspect, for example, determining or processing at least one of the data and the information in the foregoing methods. In a possible design, the chip system further includes a memory. The memory is configured to store program instructions and data that are necessary for the network device. The chip system may include a chip, or may include the chip and another discrete device.

According to a forty-sixth aspect, this disclosure further provides a communication system. The system includes at least one terminal device and at least one network device in the foregoing aspects. In another possible design, the system may further include the another device that interacts with the terminal or the network device in the solutions provided in this application.

According to a forty-seventh aspect, this disclosure further provides a communication apparatus. The communication apparatus includes a processor and a memory. The memory is configured to store a computer program. The processor is configured to execute the computer program stored in the memory. When the computer program is executed, the communication apparatus is enabled to implement the method according to any one of the first aspect to the eighteenth aspect or the method according to any one of the nineteenth aspect to the thirty-sixth aspect. Optionally, the memory may be located outside the communication apparatus.

BRIEF DESCRIPTION OF DRAWINGS

FIG. 24 is another schematic diagram of simulation of performance improvement according to an embodiment;

DESCRIPTION OF EMBODIMENTS

The following clearly describes technical solutions in embodiments of this disclosure with reference to the accompanying drawings.

To better understand a quasi co-location (QCL) indication method provided in embodiments of this disclosure, a communication system to which embodiments are applicable is first described.

The technical solutions in this disclosure may be applied to various communication systems such as a global system for mobile communications, an LTE frequency division duplex system, an LTE time division duplex system, a universal mobile telecommunication system, or a 4G system. With continuous development of communication technologies, the technical solutions in this application may be further applied to a subsequent evolved communication system such as a 5G system or a future communication system.

The communication system in embodiments may provide a downlink service for a same terminal or receive an uplink signal of the same terminal by using a coordinated multipoint transmission/reception (COMP) technology, to resolve interference of a plurality of cells to the terminal. The coordinated multipoint transmission/reception technology may also be referred to as coordinated multistation transmission.

Figure 1:
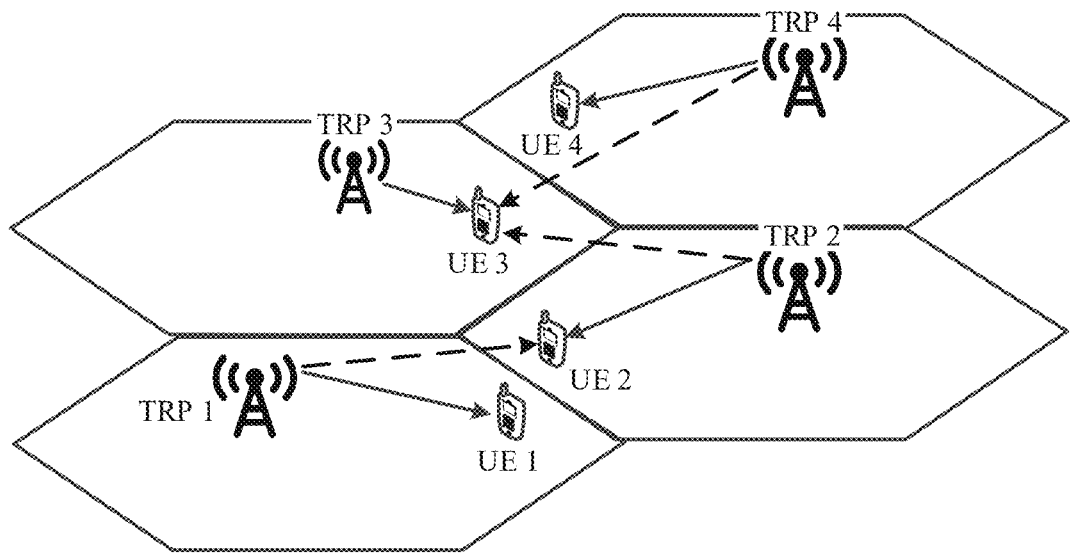
FIG. 1 is a schematic diagram of a scenario of neighboring cell interference.
Figure 2:
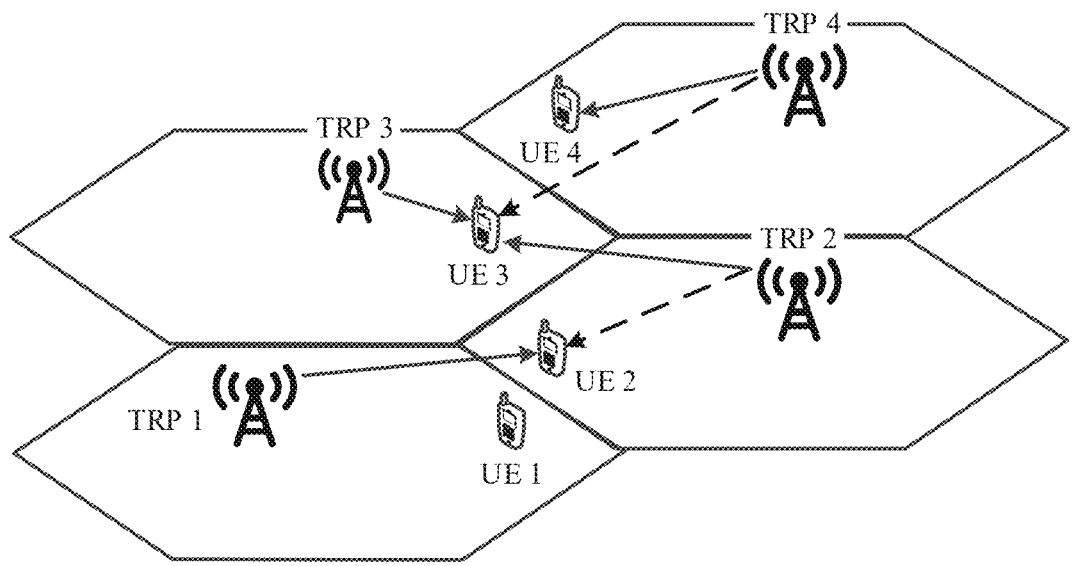
FIG. 2 is a schematic diagram of a scenario in which a DCS/DPS technology is used.

For example, as shown in FIG. 1, a dashed line represents interference of a neighboring cell to a terminal, and a solid line represents a wanted signal of a local cell. It can be learned that user equipment (UE) at a cell edge is interfered with by the neighboring cell when receiving the wanted signal of the local cell. To solve the interference problem, in a scenario, dynamic point selection/dynamic point selection (DCS/DPS) may be used in a COMP technology. That is, a network side dynamically selects a better transmission reception point (TRP) to serve the UE. In DCS/DPS, a TRP of each UE is dynamically selected. As shown in FIG. 2, compared with FIG. 1, for UE 2, when a signal of a TRP 1 is stronger than a signal of a TRP 2, a TRP of the UE 2 may dynamically switch from the TRP 2 to the TRP 1, to ensure that the UE 2 is in a stronger cell signal, and a weaker cell signal becomes interference, so that a signal to interference plus noise ratio of the signals of the UE is improved by using a difference between channels from the TRPs in two cells to the UE.

Figure 3:
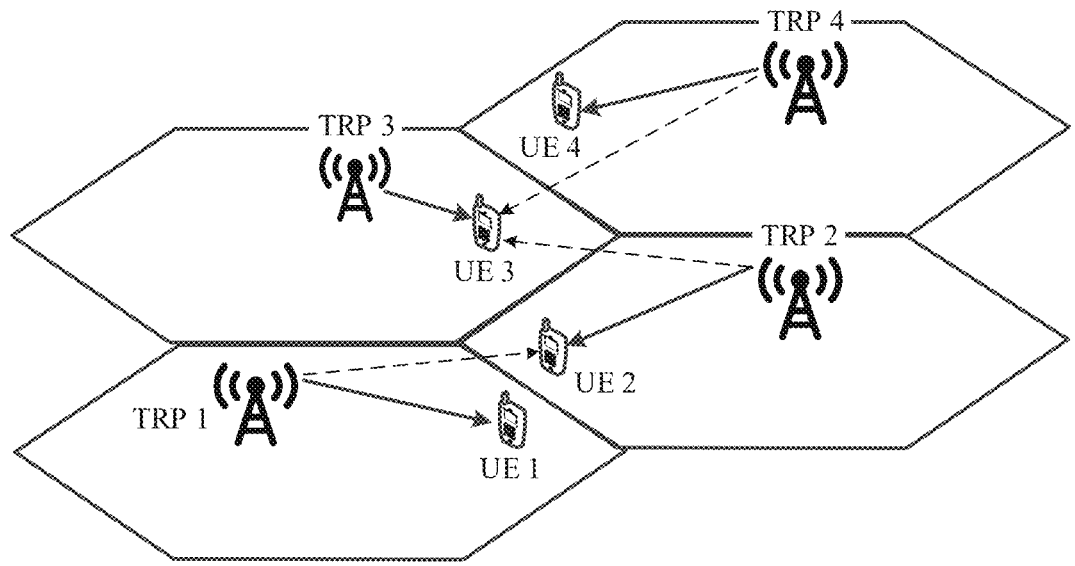
FIG. 3 is a schematic diagram of a scenario in which a CB/CS technology is used.

In another scenario, a beamforming/coordinated scheduling (CB/CS) technology may be used in a COMP technology, to serve the UE. In the CB/CS technology, the neighboring cell of the cell in which the UE is located may adjust a sent signal. As shown in FIG. 3, compared with FIG. 1, signals corresponding to dashed lines from UE 1 to UE 4 in FIG. 3 are adjusted, to avoid sending the signal to the UE in a strong interference direction, thereby reducing an interference level of the neighboring cell to the UE.

Figure 4:
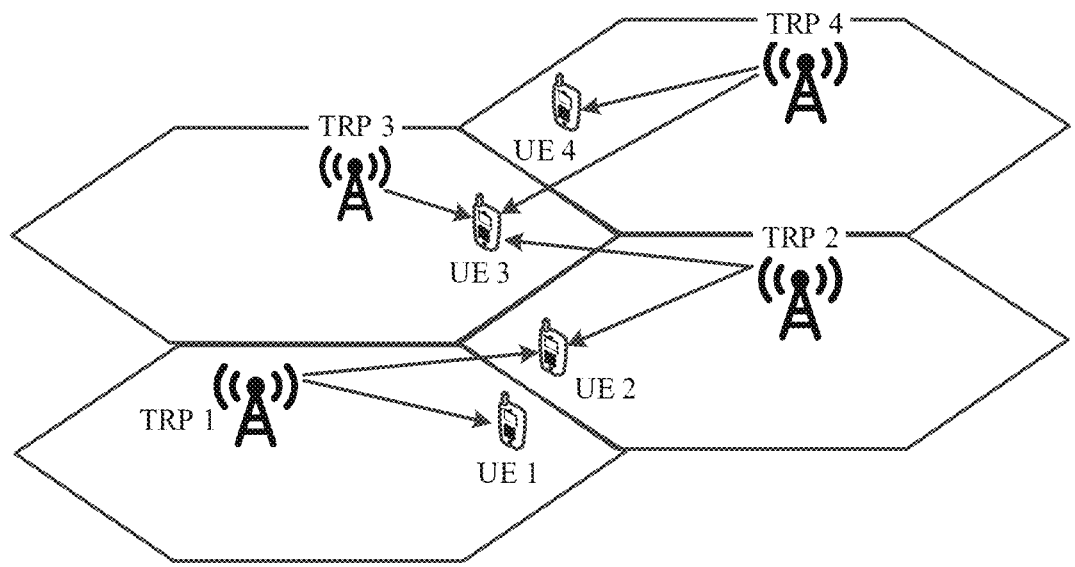
FIG. 4 is a schematic diagram of a scenario in which a JT technology is used.

In still another scenario, a joint transmission (JT) technology may be used in a COMP technology, to serve the UE. In the JT technology, a plurality of TRPs jointly send data to the UE. As shown in FIG. 4, a TRP 1 and a TRP 2 may jointly send data to UE 2, and the TRP 2, a TRP 3, and a TRP 4 may jointly send data to UE 3. In this way, the UE 2 and the UE 3 may receive a plurality of pieces of wanted data, and a transmission rate is improved.

In the JT technology, that the plurality of TRPs jointly transmit the data to the UE may include but is not limited to the following solutions: Solution 1: The plurality of TRPs transmit same data signals to the UE, and the UE does not differentiate a specific TRP from which data comes. For example, in a single frequency network (SFN) scenario, a distributed multi point (DMP) transmission scenario, a joint multi point joint transmission (JMP JT) scenario, or the like, the plurality of TRPs may transmit the same data signals to the UE, and the UE does not differentiate a specific TRP from which the data signal comes. Solution 2: The plurality of TRPs transmit different data to the UE, and the UE may differentiate a specific TRP from which data comes. For example, in a non-coherent joint transmission (NCJT) scenario, the plurality of TRPs transmit different data signals to the UE, and the UE may differentiate between the data signals from the TRPs. In addition, in coordinated multistation transmission, different TRPs may transmit data based on a same demodulation reference signal (DMRS) port or different DMRS ports. That the different TRPs transmit the data based on the different DMRS ports means data transmission of the different TRPs corresponds to the different DMRS ports. In this way, the UE may also differentiate between the different DMRS ports, and obtain channel estimation results from the different TRPs to UE.

Embodiments may be applied to communication systems such as standalone, namely, a new base station, a backhaul link, and a core network that are deployed in a future network, or may be applied to various communication systems such as non-standalone.

For example, embodiments of this disclosure may be applied to a 5th generation (5G) system which may also be referred to as a new radio (NR) system, a 6th generation (6G) system, or another future communication system; or may be applied to a device to device (D2D) system, a machine to machine (M2M) system, a long term evolution (LTE) system, or the like.

In embodiments, a network device may be a device that has a wireless transceiver function or a chip that may be disposed in the device. The network device includes but is not limited to an evolved NodeB (eNB), a radio network controller (RNC), a NodeB (NB), a base station controller (BSC), a base transceiver station (BTS), a home network device (for example, a home evolved NodeB, or a home NodeB, HNB), a baseband unit (BBU), an access point (AP) in a wireless fidelity (Wi-Fi) system, a wireless relay node, a wireless backhaul node, a transmission point (transmission and reception point, TRP or transmission point, TP), and the like; may be a device used in a 5G system, a 6G system, or even a 7G system, for example, a gNB or a transmission point (TRP or TP) in an NR system, or one antenna panel or a group of (including a plurality of antenna panels) antenna panels of a network device in the 5G system; or may be a network node that constitutes a gNB or a transmission point, for example, a baseband unit (BBU), a distributed unit (DU), or a picocell, a femtocell, or a road side unit (RSU) in a vehicle to everything (V2X) or intelligent driving scenario.

In embodiments, a terminal device may include but is not limited to user equipment (UE), an access terminal device, a subscriber unit, a subscriber station, a mobile station, a remote station, a remote terminal device, a mobile device, a user terminal device, a user agent, a user apparatus, or the like. For another example, the terminal device may be a mobile phone, a tablet (Pad), a computer with a wireless transceiver function, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, a wireless terminal or an RSU of a wireless terminal type in V2X vehicle to everything, or the like.

In some deployments, the gNB may include a central unit (CU) and the distributed unit (DU). The gNB may further include an active antenna unit (AAU). The CU implements some functions of the gNB, and the DU implements some functions of the gNB. For example, the CU is responsible for processing a non-real-time protocol and service, to implement functions of a radio resource control (RRC) layer and a packet data convergence protocol (PDCP) layer. The DU is responsible for processing a physical layer protocol and a real-time service, to implement functions of a radio link control (RLC) layer, a medium access control (MAC) layer, and a physical (PHY) layer. The AAU implements a part of physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, or an AAU node. In addition, the CU may be classified as a network device in a radio access network (RAN), or may be classified as a network device in a core network (CN). This is not limited in this application.

Figure 5:
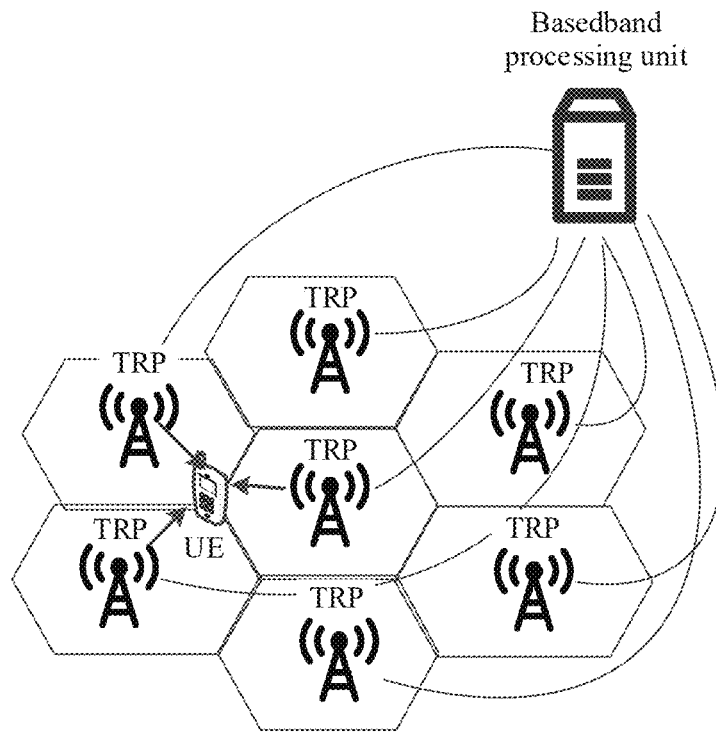
FIG. 5 is a schematic diagram of an architecture of a plurality of TRPs.

In embodiments of this application, the plurality of TRPs shown in FIG. 1 to FIG. 4 may be physically one group of antennas substantially. For example, as shown in FIG. 5, a baseband processing unit of one base station is located at one geographical location, and the baseband processing unit may be connected to radio frequency processing units at a plurality of geographical locations. A distance from the baseband processing unit to the radio frequency processing unit may be 100 meters, and the baseband processing unit and the radio frequency processing unit may be connected by using an optical fiber. Therefore, transmission time between the baseband processing unit and the radio frequency processing unit is short, and a transmission capacity is large. In this way, after processing a baseband signal, for example, generating a signal of a control channel, the baseband processing unit may transmit the signal to a plurality of transmission and reception points, and each transmission and reception point sends a control channel thereof. Therefore, a plurality of TRPs or a plurality of network devices that perform coordinated transmission in embodiments of this disclosure may belong to different radio frequency processing units of a same base station or belong to different base stations. The TRPs and the network devices may be replaced with each other. For example, a TRP 1 may be replaced with a first network device, and a TRP 2 may be replaced with a second network device. This is not limited in this disclosure.

For ease of understanding of embodiments disclosed, the following two points are described.

(1) In embodiments disclosed in this disclosure, an NR network scenario in a wireless communication network is used as an example of scenarios for description. It should be noted that the solutions in embodiments disclosed in this disclosed may be further applied to another wireless communication network, and a corresponding name may also be replaced with a name of a corresponding function in the another wireless communication network.

(2) Aspects, embodiments, or features of this disclosure are presented in embodiments by describing a system that includes a plurality of devices, components, modules, and the like. It should be appreciated and understood that each system may include another device, component, module, and the like, and may not include all devices, components, modules, and the like discussed with reference to the accompanying drawings. In addition, a combination of the solutions may be further used.

For ease of understanding embodiments of this disclosure, some concepts are described.

1. Quasi Co-Location (QCL) Relationship

That two antenna ports have a QCL relationship means that a large-scale channel parameter of one antenna port may be inferred from a large-scale channel parameter conveyed by the other antenna port. Alternatively, if two antenna ports have a QCL relationship, a large-scale channel feature of one port for transmitting one signal may be inferred from a large-scale channel feature of the other port for transmitting one signal. Briefly, the two signals have a QCL relationship. The signals corresponding to the antenna ports that have a QCL relationship have a same parameter, a parameter of one antenna port may be for determining a parameter of the other antenna port that has a QCL relationship with the antenna port, the two antenna ports have a same parameter, or a parameter difference between the two antenna ports is less than a threshold.

In the QCL relationship, a referenced signal may be a source signal, a source reference signal, or a referenced reference signal, and the other signal may be referred to as a target signal or a target reference signal.

In this disclosure, that a signal 1 and a signal 2 have a QCL relationship also means that an antenna port corresponding to the signal 1 and an antenna port corresponding to the signal 2 have a QCL relationship. Therefore, for brevity of description, a manner in which signals has a QCL relationship or a manner in which channel parameters of signals are associated with each other is mainly for description.

The source signal may be, for example but not limited to, a channel state information reference signal (CSI-RS), a synchronization signal block (SSB), a synchronization signal and physical broadcast channel block (SSPBCHB), a primary synchronization signal (PSS), a secondary synchronization signal (SSS), or a physical downlink control channel (PDCCH). If a CSI-RS configured for a terminal is for performing at least time tracking or frequency tracking, the CSI-RS for tracking may be referred to as a tracking reference signal (TRS) for short.

The target signal may be, for example but not limited to, a DMRS, a CSI-RS, or a single sidelink signal. The DMRS may be on a physical downlink control channel (PDCCH) or a physical downlink shared channel (PDSCH), and the DMRS is for performing channel estimation, to demodulate the PDCCH or the PDSCH by using a channel estimation result.

The target signal and the source signal that have a QCL relationship may belong to signals of a same type but with different indexes, or may belong to signals of different types. For example, both the source signal and the target signal may be CSI-RSs, but have different indexes. For another example, the source signal is a CSI-RS, and the target signal is a DMRS.

A large-scale channel parameter of a signal may include one or more of the following: an average gain, an average delay, a delay spread, a Doppler shift, a Doppler spread, or a spatial parameter.

The spatial parameter may include one or more of the following parameters: an angle of incidence (AoA), a dominant angle of incidence AoA, an average angle of incidence, a power angular spectrum (PAS) of the angle of incidence, an angle of departure (AOD), a dominant angle of departure (Dominant AoD), an average angle of departure (average AoD), an angle of arrival (AOA), a dominant angle of arrival (Dominant AoA), an average angle of arrival (average AoA), a channel correlation matrix, a power angle spread spectrum of the angle of arrival, a power angle spread spectrum of the angle of departure, transmit channel correlation, receive channel correlation, transmit beamforming, receive beamforming, spatial channel correlation, a spatial filter, a spatial filtering parameter, a spatial receive parameter (spatial Rx parameter), and the like.

Currently, four types of QCL relationships are defined in the standard, and large-scale channel parameters of different types of QCL relationships are also different. For example:

QCL type A relationship: a Doppler shift, a Doppler spread, an average delay, and a delay spread;

QCL type B relationship: a Doppler shift and a Doppler spread;

QCL type C relationship: an average delay and a Doppler shift; and

QCL type D relationship: a spatial Rx parameter.

The Doppler shift may be translated into a Doppler shift, a Doppler shift, or a Doppler shift.

Large-scale channel parameters of the source signal and the target signal that have a QCL relationship include a same parameter. For example, if the source signal and the target signal have QCL type A, it indicates that a Doppler shift, a Doppler spread, an average delay, and a delay spread of the target signal may be inferred by using a Doppler shift, a Doppler spread, an average delay, and a delay spread of the source signal.

2. Transmission Configuration Indication (TCI)

A TCI field is a field that is in downlink control information (DCI) and that indicates quasi co-location (QCL) of DMRSs on a PDSCH or a PDCCH, or is for configuring a QCL relationship between a DMRS on the PDSCH or the PDCCH and one or more downlink reference signals, and may be understood as a channel feature of a PDSCH or PDCCH transmission process this time. Therefore, the terminal can learn of a large-scale channel parameter of the DMRS on the received PDSCH based on a TCI state indicated by the TCI field, and then demodulate the PDSCH based on channel estimation.

Optionally, the TCI state may alternatively not be indicated by using the DCI, for example, may be obtained by using an RRC configuration, a MAC CE indication, or joint determining of a MAC CE and the DCI. Alternatively, a QCL relationship between a source signal and a target signal and a channel parameter that are indicated by QCL indication information in some embodiments of this specification may be obtained in a predefined manner. For example, the source signal that has a QCL relationship with the target signal and the channel parameter are predefined, and it does not need to be indicated that the source signal that has a QCL relationship with the target signal and the channel parameter belong to a specific TCI state.

It should be noted that the QCL indication information in embodiments of this application may indicate, but is not limited to, a plurality of TCI states. In some embodiments, the QCL indication information may further indicate other parameter information. For details, refer to related content in subsequent embodiments. Optionally, the TCI field is for configuring the QCL relationship between the DMRS on the PDSCH or the PDCCH and the one or more downlink reference signals. The one or more downlink reference signals and one or more types of QCL relationships associated with the one or more types of downlink reference signals may be summarized as QCL configuration information, and different TCI states may be associated with or correspond to different QCL configuration information. Optionally, a piece of QCL configuration information may also be referred to as a piece of QCL information or a QCL assumption.

The downlink reference signal may be the foregoing source signal. Details are not described herein again.

In coordinated multistation transmission, different TRPs are located at different geographical locations, and TCI states of channels between all TRPs and the terminal are also different. In embodiments, transmission performed once includes parallel transmission of a plurality of PDSCHs. Therefore, a network device needs to configure TCI states of the plurality of PDSCHs for the terminal. That is, the plurality of TCI states may be indicated by a same TCI field in one piece of DCI from one TRP, or may be indicated by a plurality of TCI fields. Alternatively, the plurality of TCI states may be transmitted by a plurality of pieces of DCI from different TRPs. In other words, for the terminal, different TRPs have different TCI states in a coordinated PDSCH transmission process. The TCI state may be referred to as TCI for short.

3. DMRS Port Corresponding to a TRS

In the scenario in the foregoing solution 1 or solution 2, DMRS ports corresponding to data transmission of different TRPs may be the same or different. Correspondingly, DMRS ports respectively corresponding to source signals, for example, TRSs, indicated by TCI states of the different TRPs may also be the same or different. To be specific, if the DMRS ports corresponding to the data transmission of the different TRPs may be the same, the DMRS ports corresponding to the TRSs respectively indicated by the different TCI states are also the same; or if the DMRS ports corresponding to the data transmission of the different TRPs may be different, the DMRS ports corresponding to the TRSs respectively indicated by the different TCI states are also different.

As described above, in coordinated multistation transmission, different TRPs are deployed at different geographical locations, and channels for arriving at a terminal are also different. Further, large-scale channel parameters of the channels are also different. Consequently, delays of transmitted signals from the different TRPs to the terminal are different, and Dopplers of the transmitted signals from the different TRPs to the terminal are different. The different delays are caused by different transmission delays caused by different clock precision, clock calibration deviations, and distances to the terminal of the different TRPs. The different signal delays cause time-domain interference, inter-symbol interference, inter-carrier interference, and the like on a PDSCH in coordinated transmission. The different Dopplers are caused by different angles of relative motion between the different TRPs and the terminal. However, the different Dopplers cause different frequency offsets of signals, and then carrier interference is caused.

Figure 6:
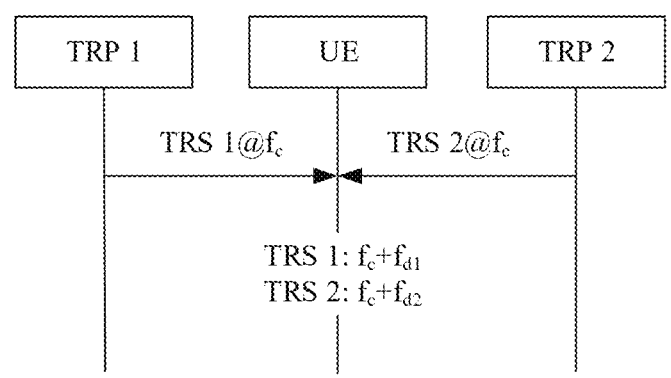
FIG. 6 is a schematic diagram of a Doppler shift of a channel between a TRP 1 and UE and a Doppler shift of a channel between a TRP 2 and the UE.

FIG. 6 is a schematic diagram of a Doppler shift of a channel between a TRP 1 and UE and a Doppler shift of a channel between a TRP 2 and the UE. A quantity and forms of devices in FIG. 6 are used as an example, and do not constitute a limitation of this embodiment. In FIG. 6, an example in which the TRP 1 and the TRP 2 coordinate to transmit data for one terminal is used. The TRP 1 and the TRP 2 are deployed at different geographical locations, and the TRP 1 and the TRP 2 may send a TRS 1 and a TRS 2 at respective center frequencies. If the TRP 1 and the TRP 2 are inter-frequency, the center frequencies of the TRP 1 and the TRP 2 are different. If the TRP 1 and the TRP 2 are intra-frequency, the center frequencies may be the same. In FIG. 6, a center frequency fc is used as an example.

The TRP 1 sends the TRS 1 at the center frequency fc, and the TRP 2 sends the TRS 2 at the center frequency fc.

Because channels from the TRP 1 and the TRP 2 to the terminal are different, Dopplers are different. Therefore, the Doppler shift of the TRS I sent by the TRP 1 to the terminal is $f_{d1}$, and the Doppler shift of the TRS 2 sent by the TRP 2 to the terminal is $f_{d2}$.

It is assumed that one piece of DCI is used for transmitting TCI states of the TRP 1 and the TRP 2, where a TCI state 1 corresponds to the TRS 1, and a TCI state 2 corresponds to the TRS 2. The terminal infers, based on a large-scale channel parameter of the TRS 1, that a corresponding DMRS receiving frequency is $f_c+f_{d1}$, and the terminal infers, based on a large-scale channel parameter of the TRS 2, that a corresponding DMRS receiving frequency is $f_c+f_{d2}$.

It can be learned that receiving frequencies of DMRSs and PDSCHs that are separately transmitted by the TRP 1 and the TRP 2 are different. Consequently, inter-carrier interference occurs on the DMRSs and the PDSCHs that arrive at the terminal, and a multistation transmission performance loss is caused.

This disclosure provides a QCL indication method 1100. The method is applicable to coordinated multistation transmission. In the method, a terminal may receive QCL indication information, where the QCL indication information may indicate that a delay spread of a DMRS is associated with delay spreads of N TRSs and that a Doppler shift of the DMRS is associated with Doppler shifts of M TRSs, N is greater than or equal to 2, and M is greater than or equal to 1.

It can be learned that the method is beneficial to a scenario in which DMRS ports corresponding to the N TRSs are same, and the delay spread of the DMRS is obtained based on the delay spreads of the N TRSs, to combine multipath delay features of different TRPs to the terminal, and help improve DMRS channel estimation accuracy. In addition, the method helps a network device send a DMRS in a frequency offset compensation manner, so that frequency offsets of DMRSs from the different TRPs are consistent, to avoid carrier interference. In addition, the terminal is notified of a compensated reference frequency offset by using the Doppler shifts of the M TRSs, so that the terminal is prevented from receiving compensated DMRSs by using a wrong reference frequency offset. Therefore, the method can improve multistation transmission performance.

This disclosure provides another QCL indication method 1200. The method is applicable to coordinated multistation transmission. In the method, a terminal may receive QCL indication information, where the QCL indication information may indicate that a Doppler spread of a DMRS is associated with Doppler spreads of N TRSs and that an average delay of the DMRS is associated with average delays of M TRSs, N is greater than or equal to 2, and M is greater than or equal to 1.

It can be learned that the method is beneficial to a scenario in which DMRS ports corresponding to the N TRSs are same, and the Doppler spread of the DMRS is obtained based on the Doppler spreads of the N TRSs, to combine different Doppler features of different TRPs to the terminal, and help improve DMRS channel estimation accuracy. In addition, the method helps a network device send a DMRS in a delay compensation manner, so that delays of DMRSs from the different TRPs are consistent, to avoid inter-symbol interference. In addition, the terminal is notified of a compensated reference delay by using the average delays of the M TRSs, so that the terminal is prevented from receiving the DMRSs by using a wrong reference delay. Therefore, the method can improve multistation transmission performance.

This disclosure provides still another QCL indication method 1300. The method is applicable to coordinated multistation transmission. In the method, a terminal may receive QCL indication information, where the QCL indication information may indicate that a Doppler spread of a DMRS is associated with Doppler spreads of N TRSs, that a delay spread of the DMRS is associated with delay spreads of the N TRSs, a Doppler shift of the DMRS is associated with Doppler shifts of M TRSs, and that an average delay of the DMRS is associated with average delays of the M TRSs, N is greater than or equal to 2, and M is greater than or equal to 1.

It can be learned that the method is beneficial to a scenario in which DMRS ports corresponding to the N TRSs are same, the Doppler spread of the DMRS is obtained based on the Doppler spreads of the N TRSs, and the delay spread of the DMRS is obtained based on the delay spreads of the N TRSs, to combine multipath features of different TRPs to the terminal, and help improve DMRS channel estimation accuracy. In addition, the method helps a network device send a DMRS in a delay-frequency offset compensation manner, so that frequency offsets and delays of DMRSs from the different TRPs are consistent, to avoid inter-symbol interference and inter-carrier interference. In addition, the terminal is notified of a compensated reference delay and reference frequency offset by using the average delays and the Doppler shifts of the M TRSs, so that the terminal is prevented from receiving the DMRSs by using a wrong reference delay and reference frequency offset. Therefore, the method can improve multistation transmission performance.

In addition, this disclosure further provides a QCL indication method 1400 to a QCL indication method 1900. A difference from the foregoing methods lies in that time-frequency spread information and delay-frequency offset information that are indicated by QCL indication information is different. The time-frequency spread information may include at least a delay spread or a Doppler spread, and the delay-frequency offset information may include at least an average delay or a Doppler shift. Therefore, in addition to the foregoing method in which the QCL indication information indicates the delay spread and the Doppler shift, the foregoing method in which the QCL indication information indicates the Doppler spread and the average delay, and the foregoing method in which the QCL indication information indicates the Doppler spread, the delay spread, the average delay, and the Doppler shift, other methods are as follows.

In the QCL indication method 1400, the QCL indication information indicates that a Doppler spread of a DMRS is associated with Doppler spreads of N TRSs, that a delay spread of the DMRS is associated with delay spreads of the N TRSs, and that a Doppler shift of the DMRS is associated with Doppler shifts of M TRSs.

In the QCL indication method 1500, the QCL indication information may indicate that a Doppler spread of a DMRS is associated with Doppler spreads of N TRSs, that a delay spread of the DMRS is associated with delay spreads of the N TRSs, and that an average delay of the DMRS is associated with average delays of M TRSs.

In the QCL indication method 1600, the QCL indication information may indicate that a Doppler spread of a DMRS is associated with Doppler spreads of N TRSs, that a Doppler shift of the DMRS is associated with Doppler shifts of M TRSs, and that an average delay of the DMRS is associated with average delays of the M TRSs.

In the QCL indication method 1700, the QCL indication information may indicate that a delay spread of a DMRS is associated with delay spreads of N TRSs, that a Doppler shift of the DMRS is associated with Doppler shifts of M TRSs, and an average delay of the DMRS is associated with average delays of the M TRSs.

In the QCL indication method 1800, the QCL indication information may indicate that a Doppler spread of a DMRS is associated with Doppler spreads of N TRSs and that a Doppler shift of the DMRS is associated with Doppler shifts of M TRSs.

In a QCL indication method 1900, the QCL indication information may indicate that a delay spread of a DMRS is associated with delay spreads of N TRSs and that an average delay of the DMRS is associated with average delays of M TRSs.

In embodiments of this disclosure, that the delay spread of the DMRS is associated with the delay spreads of the N TRSs may alternatively be expressed as follows: The DMRS and the N TRSs have a QCL relationship, and a large-scale channel parameter corresponding to the QCL relationship includes a delay spread; or the DMRS and the N TRSs satisfy a QCL relationship in terms of a delay spread. In this way, the delay spread of the DMRS may be obtained based on the delay spreads of the N TRSs.

In embodiments of this disclosure, that the Doppler spread of the DMRS is associated with the Doppler spreads of the N TRSs may alternatively be expressed as follows: The DMRS and the N TRSs have a QCL relationship, and a large-scale channel parameter corresponding to the QCL relationship includes a Doppler spread; or the DMRS and the N TRSs satisfy a QCL relationship in terms of a Doppler spread. In this way, the Doppler spread of the DMRS may be obtained based on the Doppler spreads of the N TRSs.

In embodiments of this disclosure, that the average delay of the DMRS is associated with the average delays of the M TRSs may alternatively be expressed as follows: The DMRS and the M TRSs have a QCL relationship, and a large-scale channel parameter corresponding to the QCL relationship includes an average delay; or the DMRS and the M TRSs satisfy a QCL relationship in terms of an average delay. In this way, the average delay of the DMRS may be obtained based on the average delays of the M TRSs.

In embodiments of this disclosure, that the Doppler shift of the DMRS is associated with the Doppler shifts of the M TRSs may alternatively be expressed as follows: The DMRS and the M TRSs have a QCL relationship, and a large-scale channel parameter corresponding to the QCL relationship includes a Doppler shift; or the DMRS and the M TRS satisfy a QCL relationship in terms of a Doppler shift. In this way, the Doppler shift of the DMRS may be obtained based on the Doppler shifts of the M TRSs.

The M TRSs may be some of the N TRSs, or may be M additional TRSs.

This disclosure further provides a QCL indication method 2100 to a QCL indication method 2900. The QCL indication method 2100 to the QCL indication method 2900 respectively correspond to the QCL indication method 1100 to the QCL indication method 1900. A difference lies in that the QCL indication method 1100 to the QCL indication method 1900 are applicable to a case in which DMRS ports corresponding to N TRSs in a coordinated transmission scenario of N TRPs are the same, and the QCL indication method 2100 to the QCL indication method 2900 are applicable to a case in which DMRS ports corresponding to N TRSs in a coordinated transmission scenario of N TRPs are different.

The QCL indication method 2100 corresponds to the QCL indication method 1100, and a difference from the QCL indication method 1100 lies in that a delay spread of each DMRS is obtained based on a delay spread of a corresponding TRS and that a Doppler shift of the DMRS is obtained based on Doppler shifts of M TRSs. In the method 2100, the delay spread of the DMRS may be different, but the Doppler shift of the DMRS is the same. In this way, when the TRSs correspond to the different DMRS ports, channel estimation is more accurate by using the delay spread of the corresponding TRS. According to the method, DMRSs and PDSCHs can be further received based on a uniform reference frequency offset, to avoid a problem of transmission performance deterioration caused by using a wrong reference frequency offset by a terminal when a network device performs frequency offset compensation to send the DMRSs and the PDSCHs. Therefore, the method helps improve multistation transmission performance.

The QCL indication method 2200 corresponds to the QCL indication method 1200, and a difference from the QCL indication method 1200 lies in that a Doppler spread of each DMRS is obtained based on a Doppler spread of a corresponding TRS and that an average delay of the DMRS is obtained based on average delays of M TRSs. In the method, a Doppler spread of the DMRS may be different, but the average delay of the DMRS is the same. In this way, when the TRSs correspond to the different DMRS ports, channel estimation is more accurate by using the Doppler spread of the corresponding TRS. According to the method, DMRSs and PDSCHs can be further received based on a uniform average delay, to avoid a problem of transmission performance deterioration caused by using a wrong reference delay by a terminal when a network device performs delay compensation to send the DMRSs and the PDSCHs. Therefore, the method helps improve multistation transmission performance.

The QCL indication method 2300 corresponds to the QCL indication method 1300, and a difference from the QCL indication method 1300 lies in that a delay spread of each DMRS is obtained based on a delay spread of a corresponding TRS, that a Doppler spread of the DMRS is obtained based on a Doppler spread of the corresponding TRS, that a Doppler shift of the DMRS is obtained based on Doppler shifts of M TRSs, and that an average delay of the DMRS is obtained based on average delays of the M TRSs. In the method, the delay spread and the Doppler spread of the DMRS may be different. When the TRSs correspond to the different DMRS ports, channel estimation is more accurate by using the delay spread and the Doppler spread of the corresponding TRS. According to the method, DMRSs and PDSCHs can be further received based on a unified average delay and Doppler shift, to avoid a problem of transmission performance deterioration caused by using a wrong reference delay and reference frequency offset by a terminal when a network device performs delay-frequency offset compensation to send the DMRSs and the PDSCHs. Therefore, the method helps improve multistation transmission performance.

For related content and analysis of beneficial effects of the QCL indication method 2400 to the QCL indication method 2900, refer to the foregoing descriptions. Details are not described herein again.

In addition, in embodiments of this disclosure, N TRPs may correspond to N TCI states, and a QCL relationship associated with a TRS in QCL information indicated by each TCI state may be different in different QCL indication methods. M TRSs in embodiments of this disclosure may be another TRS or a same TRS in QCL information indicated by M of the N TCI states. Alternatively, M TRSs in embodiments are some of the N TRSs indicated by M additional TCI states different from the N TCI states, or are additional TRSs. This is not limited in this disclosure.

In a case, the N TRSs are associated with time-frequency spread information such as at least a delay spread or a Doppler spread, and the M TRSs are associated with delay-frequency offset information such as at least an average delay or a Doppler shift. Therefore, an indication manner of the QCL indication information may include but is not limited to the following several implementations:

Implementation 1.1: The QCL indication information indicates the N TCI states, where a TRS included in QCL information indicated by each of the M TCI states is associated with time-frequency spread information and delay-frequency offset information; and QCL information indicated by each of L remaining TCI states includes one TRS, and the TRS is associated with time-frequency spread information. L is greater than or equal to 1, and a sum of L and M is equal to N.

If the M TRSs associated with the delay-frequency offset information are some of the N TRSs associated with the time-frequency spread information, the QCL information indicated by each of the M TCI states includes one TRS, the TRS is associated with time-frequency spread information and delay-frequency offset information, and the TRS the in QCL information indicated by each of the L remaining TCI states may be associated with only the time-frequency spread information.

If the M TRSs associated with the delay-frequency offset information are not some of the N TRSs associated with the time-frequency spread information, the QCL information indicated by each of the M TCI states includes two TRSs, one TRS is associated with time-frequency spread information, the other TRS is associated with delay-frequency offset information, and the TRS the in QCL information indicated by each of the L remaining TCI states may be associated with only the time-frequency spread information. L is greater than or equal to 1, and a sum of L and M is equal to N.

Implementation 1.2: The QCL indication information indicates the N TCI states, the QCL information indicated by each TCI state includes one TRS, and the TRS is associated with time-frequency spread information and delay-frequency offset information. In addition, a network device side further notifies a terminal of the following information: Delay-frequency offset information indicated by L TCI states is unavailable, and delay-frequency offset information indicated by the M TCI states is applicable to the L remaining TCI states. L is greater than or equal to 1, and a sum of L and M is equal to N.

Implementation 1.2.1: A manner in which the network device side notifies the terminal of the foregoing information may include but is not limited to the following manner: In M of the N TCI states, a priority of a TRS associated with delay-frequency offset information is higher than a priority of a TRS associated with delay-frequency offset information in the L remaining TCI states. Therefore, in the M TCI states, the delay-frequency offset information associated with the TRS may cover the delay-frequency offset information associated with the TRS in the L remaining TCI states.

In QCL information indicated by a same TCI state, a TRS associated with delay-frequency offset information and a TRS associated with time-frequency spread information and delay-frequency offset information may belong to a same TRS, or may belong to different TRSs.

It can be learned that in Implementation 1.2, some TCI states can indicate TRSs of two types of QCL relationships, to avoid using an additional TCI to indicate TRSs of different types of QCL relationships, and help reduce signaling overheads required by the QCL indication information.

Implementation 1.2.2: A manner in which the network device side notifies the terminal of the foregoing information may include but is not limited to the following manner: In addition to indicating the N TCI states, the QCL indication information further indicates the M additional TCI states, where QCL information indicated by each of the M TCI states includes one TRS, and the TRS is associated with only delay-frequency offset information. In addition, a priority of a TRS associated with delay-frequency offset information in the M TCI states is higher than a priority of a TRS associated with time-frequency spread information and delay-frequency offset information in the N TCI states (or a definition is that a TRS associated with delay-frequency offset information may cover a TRS associated with time-frequency spread information and delay-frequency offset information).

The TRS that is associated with only the delay-frequency offset information and the TRS that is associated with the time-frequency spread information and the delay-frequency offset information may be a same TRS, or may be different TRSs. It can be learned that in this implementation, an additional TCI may indicate delay-frequency offset information, to help improve indication flexibility of the delay-frequency offset information.

Implementation 1.3: The QCL indication information indicates the N TCI states, the QCL information indicated by each TCI state includes one TRS, and the TRS is associated with time-frequency spread information. Each of the M TCI states further indicates one TRS, and the TRS is associated with delay-frequency offset information. Alternatively, the QCL indication information further additionally indicates the M TCI states, each TCI state indicates one TRS, and the TRS is associated with delay-frequency offset information. In other words, Implementation 1.3 may include but is not limited to Implementation 1.3.1 and Implementation 1.3.2.

Implementation 1.3.1: The QCL indication information indicates the N TCI states, the QCL information indicated by each TCI state includes one TRS, and the TRS is associated with the time-frequency spread information. In addition, QCL information indicated by each of the M TCI states further includes one TRS, and the TRS is associated with the delay-frequency offset information.

Implementation 1.3.2: The QCL indication information indicates the N TCI states, the QCL information indicated by each TCI state includes one TRS, and the TRS is associated with the time-frequency spread information. In addition, the QCL indication information further indicates the M additional TCI states, QCL information indicated by each TCI state includes one TRS, and the TRS is associated with delay-frequency offset information.

In Implementation 1.3, the TRS that is associated with the delay-frequency offset information and that is indicated by the M TCI states and the TRS that is associated with the time-frequency spread information may be a same TRS, or may be different TRSs. TRSs indicated by the M TCI states may be sent by a network device in N network devices that perform coordinated transmission. However, when a same network device sends a plurality of TRSs, sending frequencies of the plurality of TRSs may be different. This is related to a value of a reference delay or a reference frequency offset that the network device notifies the terminal of by using the M TRSs.

In addition, in addition to indicating the time-frequency spread information and the delay-frequency offset information in Implementation 1.1 to Implementation 1.3 above, in a high-frequency communication scenario, the QCL indication information in embodiments of this application may indicate, by using some of the N TCI states or an additional TCI state, a TRS and a spatial parameter associated with the TRS, to help improve multistation transmission performance in a coordinated multistation scenario in combination with the high-frequency communication scenario. A related implementation in which some of the N TCI states or the additional TCI state indicates the TRS and the spatial parameter associated with the TRS is similar to the manner of indicating the delay-frequency offset information in Implementation 1.1 to Implementation 1.3, and a difference lies in that indicated parameters are different. Details are not described herein again.

In addition, in embodiments of this disclosure, the N TCI states, or the N TCI states and the M TCI states may be located in a same TCI field, or may be located in a plurality of TCI fields. The N TCI states, or the N TCI states and the M TCI states may be transmitted by using a same piece of DCI, or may be transmitted by using a plurality of pieces of DCI.

If a plurality of pieces of DCI indicate the association relationships indicated by the foregoing various QCL indication information, there may be but not limited to the following implementations:

Implementation 2.1: QCL information indicated by each of M of N pieces of DCI includes one TRS, the TRS is associated with time-frequency spread information and delay-frequency offset information, QCL information indicated by each of L remaining pieces of DCI includes one TRS, and the TRS is associated with time-frequency spread information. L is greater than or equal to 1, and a sum of L and M is equal to N.

Implementation 2.2: QCL information indicated by each of N pieces of DCI includes one TRS, and the TRS is associated with time-frequency spread information and delay-frequency offset information. In addition, "a network device side further notifies a terminal of the following information: Delay-frequency offset information indicated by each of L pieces of DCI is unavailable, and delay-frequency offset information indicated by each of M pieces of DCI is applicable to the L remaining pieces of DCI. L is greater than or equal to 1, and a sum of L and M is equal to N". Alternatively, "the terminal may learn of available delay-frequency offset information based on Implementation 2.2.1 or Implementation 2.2.2".

Implementation 2.2.1: A manner in which the network device side notifies the terminal of the foregoing information may include but is not limited to the following manner: In M of the N pieces of DCI, a priority of a TRS associated with delay-frequency offset information is higher than a priority of a TRS associated with delay-frequency offset information in the L remaining pieces of DCI. Therefore, in the M pieces of DCI, the delay-frequency offset information associated with the TRS may cover the delay-frequency offset information associated with the TRS in the L remaining pieces of DCI.

Implementation 2.2.2: A manner in which the network device side notifies the terminal of the foregoing information may include but is not limited to the following manner: QCL information indicated by each of M additional pieces of DCI includes one TRS, and the TRS is associated with only delay-frequency offset information. In addition, a priority of a TRS that is associated with delay-frequency offset information and that is indicated by the M pieces of DCI is higher than a priority of a TRS that is associated with time-frequency spread information and delay-frequency offset information and that is indicated by the N pieces of DCI (or a definition is that a TRS associated with delay-frequency offset information may cover a TRS associated with time-frequency spread information and delay-frequency offset information).

The TRS that is associated with only the delay-frequency offset information and the TRS that is associated with the time-frequency spread information and the delay-frequency offset information may be a same TRS, or may be different TRSs. It can be learned that in this implementation, additional DCI may indicate delay-frequency offset information, to help improve indication flexibility of the delay-frequency offset information.

Implementation 2.3: QCL information indicated by each of M of N pieces of DCI includes one TRS, and the TRS is associated with time-frequency spread information; and QCL information indicated by each of L remaining pieces of DCI includes one TRS, and the TRS is associated with time-frequency spread information and delay-frequency offset information.

In addition, the QCL information indicated by each of the M pieces of DCI further includes another TRS, and the TRS is associated with delay-frequency offset information. However, the TRS associated with the delay-frequency offset information and the TRS associated with the delay-frequency offset information in the QCL information indicated by the L remaining pieces of DCI are a same TRS.

In addition, in a case of the plurality of pieces of DCI, the terminal needs to differentiate between DCI of different TRPs. In this case, the DCI of the different TRPs belongs to different CORESET groups, and has different CORESET group identifiers. For example, in Implementation 2.3, a TRP 1 and a TRP 2 coordinate to transmit data for the terminal. DCI 1 sent by the TRP 1 is associated with a CORESET group identifier value 0. DCI 2 sent by the TRP 2 is associated with a CORESET group identifier value 1. In addition, a TRS 1 indicated by the DCI 1 is associated with time-frequency spread information and delay-frequency offset information. A TRS 1 indicated by the DCI 2 is associated with delay-frequency offset information. A TRS 2 indicated by the DCI 2 is associated with time-frequency spread information. It can be learned that the DCI 2 may indicate, by using carried QCL indication information, the TRS 1 and the delay-frequency offset information associated with the TRS 1, so that the terminal can learn that a reference delay-frequency offset information is determined based on the TRS 1. This helps the TRP 2 compensate for a to-be-sent DMRS and PDSCH based on the reference delay-frequency offset information, to avoid that signal delays or Dopplers of the DMRS and the PDSCH that are sent by the TRP 2 to the terminal are different from those of a DMRS and a PDSCH that are sent by the TRP 1 to the terminal. In addition, the terminal may receive the DMRS and the PDSCH by using correct reference delay-frequency offset information, to improve multistation transmission performance.

To facilitate understanding of the foregoing QCL indication methods and content of the implementations, the following describes the QCL indication method 1100 to the QCL indication method 1900 and the QCL indication method 2100 to the QCL indication method 2900 by using an example in which a TRP 1 and a TRP 2 coordinate to transmit data for a same terminal. Correspondingly, N is equal to 2, and M is equal to 1.

In addition, for ease of describing the foregoing time-frequency spread information, this application further defines a QCL type E relationship. A large-scale channel parameter of QCL type E includes at least a Doppler spread or a delay spread. In addition, the foregoing delay-frequency offset information may be represented by QCL type C. A large-scale channel parameter of QCL type C includes at least an average delay or a Doppler shift. The large-scale channel parameters of QCL type E and QCL type C may affect channel estimation performance. For example, the large-scale channel parameters may affect a frequency-domain filtering coefficient, a time-domain filtering coefficient, and the like of channel estimation. In other words, the terminal may determine at least a coefficient of a time domain filter or a coefficient of a frequency domain filter of a DMRS based on the QCL indication information in this application. Therefore, the QCL indication methods in embodiments of this application help improve channel estimation accuracy. The following provides descriptions with reference to an actual scenario.

It is assumed that in the QCL indication method 1100 to the QCL indication method 1300, the UE does not need to differentiate between DMRSs and PDSCHs that are separately sent by the TRP 1 and the TRP 2, and DMRS ports corresponding to a TRS I sent by the TRP 1 and a TRS 2 sent by the TRP 2 are the same.

Figure 7:
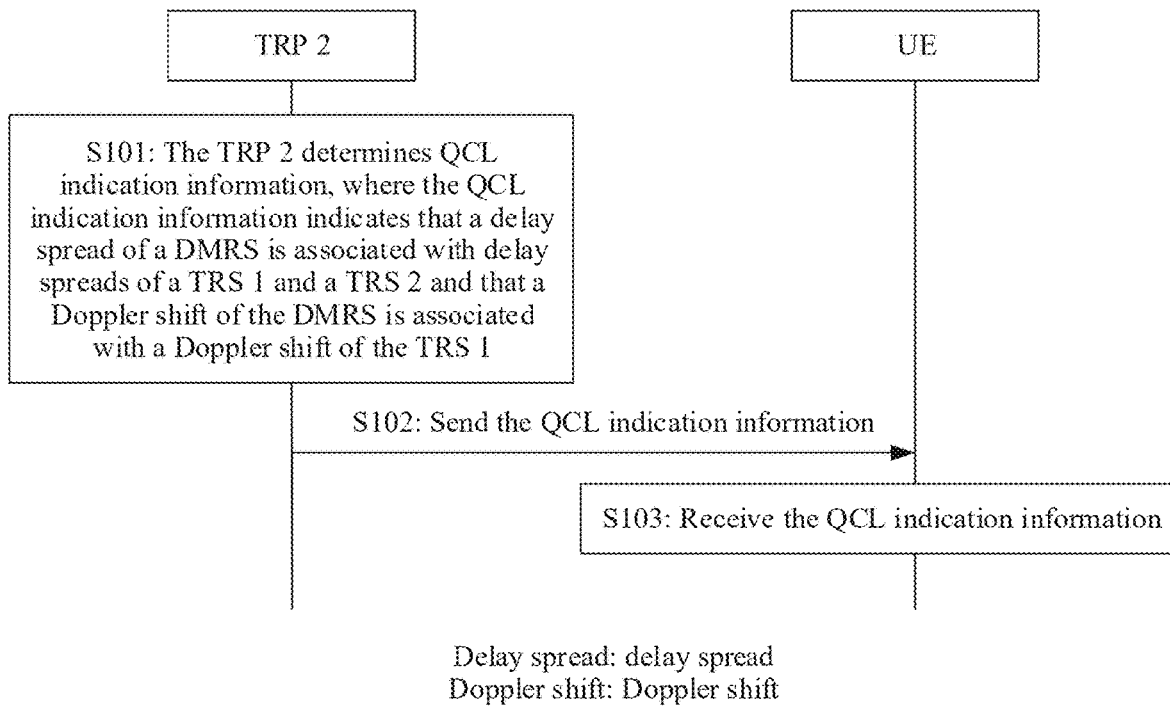
FIG. 7 is a schematic flowchart of a QCL indication method 1100 according to an embodiment.

FIG. 7 is a schematic flowchart of a QCL indication method 1100 according to an embodiment of this application. The QCL indication method 1100 may include but is not limited to the following operations.

S101: A TRP 2 determines QCL indication information, where the QCL indication information indicates that a delay spread of a DMRS is associated with delay spreads of a TRS 1 and a TRS 2 and that a Doppler shift of the DMRS is associated with a Doppler shift of the TRS 1.

S102: The TRP 2 sends the QCL indication information.

S103: UE receives the QCL indication information.

Figure 8:
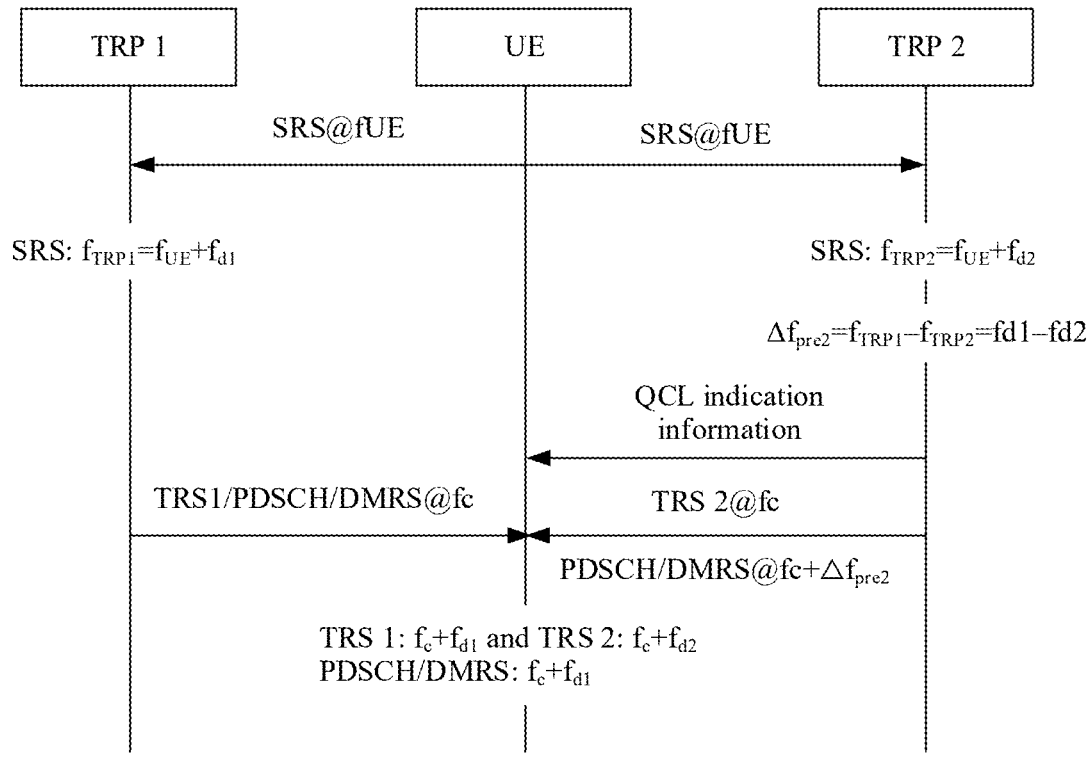
FIG. 8 is a schematic diagram of a signal transmission method 1100 according to an embodiment.

In an implementation, the TRP 2 and the TRP 1 negotiate a frequency offset compensation rule, or a plurality of TRPs are controlled by a central node to negotiate a frequency offset compensation rule. The TRP 2 determines, according to the frequency offset compensation rule, a Doppler shift indicated by the QCL indication information. For example, as shown in FIG. 8, a signal transmission method 1100 using the QCL indication method 1100 may include but is not limited to the following operations.

The UE sends an uplink signal, for example, a sounding reference signal (SRS), at a center frequency $f_{UE}$. It is assumed that a Doppler shift from the TRP 1 to the UE is $f_{d1}$, and a Doppler shift from the TRP 2 to the UE is $f_{d2}$. A frequency from the SRS to the TRP 1 is $f_{UE+fd1}$, and a frequency from the SRS to the TRP 2 is $f_{UE}+f_{d2}$.

The TRP 1 and the TRP 2 exchange SRS receiving frequencies, and determine that $f_{d1}$ is used as a reference. A DMRS and a PDSCH that are sent by the TRP 2 are compensated for a difference $\Delta f_{fre2}=f_{d1}-f_{d2}$, and a DMRS and a PDSCH that are sent by the TRP 1 is not compensated.

The difference $\Delta f_{fre2}$ is obtained by using an example in which the TRP 1 and the TRP 2 are intra-frequency, center frequencies may be the same, and both are a center frequency $f_c$. If the TRP 1 and the TRP 2 are inter-frequency, center frequencies of the TRP 1 and the TRP 2 are different. That is, sending frequencies of the TRP 1 and the TRP 2 are different. In this case, in addition to including a Doppler shift difference for air interface propagation, $\Delta f_{fre2}$ compensated by the TRP 2 further includes a sending frequency difference between the TRP 1 and the TRP 2. The following provides descriptions by using an example in which the TRP 1 and the TRP 2 are intra-frequency.

In this way, the TRP 2 may determine that the QCL indication information needs to indicate the Doppler shift of the DMRS is associated with the Doppler shift of the TRS 1. In addition, because the UE does not need to differentiate between DMRSs and PDSCHs that are separately sent by the TRP 1 and the TRP 2, it is determined that the QCL indication information indicates that the delay spread of the DMRS is associated with the delay spreads of the TRS 1 and the TRS 2.

It can be learned that the TRP 2 sends the QCL indication information, and the UE may determine the delay spread and the Doppler shift of the DMRS based on the QCL indication information after the UE receives the QCL indication information. As shown in FIG. 8, the terminal determines that the Doppler shift of the TRS 1 is $f_{d1}$, and determines, based on association between the Doppler shift of the DMRS and the Doppler shift of the TRS 1, that the Doppler shift of the DMRS is equal to the Doppler shift of the TRS 1. Therefore, the UE may determine that a receiving frequency of the DMRS is $fc+f_{d1}$. It can be learned that as shown in FIG. 8, the TRP 1 does not compensate for sending the DMRS/PDSCH, and the TRP 2 compensates the DMRS/PDSCH for $\Delta f_{fre2}$ before sending. Therefore, both receiving frequencies of the DMRS/PDSCH sent by the TRP 1 and the DMRS/PDSCH sent by the TRP 2 to the UE are $fc+f_{d1}$, and are consistent with a receiving frequency determined by the UE based on the QCL indication information, so that inter-carrier interference is avoided.

Figure 9:
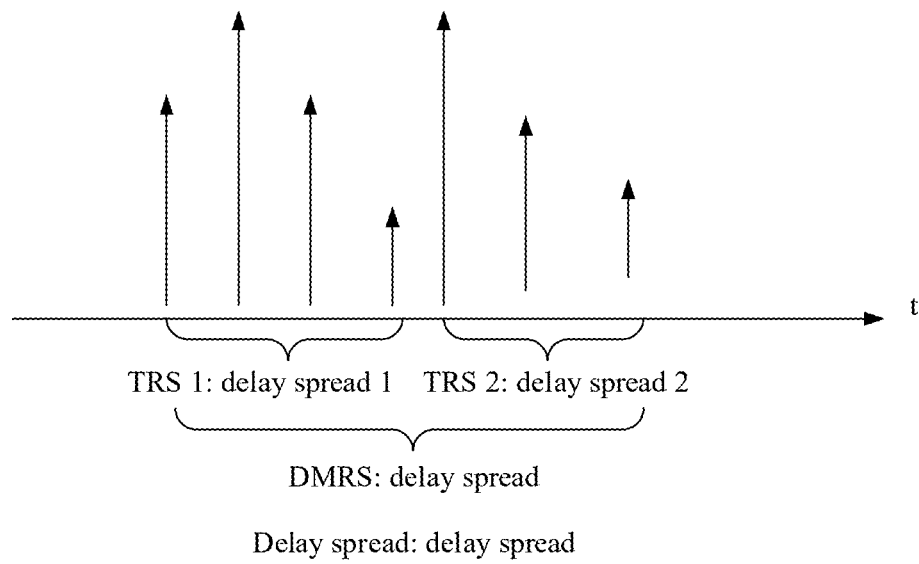
FIG. 9 is a schematic diagram of a DMRS delay spread determining method according to an embodiment.

In addition, as shown in FIG. 9, that the UE determines the delay spread of the DMRS based on the QCL indication information includes: The UE combines the delay spreads of the TRS 1 and the TRS 2, to obtain the delay spread of the DMRS. Because the delay spread of the DMRS considers multipath delays from the TRP 1 to the UE and from the TRP 2 to the UE, accuracy of DMRS channel estimation is higher by using the delay spread of the DMRS.

It can be learned that the QCL indication method shown in FIG. 8 and FIG. 9 helps improve multistation transmission performance.

Optionally, the TRP 1 and the TRP 2 may alternatively use another frequency offset compensation rule, and notify, by using the QCL indication information, the terminal of a reference frequency offset corresponding to the frequency offset compensation rule. In the embodiment shown in FIG. 8, the QCL indication information may notify the terminal that the reference frequency offset is obtained based on the Doppler shift of the TRS 1.

Optionally, in some implementations, the QCL indication information may notify the terminal that a reference frequency offset is obtained based on a Doppler shift of a TRS 3. In other words, the TRS 1 and the TRS 2 may provide delay spreads, and the TRS 3 provides the Doppler shift. For details, refer to the following related implementations. Details are not described herein.

The following describes, with reference to the foregoing indication manners of the QCL indication information, a specific indication manner of the QCL indication information in the QCL indication method in this embodiment of this application.

In an implementation, corresponding to Implementation 1.1, the QCL indication information indicates two TCI states, where QCL information indicated by a TCI state 1 includes the TRS 1, and the TRS 1 is associated with the delay spread and the Doppler shift; and QCL information indicated by a TCI state 2 includes the TRS 2, and the TRS 2 is associated with the delay spread.

Figure 10:
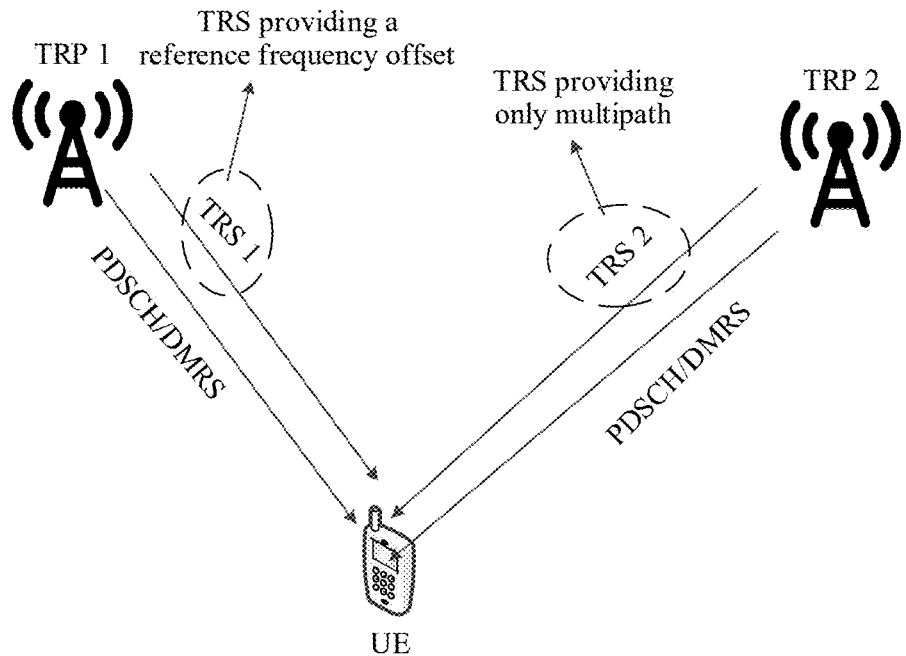
FIG. 10 is a schematic diagram of coordinated transmission between a TRP 1 and a TRP 2 according to an embodiment.

As shown in FIG. 10, the Doppler shift of the TRS I may be used as a reference frequency offset, and the TRS 2 provides only a multipath parameter such as the delay spread. Further, the terminal performs DMRS channel estimation based on the Doppler shift of the TRS 1 and the delay spreads of the TRS 1 and the TRS 2.

It can be learned that in this implementation, the terminal determines the delay spread and the Doppler shift of the DMRS based on the QCL information respectively indicated by the two TCI states configured for the DMRS. This helps improve multistation transmission performance.

In another implementation, a difference from the previous implementation lies in that QCL information indicated by a TCI state 1 includes the TRS 1 and the TRS 3, where the TRS 1 is associated with the delay spread, and the TRS 3 is associated with the Doppler shift. QCL information indicated by a TCI state 2 is the same as that in the previous implementation, and includes the TRS 2, where the TRS 2 is associated with the delay spread. When the TRS 1 or the TRS 2 is associated with a Doppler shift, it indicates that the terminal may use the Doppler shift of the TRP 1 or the TRP 2 as a reference frequency offset. Therefore, in this implementation, the TRS 3 is used for separately associating the Doppler shift, so that a reference frequency offset notified to the UE is not limited to a Doppler shift of one of the TRPs. This helps a network device side not need to be limited to performing frequency offset compensation on the TRP 1 or the TRP 2 before sending, and improves flexibility of frequency offset compensation on the network device side.

Figure 11:
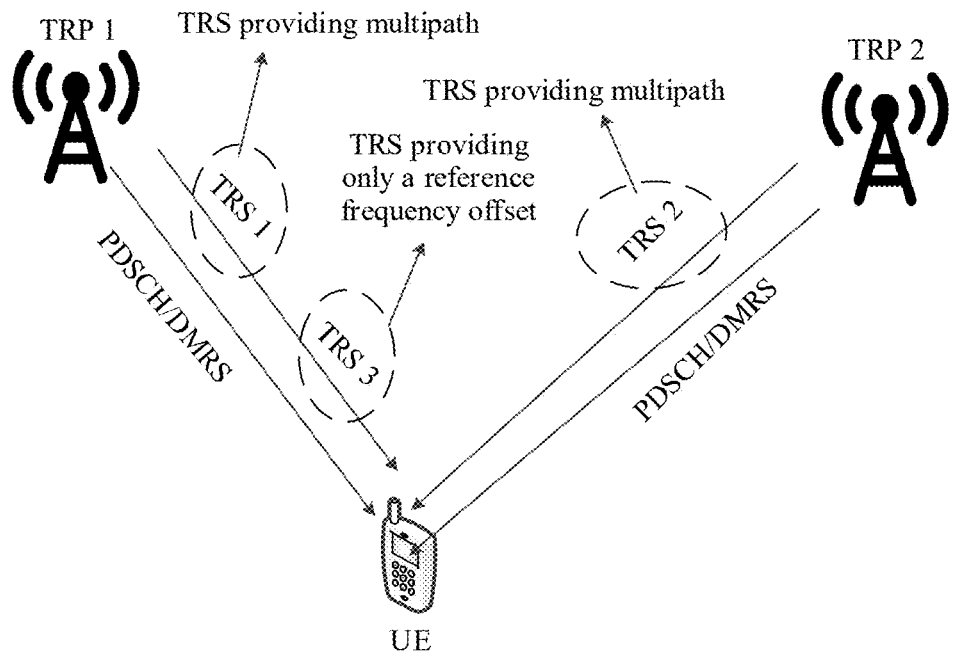
FIG. 11 is another schematic diagram of coordinated transmission between a TRP 1 and a TRP 2 according to an embodiment.

As shown in FIG. 11, the TRS 1 and the TRS 2 provide only a multipath parameter such as the delay spread, and the TRS 3 provides a reference frequency offset, so that sending frequencies of the TRS 1 and the TRS 2 may be consistent, and only a multipath delay spread needs to be provided. The TRP 1 compensates for a sending frequency of the TRS 3 and then sends the TRS 3, so that a receiving frequency at which the terminal receives the TRS 3 is not limited to $f_c+f_{d1}$ any more, for example, may be $f_c+\Delta f+f_{d1}$. This helps the terminal receive the DMRS by using $\Delta f+f_{d1}$ as a reference frequency offset. In this way, both the TRP 1 and the TRP 2 may send the DMRS after performing frequency offset compensation, thereby improving flexibility of frequency offset compensation.

Figure 12:
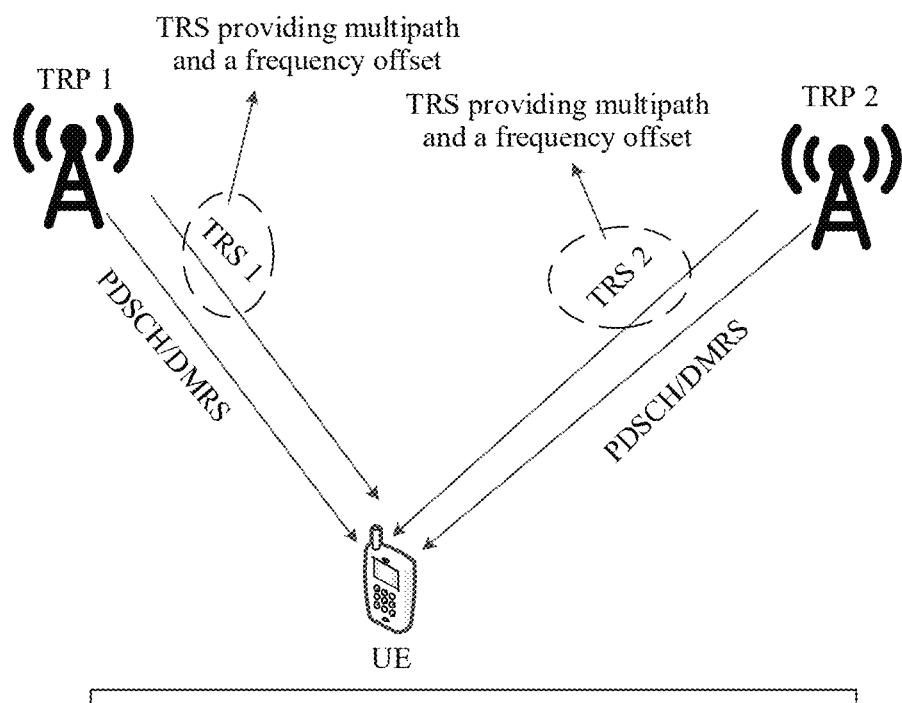
FIG. 12 is a still another schematic diagram of coordinated transmission between a TRP 1 and a TRP 2 according to an embodiment.

In still another implementation, corresponding to Implementation 1.2.1 in Implementation 1.2 above, the QCL indication information indicates two TCI states, as shown in FIG. 12.

QCL information indicated by a TCI state 1 includes the TRS 1, and the TRS 1 is associated with the Doppler shift and the delay spread.

QCL information indicated by a TCI state 2 includes the TRS 2, and the TRS 2 is associated with a Doppler shift and the delay spread.

In addition, "a network device side further notifies the UE of the following information: The Doppler shift indicated by the TCI state 2 is unavailable, and the Doppler shift indicated by the TCI state 1 is applicable to the TCI state 2", or "the terminal may learn of, based on Manner 1 or Manner 2 below, a Doppler shift that can be used".

Manner 1: A priority of the TRS 1 associated with the Doppler shift and indicated by the TCI state 1 is higher than a priority of the TRS 2 associated with the Doppler shift and indicated by the TCI state 2. Therefore, the Doppler shift of the TRS I may cover the Doppler shift of the TRS 2, so that the terminal may use the Doppler shift of the TRS 1 as a reference frequency offset.

Manner 2: The QCL information indicated by the TCI state 1 further includes the TRS 3, the TRS 3 is associated with the Doppler shift, and a priority of the TRS 3 associated with only the Doppler shift is higher than priorities of the TRS 1 and the TRS 2. Therefore, the terminal may use the Doppler shift associated with the TRS 3 as a reference frequency offset. In this implementation, the TCI state 1 can indicate TRSs of two types of QCL relationships, to avoid indicating a reference frequency offset by using an additional TCI, and help reduce signaling overheads required by the QCL indication information.

In still another implementation, corresponding to Implementation 1.2.2 in Implementation 1.2 above, the QCL indication information indicates three TCI states.

QCL information indicated by a TCI state 1 includes the TRS 1, and the TRS 1 is associated with the Doppler shift and the delay spread.

QCL information indicated by a TCI state 2 includes the TRS 2, and the TRS 2 is associated with a Doppler shift and the delay spread.

QCL information indicated by a TCI state 3 includes the TRS 1, and the TRS 1 is associated with the Doppler shift; or QCL information indicated by the TCI state 3 includes the TRS 3, and the TRS 3 is associated with the Doppler shift.

In addition, "a network device side further notifies the UE of the following information: The Doppler shifts indicated by the TCI state 1 and the TCI state 2 are unavailable, and the Doppler shift indicated by the TCI state 3 is applicable to the TCI state 1 and the TCI state 2", or "the terminal may learn of, based on Manner 1 or Manner 2 below, a Doppler shift that can be used".

Manner 1: A priority of the TRS 1 associated with the Doppler shift is higher than a priority of the TRS 2 associated with the Doppler shift. Therefore, the Doppler shift of the TRS 1 may cover the Doppler shift of the TRS 2, so that the terminal may use the Doppler shift of the TRS 1 as a reference frequency offset.

Manner 2: A priority of the TRS 3 associated with only the Doppler shift is higher than priorities of the TRS 1 and the TRS 2. Therefore, the terminal may use the Doppler shift associated with the TRS 3 as a reference frequency offset.

In this implementation, an additional TCI indicates the reference frequency offset, to help improve indication flexibility of the reference frequency offset.

In still another implementation, corresponding to Implementation 1.3.1 in Implementation 1.3 above, the QCL indication information indicates two TCI states.

QCL information indicated by a TCI state 1 includes the TRS 1, and the TRS 1 is associated with the delay spread.

QCL information indicated by a TCI state 2 includes the TRS 2, and the TRS 2 is associated with the delay spread.

In addition, in this implementation, a reference frequency offset is indicated in the following manners.

Manner 1: The QCL information indicated by the TCI state 1 further includes the TRS 1, and the TRS 1 is associated with the Doppler shift. It can be learned that in this manner, the TRS 1 may be associated with two large-scale channel parameters. This helps notify the terminal that the Doppler shift of the TRS 1 is used as the reference frequency offset.

Manner 2: The QCL information indicated by the TCI state 1 further includes the TRS 3, and the TRS 3 is associated with the Doppler shift. It can be learned that in this manner, the TCI state 1 may additionally indicate a TRS is associated with a Doppler shift, to improve indication flexibility of the reference frequency offset.

In still another implementation, corresponding to Implementation 1.3.2 in Implementation 1.3 above, the QCL indication information indicates three TCI states.

QCL information indicated by a TCI state 1 includes the TRS 1, and the TRS 1 is associated with the delay spread.

QCL information indicated by a TCI state 2 includes the TRS 2, and the TRS 2 is associated with the delay spread.

QCL information indicated by a TCI state 3 includes the TRS 1, and the TRS 1 is associated with the Doppler shift; or QCL information indicated by the TCI state 3 includes the TRS 3, and the TRS 3 is associated with the Doppler shift.

It can be learned that in this implementation, another TCI state notifies the terminal of a reference frequency offset, to improve indication flexibility of the reference frequency offset.

In addition, in the foregoing implementations, large-scale channel parameters associated with a TRS may be represented with reference to QCL type E and QCL type C. A large-scale channel parameter of QCL type E includes a delay spread, and a large-scale channel parameter of QCL type C includes a Doppler shift.

For example, in an implementation corresponding to Implementation 1.3.1 in Implementation 1.3, the QCL indication information indicates two TCI states.

QCL information indicated by a TCI state 1 includes the TRS 1, and the TRS 1 is associated with QCL type E.

QCL information indicated by a TCI state 2 includes the TRS 2, and the TRS 2 is associated with QCL type E.

In addition, (in Manner 1) the QCL information indicated by the TCI state 1 includes the TRS 1, and the TRS 1 is associated with QCL type C; or (in Manner 3) the QCL information indicated by the TCI state 1 includes the TRS 3 and the TRS 3 is associated with QCL type C.

For another example, in an implementation corresponding to Implementation 1.3.2 in Implementation 1.3, the QCL indication information indicates three TCI states.

QCL information indicated by a TCI state 1 includes the TRS 1, and the TRS 1 is associated with QCL type E.

QCL information indicated by a TCI state 2 includes the TRS 2, and the TRS 2 is associated with QCL type E.

In addition, (in Manner 2) the QCL information indicated by the TCI state 3 includes the TRS 1, and the TRS 1 is associated with QCL type C; or (in Manner 4) the QCL information indicated by the TCI state 3 includes the TRS 3, and the TRS 3 is associated with QCL type C.

In addition, in addition to indicating the delay spread and the Doppler shift in the foregoing implementation, in a high-frequency communication scenario, the QCL indication information may indicate, by using one of the two TCI states or an additional TCI state, a TRS and a spatial parameter associated with the TRS, to help improve multistation transmission performance in a coordinated multistation scenario in combination with the high-frequency communication scenario. A related implementation in which one of the two TCI states or the additional TCI state indicates the TRS and the spatial parameter associated with the TRS is similar to the manner of indicating the delay-frequency offset information in the implementations, and a difference lies in that indicated parameters are different. Details are not described herein again.

In addition, in this embodiment of this disclosure, the two TCI states or the three TCI states may be located in a same TCI field, or may be located in a plurality of TCI fields. The two TCI states or the three TCI states may be transmitted by using a same piece of DCI, or may be transmitted by using two pieces of DCI or three pieces of DCI.

If a plurality of pieces of DCI indicate the association relationships indicated by the foregoing various QCL indication information, there may be but not limited to the following implementations:

In an implementation, corresponding to Implementation 2.1 above, in the two pieces of DCI:

QCL information indicated by DCI 1 includes the TRS 1, and the TRS 1 is associated with the delay spread and the Doppler shift.

QCL information indicated by DCI 2 includes the TRS 2, and the TRS 2 is associated with the delay spread.

In another implementation, corresponding to Implementation 2.2.1 in Implementation 2.2, in the two pieces of DCI:

QCL information indicated by DCI 1 includes the TRS 1, and the TRS 1 is associated with the delay spread and the Doppler shift.

QCL information indicated by DCI 2 includes the TRS 2, and the TRS 2 is associated with the delay spread and the Doppler shift.

In addition, "the network device side further notifies the UE of the following information: The Doppler shift indicated by the DCI 2 is unavailable, and the Doppler shift indicated by the DCI 1 is applicable to the DCI 2", or "the terminal learns of, based on the following manner, a Doppler shift that can be used".

In this manner, a priority of the TRS 1 associated with the Doppler shift and indicated by the DCI 1 is higher than a priority of the TRS 2 associated with the Doppler shift and in the DCI 2. Therefore, the Doppler shift associated with the TRS 1 may cover the Doppler shift associated with the TRS 2.

In still another implementation, corresponding to Implementation 2.2.2 in Implementation 2.2, in the three pieces of DCI:

QCL information indicated by DCI 1 includes the TRS 1, and the TRS 1 is associated with the delay spread and the Doppler shift.

QCL information indicated by DCI 2 includes the TRS 2, and the TRS 2 is associated with the delay spread and the Doppler shift.

QCL information indicated by DCI 3 includes the TRS 3, and the TRS 3 is associated with the Doppler shift; or QCL information indicated by DCI 3 includes the TRS 1 and the TRS 1 is associated with the Doppler shift.

In addition, "the network device side further notifies the UE of the following information: The Doppler shifts indicated by the DCI 1 and the DCI 2 are unavailable, and the Doppler shift indicated by the DCI 3 is applicable to the DCI 1 and the DCI 2", or "the terminal may learn of, based on Manner 1 or Manner 2 below, delay-frequency offset information that can be used".

Manner 1: A priority of the TRS 3 associated with the Doppler shift and indicated by the DCI 3 is higher than a priority of the TRS 1 indicated by the DCI 1 and a priority of the TRS 2 indicated by the DCI 2. Therefore, the Doppler shift associated with the TRS 3 may cover delay-frequency offset information associated with the TRS 1 and the TRS 2.

Manner 2: A priority of the Doppler shift associated with the TRS 1 and indicated by the DCI 3 is higher than priorities of the Doppler shifts indicated by the DCI 1 and the DCI 2. Therefore, the Doppler shift associated with the TRS 1 and indicated by the DCI 3 may cover the Doppler shifts indicated by the DCI 1 and the DCI 2.

It can be learned that in this implementation, a TRS associated with only a Doppler shift and a TRS associated with a delay spread and a Doppler shift may be a same TRS, or may be different TRSs. It can be learned that in this implementation, additional DCI may indicate a Doppler shift, to help improve indication flexibility of the Doppler shift.

In still another implementation, corresponding to Implementation 2.3 above, in the two pieces of DCI:

QCL information indicated by DCI 1 includes the TRS 1, and the TRS 1 is associated with the delay spread and the Doppler shift.

QCL information indicated by DCI 2 includes the TRS 2 and the TRS 1, the TRS 2 is associated with the delay spread, and the TRS 1 is associated with the Doppler shift.

It can be learned that in this implementation, the terminal may determine the Doppler shift of the TRS 1 as a reference frequency offset based on the DCI 1 and the DCI 2.

It can be learned that the foregoing describes various implementations of indicating that the delay spread of the DMRS is associated with the delay spreads of the TRS 1 and the TRS 2 and that the Doppler shift of the DMRS is associated with the Doppler shift of the TRS 1 in the QCL indication method. In addition, some of the foregoing implementations further describe indication of that the delay spread of the DMRS is associated with the delay spreads of the TRS 1 and the TRS 2 and that the Doppler shift of the DMRS is associated with the Doppler shift of the TRS 3. This helps the network device side not be limited to sending the DMRS after performing frequency offset compensation on the TRP 1 or the TRP 2. For example, the network device side may send the DMRS after performing frequency offset compensation on both the TRP 1 and the TRP 2, and notify the terminal of the reference frequency offset by using the TRS 3.

Figure 13:
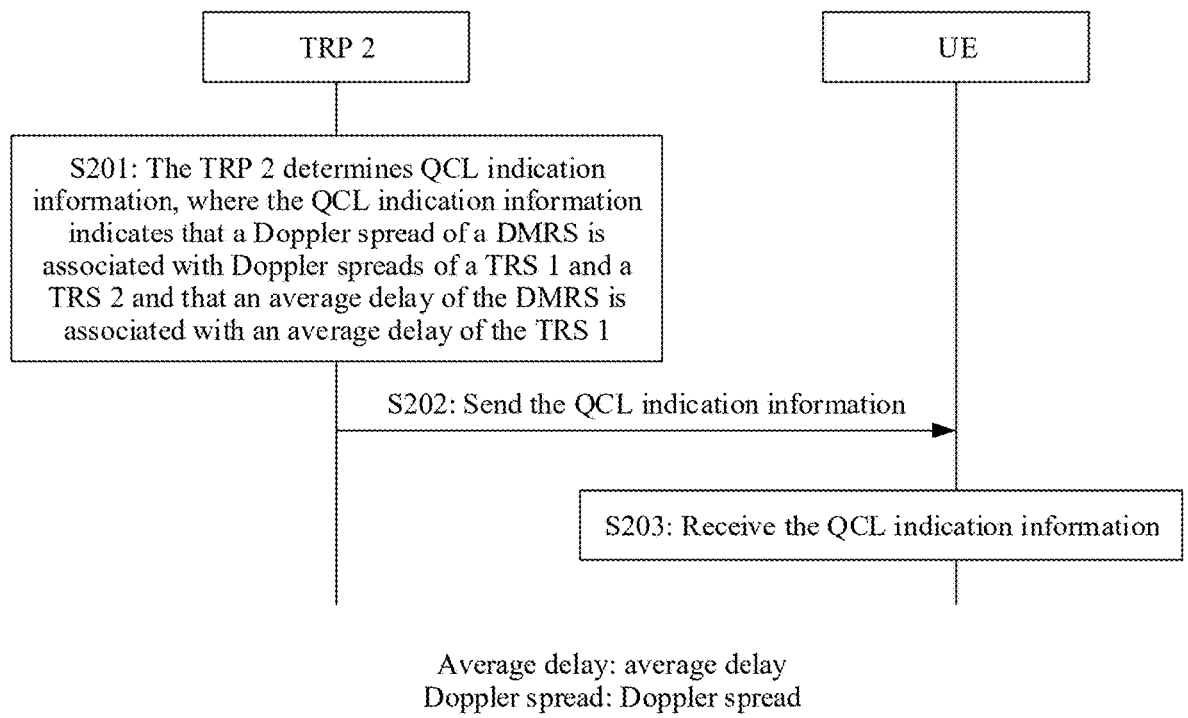
FIG. 13 is a schematic flowchart of a QCL indication method 1200 according to an embodiment.

FIG. 13 is a schematic flowchart of a QCL indication method 1200 according to an embodiment of this application. The QCL indication method 1200 may include but is not limited to the following operations.

S201: A TRP 2 determines QCL indication information, where the QCL indication information indicates that a Doppler spread of a DMRS is associated with Doppler spreads of the TRS 1 and the TRS 2 and that an average delay of the DMRS is associated with an average delay of the TRS 1.

S202: The TRP 2 sends the QCL indication information.

S203: UE receives the QCL indication information.

Figure 14:
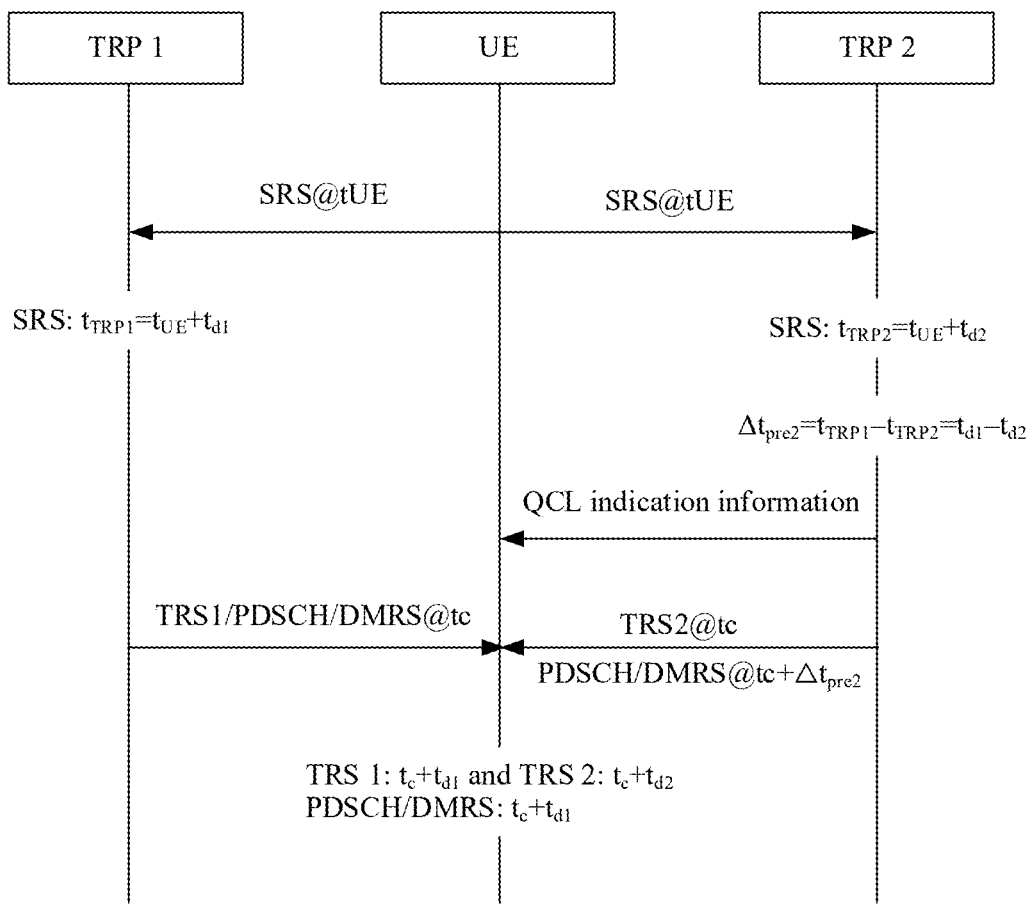
FIG. 14 is a schematic diagram of a signal transmission method 1200 according to an embodiment.

In an implementation, the TRP 2 and a TRP 1 negotiate a delay compensation rule, or a central node controls to negotiate a delay compensation rule. The TRP 2 determines, according to the delay compensation rule, an average delay indicated by the QCL indication information. For example, as shown in FIG. 14, a signal transmission method 1200 using the QCL indication method 1200 may include but is not limited to the following operations.

The UE sends an uplink signal, for example, a sounding reference signal (SRS), at a center frequency $t_{UE}$. It is assumed that an average delay from the TRP 1 to the UE is $t_{d1}$, and an average delay from the TRP 2 to the UE is td2. Time from the SRS to the TRP 1 is $t_{UE}+t_{d1}$, and time from the SRS to the TRP 2 is $t_{UE}+t_{d2}$.

The TRP 1 and the TRP 2 exchange SRS receiving time, and determine that td1 is used as a reference. A DMRS and a PDSCH that are sent by the TRP 2 are compensated for a difference $\Delta t_{fre2}=t_{d1}-t_{d2}$, and a DMRS and a PDSCH that are sent by the TRP 1 is not compensated in terms of a delay.

In this way, the TRP 2 may determine that the QCL indication information needs to indicate that the average delay of the DMRS is associated with the average delay of the TRS 1. In addition, because the UE does not need to differentiate between DMRSs and PDSCHs that are separately sent by the TRP 1 and the TRP 2, it is determined that the QCL indication information indicates that the Doppler spread of the DMRS is associated with the Doppler spreads of the TRS 1 and the TRS 2.

It can be learned that the TRP 2 sends the QCL indication information, and the UE may determine the Doppler spread and the average delay of the DMRS based on the QCL indication information after the UE receives the QCL indication information. As shown in FIG. 14, the terminal determines that the average delay of the TRS 1 is $t_{d1}$, and determines, based on association between the average delay of the DMRS and the average delay of the TRS 1, that the average delay of the DMRS is equal to the average delay of the TRS 1. Therefore, the UE may determine that receiving time of the DMRS is tc+$t_{d1}$. It can be learned that as shown in FIG. 14, the TRP 1 does not compensate for sending the DMRS/PDSCH, and the TRP 2 compensates the DMRS/PDSCH for $\Delta t_{fre2}$ before sending. Therefore, both receiving time of the DMRS/PDSCH sent by the TRP 1 and the DMRS/PDSCH sent by the TRP 2 to the UE is tc+$t_{d1}$, and is consistent with receiving time determined by the UE based on the QCL indication information, so that intersymbol interference is avoided.

Figure 15:
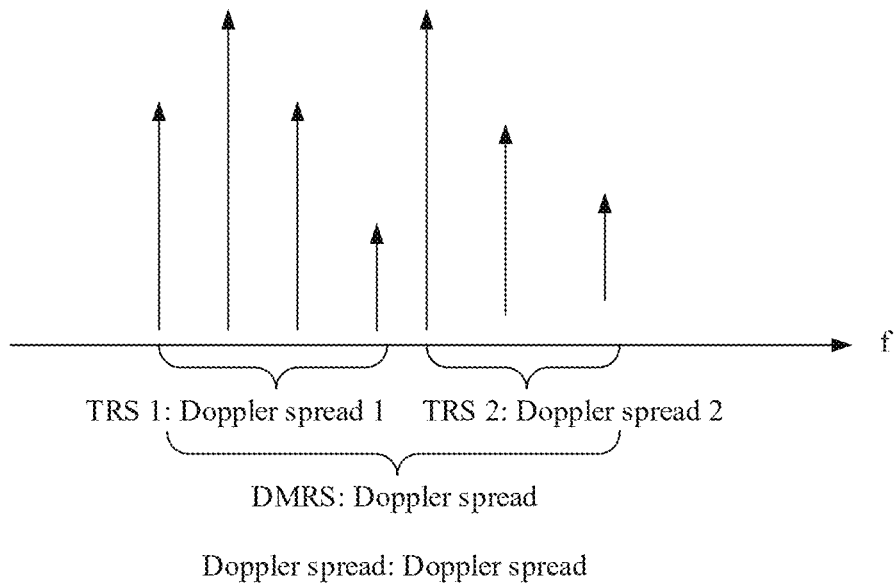
FIG. 15 is a schematic diagram of a DMRS Doppler spread determining method according to an embodiment.

In addition, as shown in FIG. 15, that the UE determines the Doppler spread of the DMRS based on the QCL indication information includes: The UE combines the Doppler spreads of the TRS 1 and the TRS 2, to obtain the Doppler spread of the DMRS. Because the Doppler spread of the DMRS considers multipath Dopplers from the TRP 1 to the UE and from the TRP 2 to the UE, accuracy of DMRS channel estimation is higher by using the Doppler spread of the DMRS.

It can be learned that the QCL indication method shown in FIG. 13 helps improve multistation transmission performance.

Optionally, the TRP 1 and the TRP 2 may alternatively use another delay compensation rule, and notify, by using the QCL indication information, the terminal of a reference delay corresponding to the delay compensation rule. In the embodiment shown in FIG. 14, the QCL indication information may notify the terminal that the reference delay is obtained based on the average delay of the TRS 1.

Optionally, in some implementations, the QCL indication information may notify the terminal that a reference delay is obtained based on an average delay of a TRS 3. In other words, the TRS 1 and the TRS 2 may provide Doppler spreads, and the TRS 3 provides an average delay. For details, refer to the following related implementations. Details are not described herein.

The following describes, with reference to the foregoing indication manners of the QCL indication information, a specific indication manner of the QCL indication information in the QCL indication method in this embodiment of this application.

In an implementation, corresponding to Implementation 1.1, the QCL indication information indicates two TCI states, where QCL information indicated by a TCI state 1 includes the TRS 1, and the TRS 1 is associated with the Doppler spread and the average delay; and QCL information indicated by a TCI state 2 includes the TRS 2, and the TRS 2 is associated with the Doppler spread.

Figure 16:
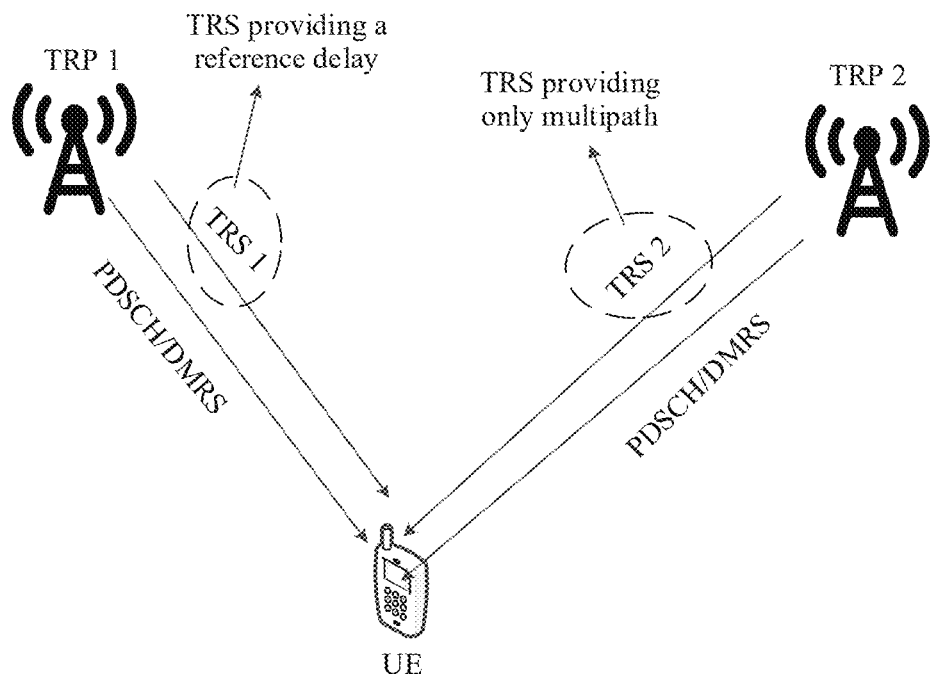
FIG. 16 is a schematic diagram of coordinated transmission performed by a TRP 1 and a TRP 2 by using a QCL indication method 1200 according to an embodiment of this application.

As shown in FIG. 16, the average delay of the TRS 1 may be used as a reference delay, and the TRS 2 provides only a multipath parameter such as the Doppler spread. Further, the terminal performs DMRS channel estimation based on the average delay of the TRS 1 and the Doppler spreads of the TRS 1 and the TRS 2.

It can be learned that in this implementation, the terminal determines the Doppler spread and the average delay of the DMRS based on the QCL information respectively indicated by the two TCI states configured for the DMRS. This helps improve multistation transmission performance.

In another implementation, a difference from the previous implementation lies in that QCL information indicated by a TCI state 1 includes the TRS 1 and the TRS 3, where the TRS 1 is associated with the Doppler spread, and the TRS 3 is associated with the average delay. QCL information indicated by a TCI state 2 is the same as that in the previous implementation, and includes the TRS 2, where the TRS 2 is associated with the Doppler spread.

When the TRS 1 or the TRS 2 is associated with an average delay, it indicates that the terminal may use the average delay of the TRP 1 or the TRP 2 as a reference delay. Therefore, in this implementation, the TRS 3 is used for separately associating the average delay, so that a reference delay notified to the UE is not limited to an average delay of one of the TRPs. This helps a network device side not need to be limited to performing delay compensation on the TRP 1 or the TRP 2 before sending, and improves flexibility of delay compensation on the network device side.

Figure 17:
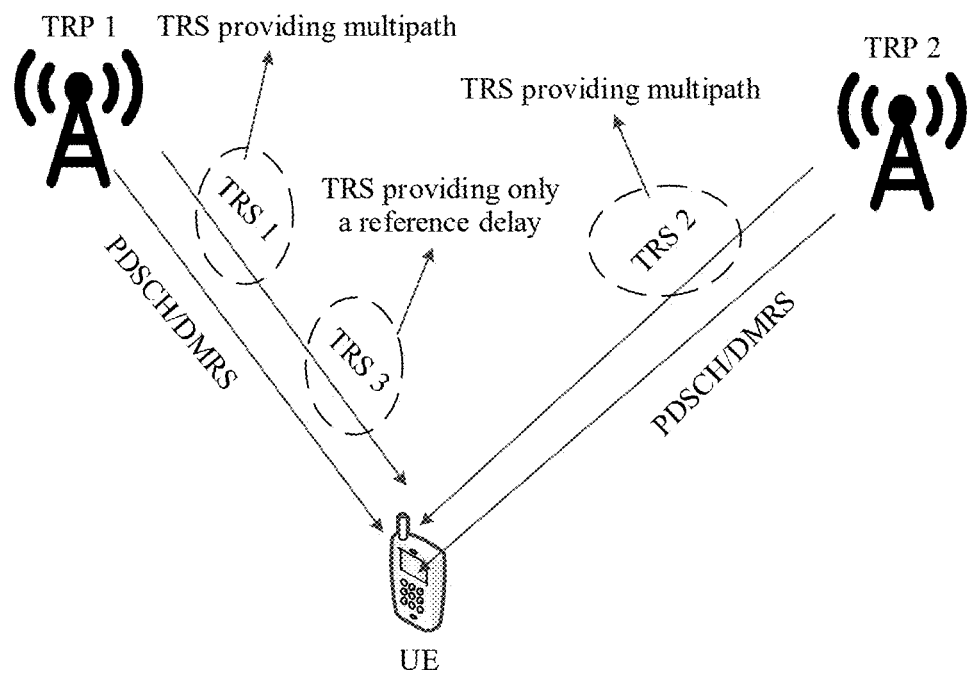
FIG. 17 is another schematic diagram of coordinated transmission performed by a TRP 1 and a TRP 2 by using a QCL indication method 1200 according to an embodiment.

As shown in FIG. 17, the TRS 1 and the TRS 2 provide only a multipath parameter such as the Doppler spread, and the TRS 3 provides a reference delay, so that sending time of the TRS 1 and the TRS 2 may be consistent, and only a multipath Doppler spread needs to be provided. The TRP 1 compensates for sending time of the TRS 3 and then sends the TRS 3, so that receiving time at which the terminal receives the TRS 3 is not limited to tc+td1 any more, for example, may be tc+Δt+td1. This helps the terminal receive the DMRS by using Δt+td1 as a reference delay. In this way, both the TRP 1 and the TRP 2 may send the DMRS after performing delay compensation, thereby improving flexibility of delay compensation.

In still another implementation, corresponding to Implementation 1.2.1 in Implementation 1.2 above, the QCL indication information indicates two TCI states, as shown in FIG. 17.

QCL information indicated by a TCI state 1 includes the TRS 1, and the TRS 1 is associated with the Doppler spread and the average delay.

QCL information indicated by a TCI state 2 includes the TRS 2, and the TRS 2 is associated with the Doppler spread and the average delay.

In addition, "a network device side further notifies the UE of the following information: The average delay indicated by the TCI state 2 is unavailable, and the average delay indicated by the TCI state 1 is applicable to the TCI state 2", or "the terminal learns of, based on Manner 1 or Manner 2 below, an average delay that can be used".

Manner 1: A priority of the TRS 1 associated with the average delay and indicated by the TCI state 1 is higher than a priority of the TRS 2 associated with the average delay and indicated by the TCI state 2. Therefore, the average delay of the TRS I may cover the average delay of the TRS 2, so that the terminal may use the average delay of the TRS 1 as a reference delay.

Manner 2: The QCL information indicated by the TCI state 1 further includes the TRS 3, the TRS 3 is associated with the average delay, and a priority of the TRS 3 associated with only the average delay is higher than priorities of the TRS 1 and the TRS 2. Therefore, the terminal may use the average delay associated with the TRS 3 as a reference delay. In this implementation, the TCI state 1 can indicate TRSs of two types of QCL relationships, to avoid indicating a reference frequency offset by using an additional TCI, and help reduce signaling overheads required by the QCL indication information.

In still another implementation, corresponding to Implementation 1.2.2 in Implementation 1.2 above, the QCL indication information indicates three TCI states.

QCL information indicated by a TCI state 1 includes the TRS 1, and the TRS 1 is associated with the Doppler spread and the average delay.

QCL information indicated by a TCI state 2 includes the TRS 2, and the TRS 2 is associated with the Doppler spread and the average delay.

QCL information indicated by a TCI state 3 includes the TRS 1, and the TRS 1 is associated with the average delay; or QCL information indicated by a TCI state 3 includes the TRS 3, and the TRS 3 is associated with the average delay.

In addition, "a network device side further notifies the UE of the following information: The average delays indicated by the TCI state 1 and the TCI state 2 are unavailable, and the average delay indicated by the TCI state 3 is applicable to the TCI state 1 and the TCI state 2", or "the terminal learns of, based on Manner 1 or Manner 2 below, an average delay that can be used".

Manner 1: A priority of the TRS 1 associated with the average delay is higher than a priority of the TRS 2 associated with the average delay. Therefore, the average delay of the TRS 1 may cover the average delay of the TRS 2, so that the terminal may use the average delay of the TRS 1 as a reference delay.

Manner 2: A priority of the TRS 3 associated with only the average delay is higher than priorities of the TRS 1 and the TRS 2. Therefore, the terminal may use the average delay associated with the TRS 3 as a reference delay.

In this implementation, an additional TCI indicates the reference delay, to help improve indication flexibility of the reference delay.

In still another implementation, corresponding to Implementation 1.3.1 in Implementation 1.3 above, the QCL indication information indicates two TCI states.

QCL information indicated by a TCI state 1 includes the TRS 1, and the TRS 1 is associated with the Doppler spread.

QCL information indicated by a TCI state 2 includes the TRS 2, and the TRS 2 is associated with the Doppler spread.

In addition, in this implementation, a reference delay is indicated in the following manners.

Manner 1: The QCL information indicated by the TCI state 1 further includes the TRS 1, and the TRS 1 is associated with the average delay. It can be learned that in this manner, the TRS 1 may be associated with two large-scale channel parameters. This helps notify the terminal that the average delay of the TRS 1 is used as the reference delay.

Manner 2: The QCL information indicated by the TCI state 1 further includes the TRS 3, and the TRS 3 is associated with the average delay. It can be learned that in this manner, the TCI state 1 may additionally indicate that a TRS is associated with an average delay, to improve indication flexibility of the reference delay.

In still another implementation, corresponding to Implementation 1.3.2 in Implementation 1.3 above, the QCL indication information indicates three TCI states.

QCL information indicated by a TCI state 1 includes the TRS 1, and the TRS 1 is associated with the Doppler spread.

QCL information indicated by a TCI state 2 includes the TRS 2, and the TRS 2 is associated with the Doppler spread.

QCL information indicated by a TCI state 3 includes the TRS 1, and the TRS 1 is associated with the average delay; or QCL information indicated by a TCI state 3 includes the TRS 3, and the TRS 3 is associated with the average delay.

It can be learned that in this implementation, another TCI state notifies the terminal of a reference delay, to improve indication flexibility of the reference delay.

In addition, in the foregoing implementations, large-scale channel parameters associated with a TRS may be represented with reference to QCL type E and QCL type C. A large-scale channel parameter of QCL type E includes a Doppler spread, and a large-scale channel parameter of QCL type C includes an average delay.

For example, in an implementation corresponding to Implementation 1.3.1 in Implementation 1.3, the QCL indication information indicates two TCI states.

QCL information indicated by a TCI state 1 includes the TRS 1, and the TRS 1 is associated with QCL type E.

QCL information indicated by a TCI state 2 includes the TRS 2, and the TRS 2 is associated with QCL type E.

In addition, (in Manner 1) the QCL information indicated by the TCI state 1 includes the TRS 1, and the TRS 1 is associated with QCL type C; or (in Manner 3) the QCL information indicated by the TCI state 1 includes the TRS 3 and the TRS 3 is associated with QCL type C.

For another example, in an implementation corresponding to Implementation 1.3.2 in Implementation 1.3, the QCL indication information indicates three TCI states.

QCL information indicated by a TCI state 1 includes the TRS 1, and the TRS 1 is associated with QCL type E.

QCL information indicated by a TCI state 2 includes the TRS 2, and the TRS 2 is associated with QCL type E.

In addition, (in Manner 2) the QCL information indicated by the TCI state 3 includes the TRS 1, and the TRS 1 is associated with QCL type C; or (in Manner 4) the QCL information indicated by the TCI state 3 includes the TRS 3, and the TRS 3 is associated with QCL type C.

In addition to indicating the Doppler spread and the average delay in the foregoing implementation, in a high-frequency communication scenario, the QCL indication information may indicate, by using one of the two TCI states or an additional TCI state, a TRS and a spatial parameter associated with the TRS, to help improve multistation transmission performance in a coordinated multistation scenario in combination with the high-frequency communication scenario. A related implementation in which one of the two TCI states or the additional TCI state indicates the TRS and the spatial parameter associated with the TRS is similar to the manner of indicating the average delay in the implementations, and a difference lies in that indicated parameters are different. Details are not described herein again.

In addition, in this embodiment, the two TCI states or the three TCI states may be located in a same TCI field, or may be located in a plurality of TCI fields. The two TCI states or the three TCI states may be transmitted by using a same piece of DCI, or may be transmitted by using two pieces of DCI or three pieces of DCI.

If a plurality of pieces of DCI indicate the association relationships indicated by the foregoing various QCL indication information, there may be but not limited to the following implementations:

In an implementation, corresponding to Implementation 2.1 above, in the two pieces of DCI:

QCL information indicated by DCI 1 includes the TRS 1, and the TRS 1 is associated with the Doppler spread and the average delay.

QCL information indicated by DCI 2 includes the TRS 2, and the TRS 2 is associated with the Doppler spread.

In another implementation, corresponding to Implementation 2.2.1 in Implementation 2.2, in the two pieces of DCI:

QCL information indicated by DCI 1 includes the TRS 1, and the TRS 1 is associated with the Doppler spread and the average delay.

QCL information indicated by DCI 2 includes the TRS 2, and the TRS 2 is associated with the Doppler spread and the average delay.

In addition, "the network device side further notifies the UE of the following information: The average delay indicated by the DCI 2 is unavailable, and the average delay indicated by the DCI 1 is applicable to the DCI 2", or "the terminal learns of, based on the following manner, an average delay that can be used".

In this manner, a priority of the TRS 1 associated with the average delay and indicated by the DCI 1 is higher than a priority of the TRS 2 associated with the average delay and in the DCI 2. Therefore, the average delay associated with the TRS 1 may cover the average delay associated with the TRS 2.

In still another implementation, corresponding to Implementation 2.2.2 in Implementation 2.2, in the three pieces of DCI:

QCL information indicated by DCI 1 includes the TRS 1, and the TRS 1 is associated with the Doppler spread and the average delay.

QCL information indicated by DCI 2 includes the TRS 2, and the TRS 2 is associated with the Doppler spread and the average delay.

QCL information indicated by DCI 3 includes the TRS 3, and the TRS 3 is associated with the average delay; or QCL information indicated by DCI 3 includes the TRS 1, and the TRS 1 is associated with the average delay.

In addition, "the network device side further notifies the UE of the following information: The average delay indicated by the DCI 1 and the DCI 2 is unavailable, and the average delay indicated by the DCI 3 is applicable to the DCI 1 and the DCI 2", or "the terminal learns of, based on Manner 1 or Manner 2 below, an average delay that can be used".

Manner 1: A priority of the TRS 3 associated with the average delay and indicated by the DCI 3 is higher than a priority of the TRS 1 indicated by the DCI 1 and a priority of the TRS 2 indicated by the DCI 2. Therefore, the average delay associated with the TRS 3 may cover the average delays associated with the TRS 1 and the TRS 2.

Manner 2: A priority of the average delay associated with the TRS 1 and indicated by the DCI 3 is higher than priorities of the average delays indicated by the DCI 1 and the DCI 2. Therefore, the average delay associated with the TRS 1 and indicated by the DCI 3 may cover the average delays indicated by the DCI 1 and the DCI 2.

It can be learned that in this implementation, a TRS associated with only an average delay and a TRS associated with a Doppler spread and an average delay may be a same TRS, or may be different TRSs. It can be learned that in this implementation, additional DCI may indicate the average delay, to help improve indication flexibility of the reference delay.

In still another implementation, corresponding to Implementation 2.3 above, in the two pieces of DCI:

QCL information indicated by DCI 1 includes the TRS 1, and the TRS 1 is associated with the Doppler spread and the average delay.

QCL information indicated by DCI 2 includes the TRS 2 and the TRS 1, the TRS 2 is associated with the Doppler spread, and the TRS 1 is associated with the average delay.

It can be learned that in this implementation, the terminal may determine the average delay of the TRS 1 as a reference delay based on the DCI 1 and the DCI 2.

It can be learned that the foregoing describes various implementations of indicating that the Doppler spread of the DMRS is associated with the Doppler spreads of the TRS 1 and the TRS 2 and that the average delay of the DMRS is associated with the average delay of the TRS 1 in the QCL indication method. In addition, some of the foregoing implementations further describe indication of that the Doppler spread of the DMRS is associated with the Doppler spreads of the TRS 1 and the TRS 2 and that the average delay of the DMRS is associated with the average delay of the TRS 3. This helps the network device side not be limited to sending the DMRS after performing delay compensation on the TRP 1 or the TRP 2. For example, the network device side may send the DMRS after performing delay compensation on both the TRP 1 and the TRP 2, and notify the terminal of the reference delay by using the TRS 3.

Figure 18:
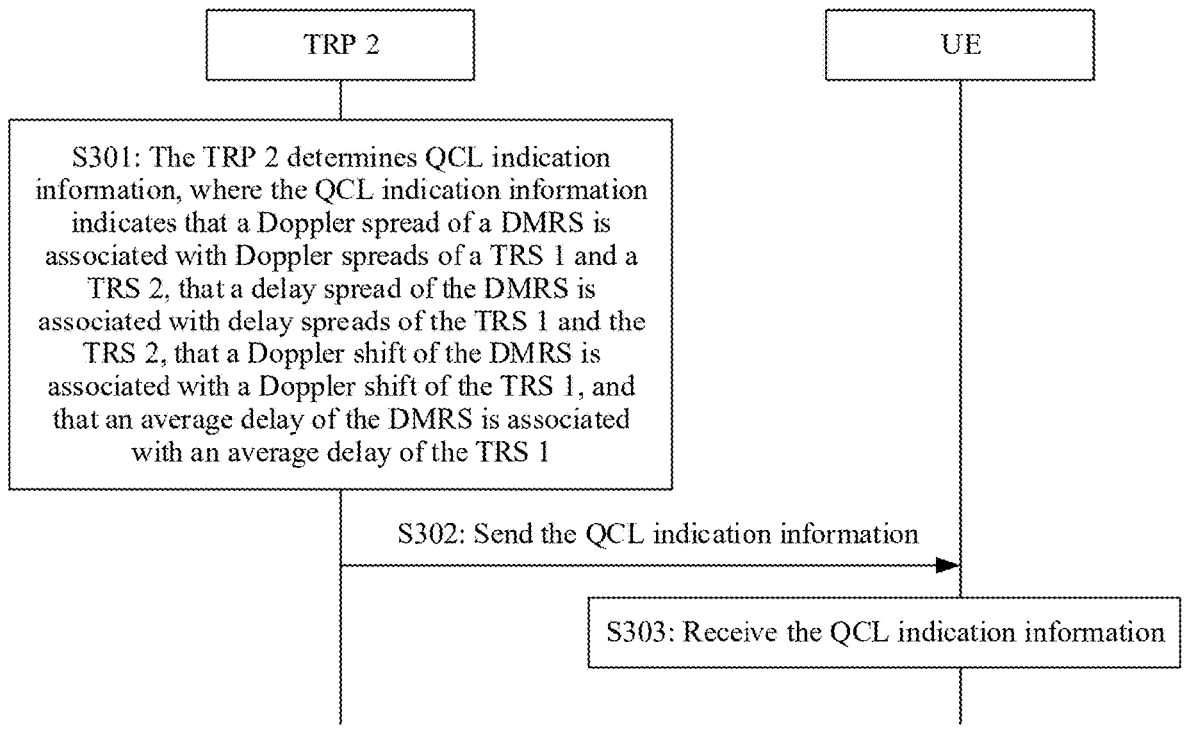
FIG. 18 is a schematic flowchart of a QCL indication method 1300 according to an embodiment.

FIG. 18 is a schematic flowchart of a QCL indication method 1300 according to an embodiment of this application. The QCL indication method 1300 may include but is not limited to the following operations.

S301: A TRP 2 determines QCL indication information, where the QCL indication information indicates that a Doppler spread of a DMRS is associated with Doppler spreads of a TRS 1 and a TRS 2, that a delay spread of the DMRS is associated with delay spreads of the TRS 1 and the TRS 2, that a Doppler shift of the DMRS is associated with a Doppler shift of the TRS 1, and that an average delay of the DMRS is associated with an average delay of the TRS 1.

S302: The TRP 2 sends the QCL indication information.

S303: UE receives the QCL indication information.

Figure 19:
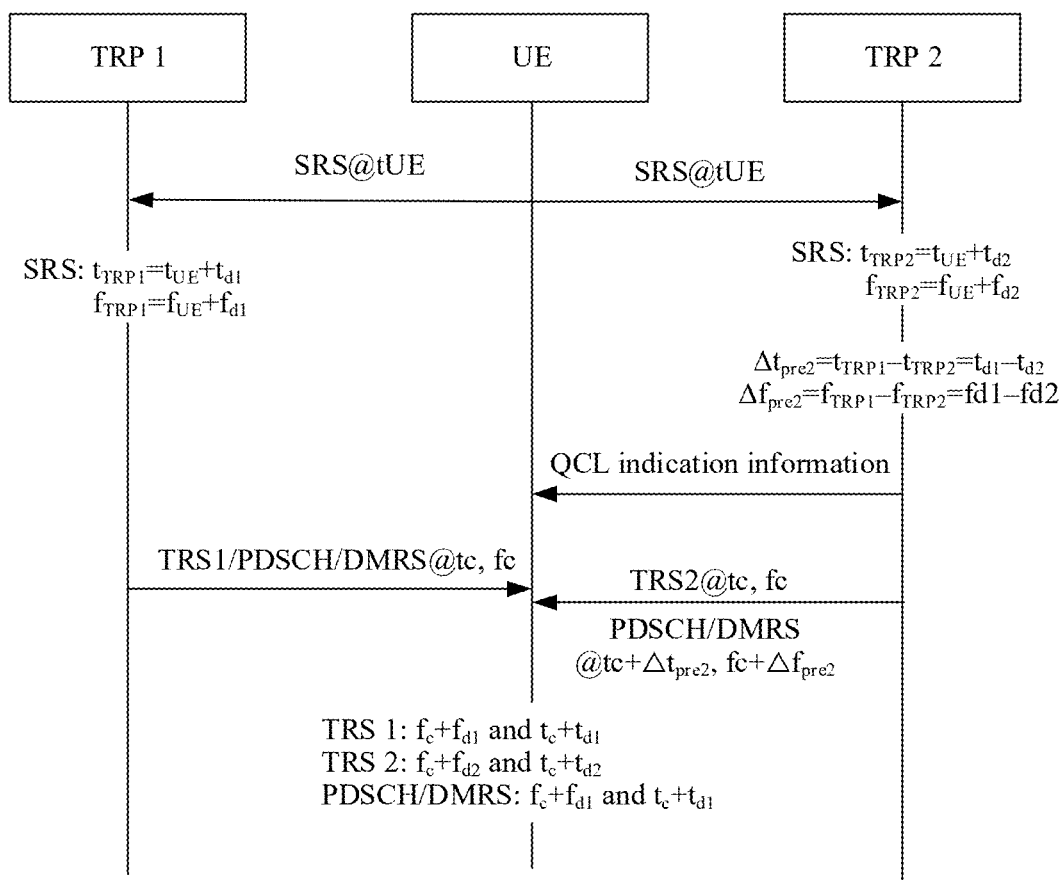
FIG. 19 is a schematic flowchart of a signal transmission method 1300 according to an embodiment.

In an implementation, the TRP 2 and a TRP 1 negotiate a delay-frequency offset compensation rule, or a central node controls to negotiate a delay-frequency offset compensation rule. The TRP 2 determines, according to the delay-frequency offset compensation rule, an average delay and a Doppler shift that are indicated by the QCL indication information. For example, as shown in FIG. 19, a signal transmission method 1300 using the QCL indication method 1300 may include but is not limited to the following operations.

The UE sends an uplink signal, for example, a sounding reference signal (SRS), at time $t_{UE}$ and a center frequency $f_{UE}$. It is assumed that an average delay from the TRP 1 to the UE is $t_{d1}$, a Doppler shift from the TRP 1 to the UE is $f_{d1}$, an average delay from the TRP 2 to the UE is $t_{d2}$, and a Doppler shift from the TRP 2 to the UE is $f_{d2}$. Time from the SRS to the TRP 1 is $t_{UE}+t_{d1}$, and a frequency from the SRS to the TRP 1 is $f_{UE}+f_{d1}$, time from the SRS to the TRP 2 is $t_{UE}+t_{d2}$, and a frequency from the SRS to the TRP 2 is $f_{UE}+f_{d2}$.

The TRP 1 and the TRP 2 exchange SRS receiving time and frequencies, and determine that $t_{d1}$ and $f_{d1}$ are used as references. A DMRS and a PDSCH that are sent by the TRP 2 are compensated for a difference $\Delta t_{fre2}=t_{d1}-t_{d2}$ and $\Delta f_{fre2}=f_{d1}-f_{d2}$, and a DMRS and a PDSCH that are sent by the TRP 1 is not compensated in terms of delay-frequency offset.

In this way, the TRP 2 may determine that the QCL indication information needs to indicate that the average delay and the Doppler shift of the DMRS are associated with the average delay and the Doppler shift of the TRS 1. In addition, because the UE does not need to differentiate between DMRSs and PDSCHs that are separately sent by the TRP 1 and the TRP 2, it is determined that the QCL indication information indicates that the Doppler spread and the delay spread of the DMRS are associated with the Doppler spreads and the delay spreads of the TRS 1 and the TRS 2.

Figure 20:
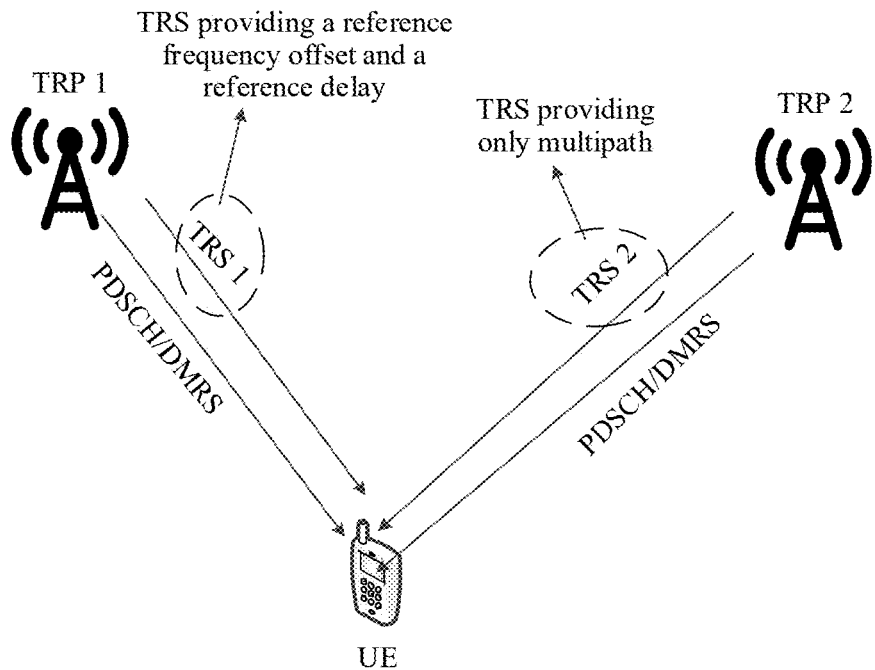
FIG. 20 is a schematic diagram of coordinated transmission performed by a TRP 1 and a TRP 2 by using a QCL indication method 1300 according to an embodiment.

It can be learned that the TRP 2 sends the QCL indication information, and the UE may determine the Doppler spread, the delay spread, the average delay, and the Doppler shift of the DMRS based on the QCL indication information after the UE receives the QCL indication information. As shown in FIG. 20, the terminal determines that the average delay of the TRS 1 is $t_{d1}$ and that the Doppler shift of the TRS 1 is $f_{d1}$, and determines, based on association between the average delay and the Doppler shift of the DMRS and the average delay and the Doppler shift of the TRS 1, that the average delay of the DMRS is equal to the average delay of the TRS 1, and that the Doppler shift of the DMRS is equal to the Doppler shift of the TRS 1. Therefore, the UE may determine that receiving time of the DMRS is $tc+t_{d1}$ and that a receiving frequency of the DMRS is $fc+f_{d1}$. It can be learned that as shown in FIG. 19, the TRP 1 does not compensate for sending the DMRS/PDSCH, and the TRP 2 compensates the DMRS/PDSCH for $\Delta t_{fre2}$ and $\Delta f_{fre2}$ before sending. Therefore, both receiving time of the DMRS/PDSCH sent by the TRP 1 and the DMRS/PDSCH sent by the TRP 2 to the UE is $tc+t_{d1}$, both receiving frequencies are $fc+f_{d1}$, and they are consistent with receiving time and a receiving frequency that are determined by the UE based on the QCL indication information, so that inter-symbol and inter-carrier interference is avoided.

In addition, as shown in FIG. 9 and FIG. 15, that the UE determines the Doppler spread and the delay spread of the DMRS based on the QCL indication information includes: The UE combines the Doppler spreads and the delay spreads of the TRS 1 and the TRS 2, to obtain the Doppler spread and the delay spread of the DMRS. Because the Doppler spread and the delay spread of the DMRS consider multipath features from the TRP 1 to the UE and from the TRP 2 to the UE, accuracy of DMRS channel estimation is higher by using the Doppler spread and the delay spread of the DMRS.

It can be learned that the QCL indication method shown in FIG. 18 helps improve multistation transmission performance.

Optionally, the TRP 1 and the TRP 2 may alternatively use another delay-frequency offset compensation rule, and notify, by using QCL indication information, the terminal of a reference delay and a reference frequency offset that correspond to the delay-frequency offset compensation rule. In the embodiment shown in FIG. 18, the QCL indication information may notify the terminal that the reference delay and the reference frequency offset are obtained based on the average delay and the Doppler shift of the TRS 1.

Optionally, in some implementations, the QCL indication information may notify the terminal that a reference delay and a reference frequency offset are obtained based on an average delay and a Doppler shift of a TRS 3. In other words, the TRS 1 and the TRS 2 may provide Doppler spreads and delay spreads, and the TRS 3 provides an average delay and a Doppler shift. For details, refer to the following related implementations. Details are not described herein.

The following describes, with reference to the foregoing indication manners of the QCL indication information, a specific indication manner of the QCL indication information in the QCL indication method in this embodiment of this disclosure. Large-scale channel parameters associated with a TRS may be represented with reference to QCL type E and QCL type C. A large-scale channel parameter of QCL type E includes a Doppler spread and a delay spread. A large-scale channel parameter of QCL type C includes an average delay and a Doppler shift. A large-scale channel parameter of QCL type A includes a Doppler spread, a delay spread, an average delay, and a Doppler shift.

In an implementation, corresponding to Implementation 1.1, in this implementation, the QCL indication information indicates two TCI states.

QCL information indicated by a TCI state 1 includes the TRS 1, and the TRS 1 is associated with QCL type A.

QCL information indicated by a TCI state 2 includes the TRS 2, and the TRS 2 is associated with QCL type E.

As shown in FIG. 20, the average delay of the TRS 1 may be used as a reference delay, the Doppler shift of the TRS 1 is used as a reference frequency offset, and the TRS 2 provides only a multipath parameter such as the delay spread and the Doppler spread. Further, the terminal performs DMRS channel estimation based on the average delay and Doppler shift of the TRS 1 and the Doppler spreads and the delay spreads of the TRS 1 and the TRS 2.

It can be learned that in this implementation, the terminal determines the Doppler spread, the delay spread, the average delay, and the Doppler shift of the DMRS based on the QCL information respectively indicated by the two TCI states configured for the DMRS. This helps improve multistation transmission performance.

In another implementation, a difference from the previous implementation lies in that QCL information indicated by a TCI state 1 includes the TRS 1 and the TRS 3, where the TRS 1 is associated with QCL type E, and the TRS 3 is associated with QCL type C. The QCL information indicated by a TCI state 2 is the same as that in the previous implementation, and includes the TRS 2, where the TRS 2 is associated with QCL type E.

When the TRS 1 or the TRS 2 is associated with QCL type C, it indicates that the terminal may use the average delay and the Doppler shift of the TRP 1 or the TRP 2 as a reference delay and a reference frequency offset. Therefore, in this implementation, the TRS 3 is used for separately associating the average delay and the Doppler shift, so that a reference delay and a reference frequency offset that are notified to the UE are not limited to an average delay and a Doppler shift of one of the TRPs. This helps a network device side not need to be limited to performing delay-frequency offset compensation on the average delay and the Doppler shift of the TRP 1 or the TRP 2 before sending, and improves flexibility of delay-frequency offset compensation on the network device side.

Figure 21:
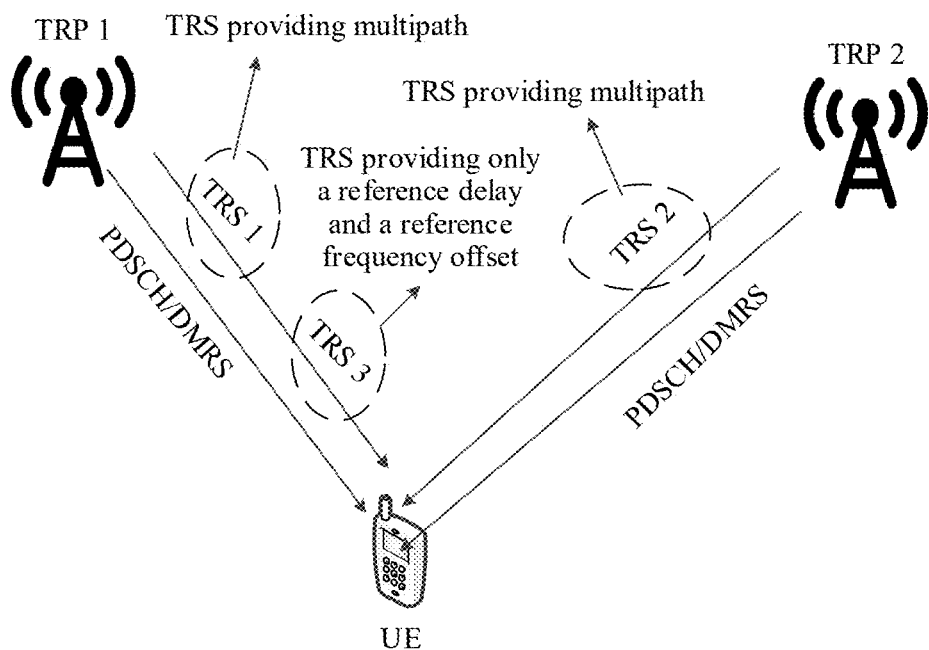
FIG. 21 is another schematic diagram of coordinated transmission performed by a TRP 1 and a TRP 2 by using a QCL indication method 1300 according to an embodiment.

As shown in FIG. 21, the TRS 1 and the TRS 2 provide only multipath parameters such as Doppler spreads and delay spreads, and the TRS 3 provides an average delay and a Doppler shift, so that sending time and frequencies of the TRS 1 and the TRS 2 may be consistent, and only a multipath Doppler spread and delay spread need to be provided. The TRP 1 compensates for sending time of the TRS 3 and then sends the DMRS, so that the receiving time determined by the terminal based on the TRS 3 is no longer limited to $t_c+t_{d1}$, and a receiving frequency is no longer limited to $f_c+f_{d1}$, for example, may be $t_c+\Delta t+t_{d1}$ and $f_c+\Delta f+f_{d1}$. This helps the terminal receive the DMRS by using $\Delta t+t_{d1}$ as a reference delay and using $\Delta f+f_{d1}$ as a reference frequency offset. In this way, both the TRP 1 and the TRP 2 may send the DMRS after performing delay-frequency offset compensation, thereby improving flexibility of delay-frequency offset compensation.

In still another implementation, corresponding to Implementation 1.2.1 in Implementation 1.2 above, the QCL indication information indicates two TCI states.

QCL information indicated by a TCI state 1 includes the TRS 1, and the TRS 1 is associated with QCL type A.

QCL information indicated by a TCI state 2 includes the TRS 2, and the TRS 2 is associated with QCL type A.

In addition, "the network device side further notifies the UE of the following information: The average delay and the Doppler shift indicated by the TCI state 2 are unavailable, and the average delay and the Doppler shift indicated by the TCI state 1 are applicable to the TCI state 2", or "the terminal learns of, based on Manner 1 or Manner 2 below, an average delay and a Doppler shift that can be used".

Figure 22:
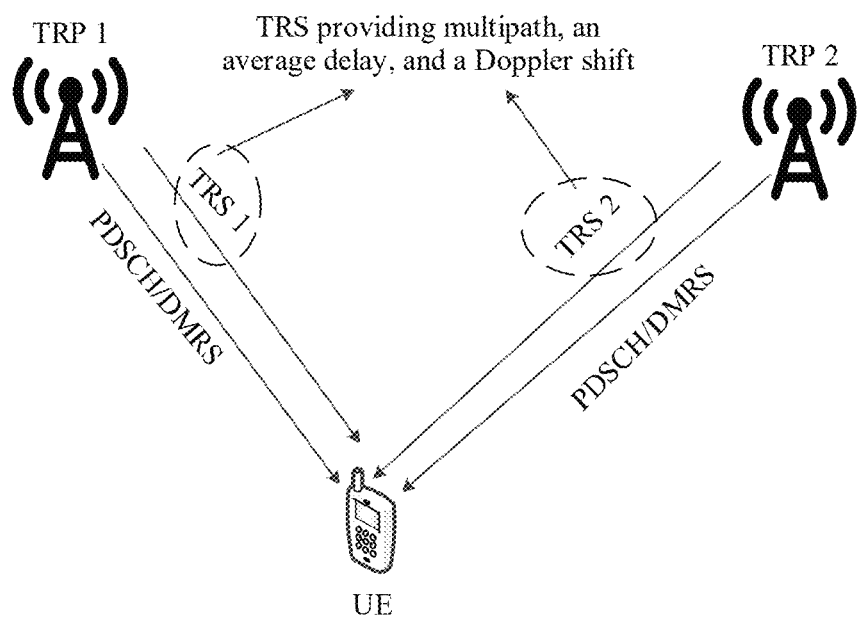
FIG. 22 is still another schematic diagram of coordinated transmission performed by a TRP 1 and a TRP 2 by using a QCL indication method 1300 according to an embodiment.

Manner 1: A priority of the TRS 1 associated with the average delay and the Doppler shift and indicated by the TCI state 1 is higher than a priority of the TRS 2 associated with the average delay and the Doppler shift and indicated by the TCI state 2. Therefore, as shown in FIG. 22, the average delay and the Doppler shift of the TRS 1 may cover the average delay and the Doppler shift of the TRS 2, so that the terminal may use the average delay and the Doppler shift of the TRS 1 as a reference delay and a reference frequency offset.

Manner 2: The QCL information indicated by the TCI state 1 further includes the TRS 3, the TRS 3 is associated with QCL type C, and a priority of the TRS 3 associated with QCL type C is higher than priorities of the TRS 1 and the TRS 2. Therefore, the terminal may use the average delay and the Doppler shift that are associated with the TRS 3 as a reference delay and a reference frequency offset. In this implementation, the TCI state 1 can indicate TRSs of two types of QCL relationships, to avoid indicating a reference delay and a reference frequency offset by using an additional TCI, and help reduce signaling overheads required by the QCL indication information.

In still another implementation, corresponding to Implementation 1.2.2 in Implementation 1.2 above, the QCL indication information indicates three TCI states.

QCL information indicated by a TCI state 1 includes the TRS 1, and the TRS 1 is associated with QCL type A.

QCL information indicated by a TCI state 2 includes the TRS 2, and the TRS 2 is associated with QCL type A.

QCL information indicated by a TCI state 3 includes the TRS 1, and the TRS 1 is associated with QCL type C; or QCL information indicated by a TCI state 3 includes the TRS 3, and the TRS 3 is associated with QCL type C.

In addition, "the network device side further notifies the UE of the following information: QCL type C indicated by the TCI state 1 and the TCI state 2 is unavailable, and QCL type C indicated by the TCI state 3 is applicable to the TCI state 1 and the TCI state 2", or "the terminal learns of, based on Manner 1 or Manner 2 below, an average delay and a Doppler shift that can be used".

Manner 1: A priority of the TRS I associated with QCL type C is higher than a priority of the TRS 2 associated with QCL type A. Therefore, the average delay and the Doppler shift of the TRS 1 may cover the average delay and the Doppler shift of the TRS 2, so that the terminal may use the average delay and the Doppler shift of the TRS 1 as a reference delay and a reference frequency offset.

Manner 2: A priority of the TRS 3 associated with only QCL type C is higher than priorities of the TRS 1 and the TRS 2. Therefore, the terminal may use the average delay and the Doppler shift associated with the TRS 3 as a reference delay and a reference frequency offset.

In this implementation, an additional TCI indicates the reference delay and the reference frequency offset, to help improve indication flexibility of the reference delay and the reference frequency offset.

In still another implementation, corresponding to Implementation 1.3.1 in Implementation 1.3 above, the QCL indication information indicates two TCI states.

QCL information indicated by a TCI state 1 includes the TRS 1, and the TRS 1 is associated with QCL type E.

QCL information indicated by a TCI state 2 includes the TRS 2, and the TRS 2 is associated with QCL type E.

In addition, in this implementation, the reference delay and the reference frequency offset are indicated in the following manners.

Manner 1: The QCL information indicated by the TCI state 1 further includes the TRS 1, and the TRS 1 is associated with QCL type C. It can be learned that in this manner, the TRS 1 may be associated with two large-scale channel parameters. This helps notify the terminal that the average delay and the Doppler shift of the TRS 1 are used as the reference delay and the reference frequency offset.

Manner 2: The QCL information indicated by the TCI state 1 further includes the TRS 3, and the TRS 3 is associated with QCL type C. It can be learned that in this manner, the TCI state 1 may additionally indicate that the TRS 3 is associated with QCL type C, to improve indication flexibility of the reference delay and the reference frequency offset. In this case, the reference delay and the reference frequency offset do not need to be adjusted to be the same as those of a TRP. For example, a base station may adjust them to a compromise value.

In still another implementation, corresponding to Implementation 1.3.2 in Implementation 1.3 above, the QCL indication information indicates three TCI states.

QCL information indicated by a TCI state 1 includes the TRS 1, and the TRS 1 is associated with QCL type E.

QCL information indicated by a TCI state 2 includes the TRS 2, and the TRS 2 is associated with QCL type E.

QCL information indicated by a TCI state 3 includes the TRS 1, and the TRS 1 is associated with QCL type C; or QCL information indicated by a TCI state 3 includes the TRS 3, and the TRS 3 is associated with QCL type C.

It can be learned that in this implementation, another TCI state notifies the terminal of a reference delay and a reference frequency offset, to improve indication flexibility of the reference delay and the reference frequency offset.

In addition, in addition to indicating the average delay, the Doppler shift, the Doppler spread, and the delay spread in the foregoing implementation, in a high-frequency communication scenario, the QCL indication information may indicate, by using one of the two TCI states or an additional TCI state, a TRS and a spatial parameter associated with the TRS, to help improve multistation transmission performance in a coordinated multistation scenario in combination with the high-frequency communication scenario. A related implementation in which one of the two TCI states or the additional TCI state indicates the TRS and the spatial parameter associated with the TRS is similar to the manner of indicating the QCL type C in the implementations, and a difference lies in that indicated parameters are different. Details are not described herein again.

In addition, in this embodiment of this application, the two TCI states or the three TCI states may be located in a same TCI field, or may be located in a plurality of TCI fields. The two TCI states or the three TCI states may be transmitted by using a same piece of DCI, or may be transmitted by using two pieces of DCI or three pieces of DCI.

If a plurality of pieces of DCI indicate the association relationships indicated by the foregoing various QCL indication information, there may be but not limited to the following implementations:

In an implementation, corresponding to Implementation 2.1 above, in the two pieces of DCI:

QCL information indicated by DCI 1 includes the TRS 1, and the TRS 1 is associated with QCL type A.

QCL information indicated by DCI 2 includes the TRS 2, and the TRS 2 is associated with QCL type E.

In addition, the UE is notified to use the average delay and the Doppler shift indicated in the DCI 1.

In another implementation, corresponding to Implementation 2.2.1 in Implementation 2.2, in the two pieces of DCI:

QCL information indicated by DCI 1 includes the TRS 1, and the TRS 1 is associated with QCL type A.

QCL information indicated by DCI 2 includes the TRS 2, and the TRS 2 is associated with QCL type A.

In addition, "the network device side further notifies the UE of the following information: The average delay and the Doppler shift indicated by the DCI 2 are unavailable, and the average delay and the Doppler shift indicated by the DCI 1 are applicable to the DCI 2", or "the terminal learns of, based on the following manners, the average delay and the Doppler shift that can be used".

In this manner, a priority of the TRS 1 associated with the average delay and the Doppler shift and indicated by the DCI 1 is higher than a priority of the TRS 2 associated with the average delay and the Doppler shift and indicated by the DCI 2. Therefore, the average delay and Doppler shift associated with the TRS 1 may cover the average delay and Doppler shift associated with the TRS 2.

In still another implementation, corresponding to Implementation 2.2.2 in Implementation 2.2, in the three pieces of DCI:

QCL information indicated by DCI 1 includes the TRS 1, and the TRS 1 is associated with QCL type A.

QCL information indicated by DCI 2 includes the TRS 2, and the TRS 2 is associated with QCL type A.

QCL information indicated by DCI 3 includes the TRS 3, and the TRS 3 is associated with QCL type C; or QCL information indicated by DCI 3 includes the TRS 1, and the TRS 1 is associated with QCL type C.

In addition, "the network device side further notifies the UE of the following information: The average delay and the Doppler shift indicated by the DCI 1 and the DCI 2 are unavailable, and the average delay and the Doppler shift indicated by the DCI 3 are applicable to the DCI 1 and the DCI 2", or "the terminal learns of, based on Manner 1 or Manner 2 below, an average delay and a Doppler shift that can be used".

Manner 1: A priority of the TRS 3 associated with QCL type C and indicated by the DCI 3 is higher than a priority of the TRS 1 indicated by the DCI 1 and a priority of the TRS 2 indicated by the DCI 2. Therefore, QCL type C associated with the TRS 3 may cover the average delays and Doppler shifts associated with the TRS 1 and the TRS 2.

Manner 2: A priority of the average delay associated with the TRS 1 and indicated by the DCI 3 is higher than priorities of the average delays indicated by the DCI 1 and the DCI 2. Therefore, the average delay associated with the TRS 1 and indicated by the DCI 3 may cover the average delays indicated by the DCI 1 and the DCI 2.

It can be learned that in this implementation, a TRS associated with QCL type C and a TRS associated with QCL type A may be a same TRS, or may be different TRSs. It can be learned that in this implementation, additional DCI may indicate the average delay and the Doppler shift, to help improve indication flexibility of the reference delay.

In still another implementation, corresponding to Implementation 2.3 above, in the two pieces of DCI:

QCL information indicated by DCI 1 includes the TRS 1, and the TRS 1 is associated with QCL type A.

QCL information indicated by DCI 2 includes the TRS 2 and the TRS 1, the TRS 2 is associated with QCL type E, and the TRS 1 is associated with QCL type C.

It can be learned that in this implementation, the terminal may determine the average delay and the Doppler shift of the TRS 1 as a reference delay and a reference frequency offset based on the DCI 1 and the DCI 2.

It can be learned that the foregoing describes various implementations in which the QCL indication information indicates that the Doppler spread and the delay spread of the DMRS are associated with the Doppler spreads and the delay spreads of the TRS 1 and the TRS 2 and that the average delay and the Doppler shift of the DMRS are associated with the average delay and the Doppler shift of the TRS 1 in the QCL indication method. In addition, some of the foregoing implementations further describe indication of that the Doppler spread and the delay spread of the DMRS are associated with the Doppler spreads and the delay spreads of the TRS 1 and the TRS 2 and that the average delay and Doppler shift of the DMRS are associated with average delay and Doppler shift of the TRS 3. This helps the network device side not be limited to sending the DMRS after performing delay-frequency offset compensation on the TRP 1 or the TRP 2. For example, the network device side may send the DMRS after performing delay-frequency offset compensation on both the TRP 1 and the TRP 2, and notify the terminal of the reference delay and reference frequency offset by using the TRS 3.

Optionally, a difference between the QCL indication method 1400 to the QCL indication method 1900 and the foregoing embodiments lies in that at least delay spreads or Doppler spreads included in time-frequency spread information and at least Doppler shifts or average delays included in delay-frequency offset information are different. Details are not described in this application again.

This application describes the QCL indication method 2100 to the QCL indication method 2300 by using an example in which a TRP 1 and a TRP 2 coordinate to transmit data for a same terminal. As described above, the QCL indication method 2100 to the QCL indication method 2300 respectively correspond to the QCL indication method 1100 to the QCL indication method 1300. A difference lies in that in the QCL indication method 2100 to the QCL indication method 2300, a TRS 1 and a TRS 2 respectively correspond to different DMRS ports. Therefore, time-frequency spread information of each DMRS is associated with time-frequency spread information of a corresponding TRS, but delay-frequency offset information of the DMRS is associated with delay-frequency offset information of a same TRS.

In the QCL indication method 2100 to the QCL indication method 2300, the UE may differentiate between DMRSs and PDSCHs that are separately sent by the TRP 1 and the TRP 2. The TRS 1 sent by the TRP 1 and the TRS 2 sent by the TRP 2 respectively correspond to the different DMRS ports. A DMRS corresponding to the TRS 1 is referred to as a DMRS 1, and a DMRS corresponding to the TRS 2 is referred to as a DMRS 2.

In the QCL indication method 2100, QCL indication information indicates that a delay spread of the DMRS 1 is associated with a delay spread of the TRS 1, that a delay spread of the DMRS 2 is associated with a delay spread of the TRS 2, and that Doppler shifts of the DMRS 1 and the DMRS 2 are associated with a Doppler shift of the TRS 1. The TRP 2 sends the QCL indication information. The UE receives the QCL indication information.

In an implementation, the TRP 2 and the TRP 1 negotiate a frequency offset compensation rule, or a central node controls to negotiate a frequency offset compensation rule. The TRP 2 determines, according to the frequency offset compensation rule, a Doppler shift indicated by the QCL indication information. Specifically, for this implementation, refer to related content in FIG. 8. It can be learned that in this implementation, receiving frequencies at which the DMRSs/PDSCHs separately sent by the TRP 1 and the TRP 2 arrive at the UE are both $fc+f_{d1}$, and are consistent with a receiving frequency determined by the UE based on the QCL indication information, to avoid inter-carrier interference.

In addition, that the UE determines the delay spreads of the DMRS 1 and the DRMS 2 based on the QCL indication information includes: The UE obtains the delay spread of the DMRS 1 based on the delay spread of the TRS 1, and the UE obtains the delay spread of the DMRS 2 based on the delay spread of the TRS 2. Because a delay spread of each DMRS is obtained based on a delay spread of a corresponding TRS, accuracy of channel estimation of each DMRS is higher.

It can be learned that the QCL indication method 2100 also helps improve multistation transmission performance.

Optionally, the TRP 1 and the TRP 2 may alternatively use another frequency offset compensation rule, and notify, by using the QCL indication information, the terminal of a reference frequency offset corresponding to the frequency offset compensation rule. In the embodiment shown in FIG. 8, the QCL indication information may notify the terminal that the reference frequency offset is obtained based on the Doppler shift of the TRS 1.

In the QCL indication method 2100 in this embodiment of this application, for a specific indication manner of the QCL indication information, refer to a related implementation in the QCL indication method 1100. Details are not described herein again.

In the QCL indication method 2200, QCL indication information indicates that a Doppler spread of the DMRS 1 is associated with a Doppler spread of the TRS 1, that a Doppler spread of the DMRS 2 is associated with a Doppler spread of the TRS 2, and that average delays of the DMRS 1 and the DMRS 2 are associated with an average delay of the TRS 1. The TRP 2 sends the QCL indication information. The UE receives the QCL indication information.

In an implementation, the TRP 2 and a TRP 1 negotiate a delay compensation rule, or a central node controls to negotiate a delay compensation rule. The TRP 2 determines, according to the delay compensation rule, an average delay indicated by the QCL indication information. Specifically, for this implementation, refer to related content in FIG. 15. It can be learned that in this implementation, time at which the DMRSs/PDSCHs separately sent by the TRP 1 and the TRP 2 arrive at the UE is $t_{UE}+t_{d1}$, and is consistent with a delay determined by the UE based on the QCL indication information, to avoid inter-symbol interference.

In addition, that the UE determines the Doppler spreads of the DMRS 1 and the DRMS2 based on the QCL indication information includes: The UE obtains the Doppler spread of the DMRS 1 based on the Doppler spread of the TRS 1, and the UE obtains the Doppler spread of the DMRS 2 based on the Doppler spread of the TRS 2. Because a Doppler spread of each DMRS is obtained based on a Doppler spread of a corresponding TRS, accuracy of channel estimation of each DMRS is higher.

It can be learned that the QCL indication method 2200 also helps improve multistation transmission performance.

Optionally, the TRP 1 and the TRP 2 may alternatively use another delay compensation rule, and notify, by using the QCL indication information, the terminal of a reference delay corresponding to the delay compensation rule. In the embodiment shown in FIG. 15, the QCL indication information may notify the terminal that the reference delay is obtained based on the average delay of the TRS 1.

In the QCL indication method 2200 in this embodiment of this application, for a specific indication manner of the QCL indication information, refer to a related implementation in the QCL indication method 1200. Details are not described herein again.

In some implementations, the QCL indication information may notify the terminal that a reference delay is obtained based on an average delay of a TRS 3. In other words, the TRS 1 and the TRS 2 provide Doppler spreads, and the TRS 3 provides an average delay. For details, refer to the related implementation in the QCL indication method 1200. Details are not described herein again.

In the QCL indication method 2300, QCL indication information indicates that a Doppler spread of the DMRS 1 is associated with a Doppler spread of the TRS 1, that a Doppler spread of the DMRS 2 is associated with a Doppler spread of the TRS 2, and that average delays of the DMRS 1 and the DMRS 2 are associated with an average delay of the TRS 1. The TRP 2 sends the QCL indication information. The UE receives the QCL indication information.

In an implementation, the TRP 2 and a TRP 1 negotiate a delay-frequency offset compensation rule, or a central node controls to negotiate a delay compensation rule. The TRP 2 determines, according to the delay-frequency offset compensation rule, an average delay and a Doppler shift that are indicated by the QCL indication information. Specifically, for this implementation, refer to related content in FIG. 20. It can be learned that in this implementation, receiving time at which the DMRSs/PDSCHs separately sent by the TRP 1 and the TRP 2 arrive at the UE is tc+$t_{d1}$, receiving frequencies are both fc+$f_{d1}$, and they are consistent with receiving time and a receiving frequency that are determined by the UE based on the QCL indication information, to avoid inter-symbol interference and inter-carrier interference.

In addition, that the UE determines the Doppler spreads and the delay spreads of the DMRS 1 and the DRMS2 based on the QCL indication information includes: The UE obtains the Doppler spread and the delay spread of the DMRS 1 based on the Doppler spread and the delay spread of the TRS 1, and the UE obtains the Doppler spread and the delay spread of the DMRS 2 based on the Doppler spread and the delay spread of the TRS 2. Because a Doppler spread and a delay spread of each DMRS are obtained based on a Doppler spread and a delay spread of a corresponding TRS, accuracy of channel estimation of each DMRS is higher.

It can be learned that the QCL indication method 2300 also helps improve multistation transmission performance.

Optionally, the TRP 1 and the TRP 2 may alternatively use another delay-frequency offset compensation rule, and notify, by using QCL indication information, the terminal of a reference frequency offset and a reference delay that correspond to the delay-frequency offset compensation rule. In the embodiment shown in FIG. 20, the QCL indication information may notify the terminal that the reference frequency offset and the reference delay are obtained based on the average delay and the Doppler shift of the TRS 1.

In the QCL indication method 2300 in this embodiment of this application, for a specific indication manner of the QCL indication information, refer to a related implementation in the QCL indication method 1300. Details are not described herein again.

In some implementations, the QCL indication information may notify the terminal that a reference frequency offset and a reference delay are obtained based on an average delay and a Doppler shift of a TRS 3. In other words, the TRS 1 and the TRS 2 provide Doppler spreads and delay spreads, and the TRS 3 provides an average delay and a Doppler shift. For details, refer to the related implementation in the QCL indication method 1300. Details are not described herein again.

Optionally, a difference between the QCL indication method 2400 to the QCL indication method 2900 and the foregoing embodiments lies in that at least delay spreads or Doppler spreads included in time-frequency spread information and at least Doppler shifts or average delays included in delay-frequency offset information are different. Details are not described in this application again.

In addition, in the QCL indication methods provided in this disclosure, channel parameters such as a Doppler spread, an average delay, a Doppler shift, and an average delay are considered, and have great impact on channel estimation of a terminal. For example, the channel parameters may affect a frequency domain filtering coefficient, a time domain filtering coefficient, and the like of channel estimation. For another example, in a scenario in which the terminal is located in a complex scattering environment, for example, a tunnel scenario in a high-speed railway, scattering conditions from different TRPs to the terminal in the scenario are different. As a result, frequency selective features are different, frequency domain spreads are different, relative offsets are different, and consequently, propagation delays are different. For still another example, the terminal is in a high-speed movement scenario. In this scenario, because the terminal moves at a high speed and relative directions between the terminal and different network devices are different, Dopplers and delays of channels from a plurality of network devices to the terminal are different. Therefore, QCL indication information in this application indicates an association relationship between the channel parameters. This helps improve DMRS channel estimation accuracy and multistation transmission performance.

For example, in a classic algorithm such as a linear minimum mean square error (LMMSE) algorithm, the UE needs to use a channel covariance matrix $R_{hh}$ when performing channel estimation, where the covariance matrix $R_{hh}$ is obtained based on channel statistics, for example, obtained through distribution calculation corresponding to at least a delay spread or a Doppler spread, and the parameters are obtained by using a TRS.

In addition, when a plurality of TRSs correspond to different DMRS ports, in this application, that different DMRSs are sent from different TRPs through different channels and that the different DMRSs correspond to different covariance matrices $R_{hh}$ are considered. Therefore, in this application, the covariance matrices are obtained by using the corresponding TRSs, to perform channel estimation on DMRSs of different TRPs, and improve accuracy of channel estimation of the DMRSs.

When a plurality of TRSs correspond to a same DMRS port, DMRSs sent by all TRPs on a same DMRS port pass through different channels, for example, h=h1+h2, is considered. For example, when correlation between channels of different TRPs is quite low, the covariance matrix $R_{hh}$ may be calculated by using the following formula:

$$R_{hh} = R_{h_1h_1} + R_{h_2h_2} \quad \text{formula (1)}$$

It can be learned that when the covariance matrix $R_{hh}$ is calculated, features of channels from two TRPs to the terminal need to be considered, to perform channel estimation. Therefore, in this application, time-frequency spread information of a same DMRS obtained by using two pieces of time-frequency spread information covers parameters of the channels from the two TRPs to the terminal, so that channel estimation accuracy of the same DMRS can be improved.

Figure 23:
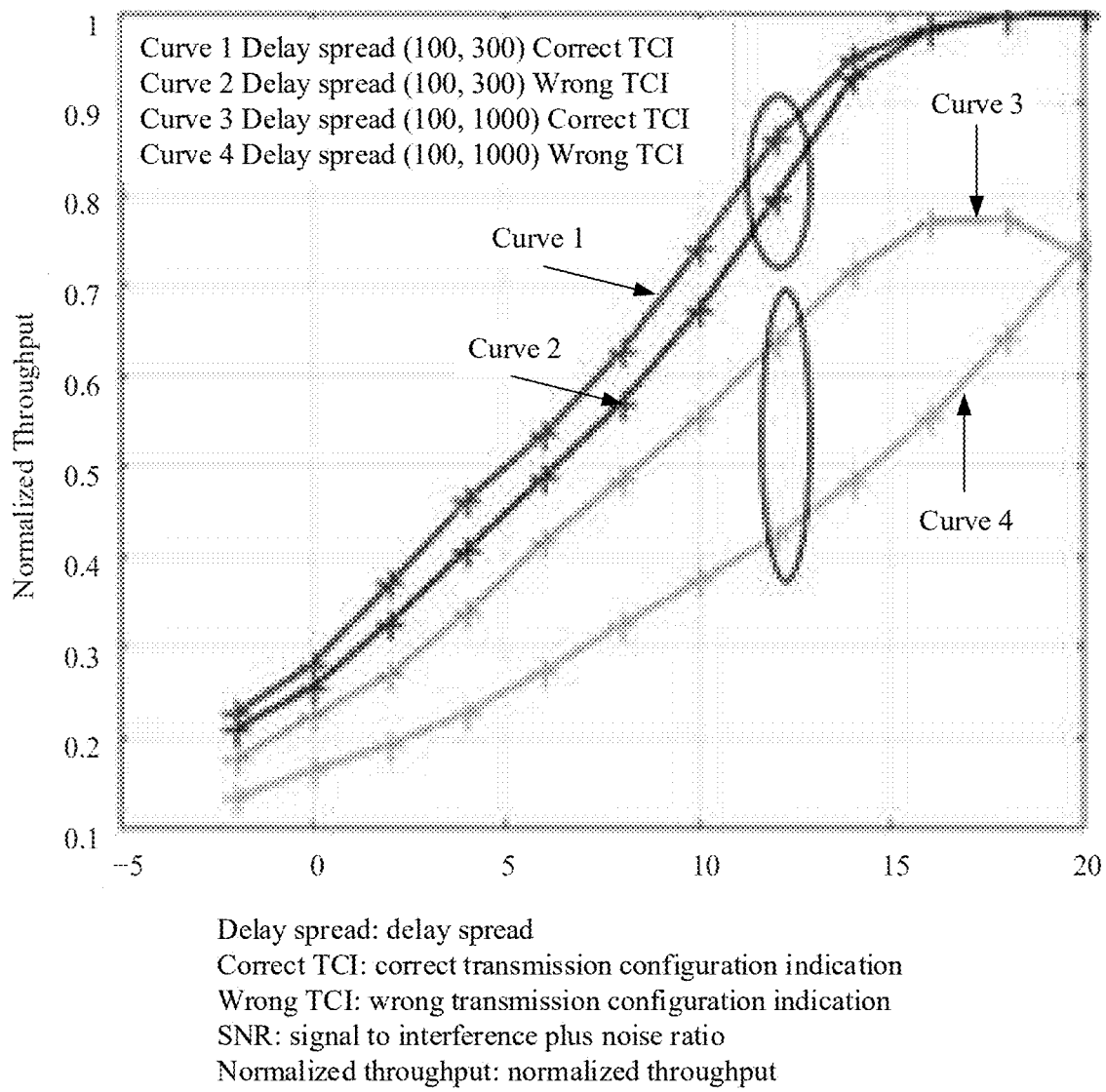
FIG. 23 is a schematic diagram of simulation of performance improvement according to an embodiment.

For example, refer to a schematic diagram of simulation shown in FIG. 23. It is assumed that a plurality of TRSs correspond to different DMRS ports. That is, for example, delay spreads of DMRSs sent by different TRPs are obtained based on delay spreads of corresponding TRSs. Beneficial effects of this embodiment of this application are described with reference to the schematic diagram of simulation. In the schematic diagram of simulation, a horizontal coordinate indicates a signal-to-noise ratio (SNR), and a vertical coordinate indicates a normalized throughput.

An assumed scenario corresponding to a curve 1 and a curve 2 is that a delay spread of a TRS 1 sent by a TRP 1 is 100 ns and that a delay spread of a TRS 2 sent by a TRP 2 is 300 ns. In this way, when DMRS ports are different in this embodiment of this application, if the terminal performs, by using the delay spread of the TRS 1, channel estimation on a DMRS 1 sent by the TRP 1, and performs, by using the delay spread of the TRS 2, channel estimation on a DMRS 2 sent by the TRP 2, performance shown by the curve 1 in the schematic diagram of simulation may be obtained. If the terminal adapts to the TRP 2 by using the delay spread of the TRS 1, that is, it is considered that delay spreads from the two TRPs to the terminal are both 100 ns, and unified channel estimation is performed on a DMRS 1 and a DMRS 2 by using the delay spread of the TRS 1, performance shown by the curve 2 in the schematic diagram of simulation may be obtained. It can be learned that the terminal uses a delay spread of a TRS indicated by a wrong TCI state, causing performance deterioration. Therefore, the terminal can improve performance by performing channel estimation by using a delay spread of a corresponding TRS in this embodiment.

For another example, an assumed scenario corresponding to a curve 3 and a curve 4 is that a delay spread of a TRS I sent by a TRP 1 is 100 ns and that a delay spread of a TRS 2 sent by a TRP 2 is 1000 ns. In this way, when DMRS ports are different in this embodiment of this application, if the terminal performs, by using the delay spread of the TRS 1, channel estimation on a DMRS 1 sent by the TRP 1, and performs, by using the delay spread of the TRS 2, channel estimation on a DMRS 2 sent by the TRP 2, performance shown by the curve 3 in the schematic diagram of simulation may be obtained. If the terminal adapts to the TRP 2 by using the delay spread of the TRS 1, that is, it is considered that delay spreads from the two TRPs to the terminal are both 100 ns, and unified channel estimation is performed on a DMRS 1 and a DMRS 2 by using the delay spread of the TRS 1, performance shown by the curve 4 in the schematic diagram of simulation may be obtained. It can be learned that the terminal uses a delay spread of a TRS indicated by a wrong TCI state, causing performance deterioration. Therefore, the terminal can improve performance by performing channel estimation by using a delay spread of a corresponding TRS in this embodiment of this application. In addition, in the assumed scenarios of the curve 3 and the curve 4, a difference between parameters of channels from the TRPs to the terminal is large. Therefore, performance improvement obtained by using the solution in this embodiment of this application is also greater.

For another example, a Doppler shift is used as an example. As described above, the terminal determines, based only on a Doppler shift of a TRS 1, a receiving frequency of receiving a DMRS, and performs frequency offset compensation on a sending frequency fc. When a TRP 2 sends a DMRS through frequency offset compensation, this helps the terminal obtain a correct reference frequency offset $f_{d1}$. Compared with a current case in which it is assumed that different frequency offset compensation is used for different DMRSs, because a Doppler shift that is of a TRS 2 and that the terminal learns of is not a Doppler shift of a DMRS sent by the TRP 2, the terminal obtains a wrong reference frequency offset by using the Doppler shift of the TRS 2.

In a simulation diagram shown in FIG. 24, a horizontal coordinate indicates a signal-to-noise ratio (SNR), and a vertical coordinate indicates a normalized throughput; and a value after a frequency offset represents a difference between a reference frequency offset used by a terminal and an actual reference frequency offset. A curve 1-1 to a curve 1-3 represent a non-coherent joint transmission (NCJT) scenario, that is, a case in which a plurality of TRSs correspond to different DMRS ports. The curve 1-1 represents system performance corresponding to using a correct reference frequency offset by using the QCL indication methods in embodiments of this application. The curve 1-2 represents system performance corresponding to a case in which a difference between a used wrong reference frequency offset and an actual reference frequency offset is 200 Hz. The curve 1-3 represents system performance corresponding to a case in which a difference between a used wrong reference frequency offset and an actual reference frequency offset is 400 Hz. It can be learned that a larger difference between the wrong reference frequency offset used by the terminal and the actual reference frequency offset results in increasingly lower performance.

In a simulation diagram shown in FIG. 24, a curve 2-1 to a curve 2-3 represent a single frequency network (SFN) scenario, that is, a case in which a plurality of TRSs correspond to a same DMRS port. The curve 2-1 represents system performance corresponding to using a correct reference frequency offset by using the QCL indication methods in embodiments of this application. The curve 2-2 represents system performance corresponding to a case in which a difference between a used wrong reference frequency offset and an actual reference frequency offset is 200 Hz. The curve 2-3 represents system performance corresponding to a case in which a difference between a used wrong reference frequency offset and an actual reference frequency offset is 400 Hz. Similarly, a larger difference between the wrong reference frequency offset used by the terminal and the actual reference frequency offset results in increasingly lower performance.

In addition, in this application, it is considered that in the QCL indication methods 1100 to 1900, processing of UE is relatively complex (for example, when the UE combines a plurality of delay spreads, weighted combination of delay power spectral integrals of a plurality of TRSs needs to be performed) when a plurality of TCI states correspond to a same DMRS port. Therefore, in this application, the following plurality of implementations are used as an example to further limit a baseband processing capability required by the UE in this case, to reduce a processing burden of the UE and improve system performance by taking a compromise into consideration of a processing capability of the UE.

In an implementation, when the plurality of TCI states correspond to the same DMRS port, in this application, a quantity of DMRS ports may be limited to not exceeding a limited value, for example, 1 or 2. The limited value may be predefined in a protocol.

In another implementation, when the plurality of TCI states correspond to the same DMRS port, in this application, a quantity of TCI states corresponding to a same DMRS may be limited to not exceeding a specific value, for example, 2 or 3.

In still another implementation, the UE reports a corresponding capability. For example, the UE reports a quantity of DMRS ports supported in this case, a quantity of TCI states corresponding to a same DMRS, and the like. Further, the UE may determine a correspondence between a TCI state and a DMRS port according to a quantity of DMRS ports configured by a network device and a quantity of TCI states. For example, when the network device configures one DMRS port, the UE assumes that a plurality of TCI states correspond to the same DMRS port; or when the network device configures two DMRS ports, the UE assumes that a plurality of TCI states correspond to the two different DMRS ports.

It can be learned that the foregoing implementations can reduce the processing burden of the UE, and improve system performance by taking a compromise into consideration of the processing capability of the UE.

In addition, in embodiments of this disclosure, the same DMRS port corresponding to the plurality of TCI states is a DMRS port on a same time-frequency resource. The time-frequency resource herein may be a resource including a same physical resource block, precoding resource group (PRG), slot, PDSCH allocation symbol, and the like. For example, a DMRS 1 corresponds to a TCI state 1 and a TCI state 2 in both a PRG 1 and a PRG 2 in a slot 1.

Figure 25:
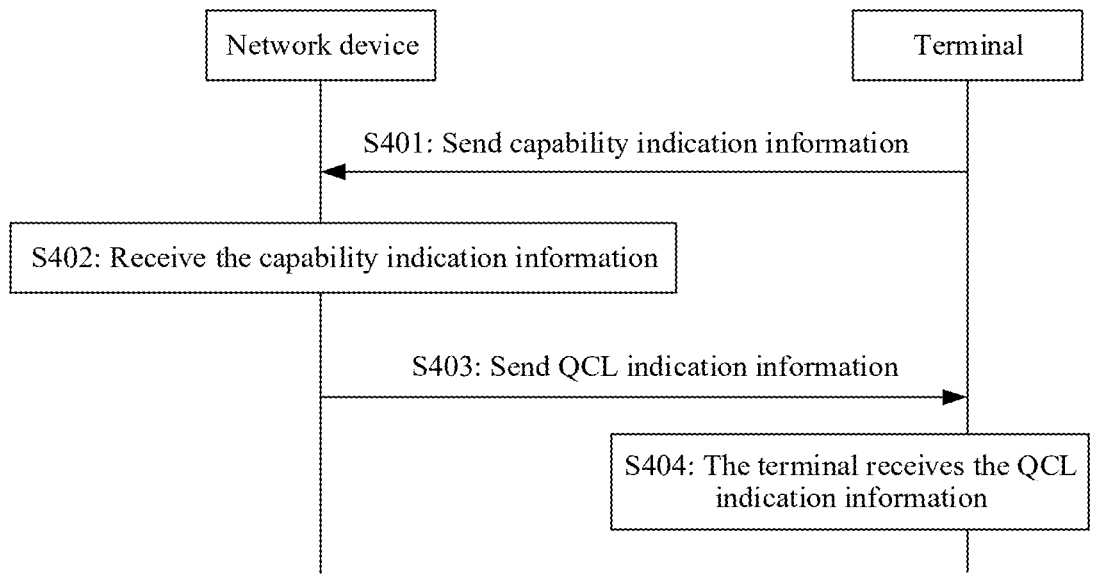
FIG. 25 is a schematic flowchart of a QCL indication method 3100 according to an embodiment.

To improve multistation transmission performance, this application further provides a QCL indication method 3100. In the QCL indication method 3100, a network device side does not perform pre-compensation. To be specific, the network device side does not perform delay-frequency offset compensation when sending a DMRS and a PDSCH, but UE performs delay-frequency offset compensation. Specifically, as shown in FIG. 25, the QCL indication method 3100 includes but is not limited to the following operations.

S401: A terminal sends capability indication information, where the capability indication information indicates that the UE supports at least a delay or frequency offset compensation capability that is based on a plurality of pieces of QCL information.

S402: The network device receives the capability indication information.

S403: The network device sends QCL indication information to the terminal, where the QCL indication information indicates that time-frequency spread information and delay-frequency offset information of the DMRS are associated with time-frequency spread information of N TRSs.

S404: The terminal receives the QCL indication information.

Further, the terminal determines the time-frequency spread information and the delay-frequency offset information of the DMRS based on the QCL indication information.

In an implementation, the terminal combines the time-frequency spread information of the N TRSs to obtain the time-frequency spread information of the DMRS. It can be learned that in this implementation, multipath features of a plurality of TRSs are considered, so that channel estimation accuracy can be improved when DMRS channel estimation is performed based on the obtained time-frequency spread information of the DMRS.

In an implementation, the terminal may determine the delay-frequency offset information of the DMRS by using delay-frequency offset information of M TRSs. For example, the terminal may use at least Doppler shifts or average delays of M of the N TRSs as at least a reference frequency offset or a reference delay, compensate for DMRSs and PDSCHs sent by L remaining TRPs, and then separately receive the DMRSs and the PDSCHs.

It can be learned that in the QCL indication method 3100, large-scale channel parameters from N TRPs to the terminal may be estimated, to compensate, based on the determined at least reference frequency offset or reference delay, for a signal loss caused by different large-scale channel parameters of the TRPs.

For example, a TRP 1 and a TRP 2 coordinate to transmit data for a same terminal. That is, N is equal to 2, and M is equal to 1. The UE does not need to differentiate between DMRSs and PDSCHs separately sent by the TRP 1 and the TRP 2, and DMRS ports respectively corresponding to a TRS I sent by the TRP 1 and a TRS 2 sent by the TRP 2 are the same. The QCL indication information indicates that an average delay, a Doppler shift, a Doppler spread, and a delay spread of the DMRS are associated with average delays, Doppler shifts, Doppler spreads, and delay spreads of the TRS 1 and the TRS 2. Therefore, the terminal may combine the Doppler spreads and the delay spreads of the TRS 1 and the TRS 2, to obtain the Doppler spread and the delay spread of the DMRS; and perform DMRS channel estimation based on the Doppler spread and the delay spread of the DMRS, to improve multistation transmission performance. For another example, the UE needs to differentiate between DMRSs and PDSCHs that are separately sent by the TRP 1 and the TRP 2, and DMRS ports respectively corresponding to a TRS I sent by the TRP 1 and a TRS 2 sent by the TRP 2 are different. The QCL indication information indicates that an average delay, a Doppler shift, a Doppler spread, and a delay spread of a DMRS 1 are associated with an average delay, a Doppler shift, a Doppler spread, and a delay spread of the TRS 1 and that an average delay, a Doppler shift, a Doppler spread, and a delay spread of a DMRS 2 are associated with an average delay, a Doppler shift, a Doppler spread, and a delay spread of the TRS 2. Therefore, the terminal may obtain the Doppler spread and the delay spread of the DMRS 1 based on the Doppler spread and the delay spread of the TRS 1, and obtain the Doppler spread and the delay spread of the DMRS 2 based on the Doppler spread and the delay spread of the TRS 2, to separately perform channel estimation of the DMRS 1 and the DMRS 2. In addition, the average delay and the Doppler shift of the TRS 1 are used as a reference delay and a reference frequency offset, and receiving time and a receiving frequency of the DMRS 2 are compensated; or the average delay and the Doppler shift of the TRS 2 are used as a reference delay and a reference frequency offset, and receiving time and a receiving frequency of the DMRS 1 are compensated, so that receiving time and receiving frequencies of the DMRS 1 and the DMRS 2 are the same, and a signal loss caused by different large-scale channel parameters of the TRP 1 and the TRP 2 is compensated, to improve multistation transmission performance.

If transmit powers of a plurality of TRPs are different, in this application, the terminal further needs to perform power assumption on a DMRS for receiving. For example, the terminal considers that average gains of DMRSs from a same TRP are the same. The DMRSs from the same TRP may be represented as DMRS ports from a same code division group, or may be considered as DMRS ports corresponding to same QCL information. The DMRSs from the same TRP may be on different time-frequency resources, for example, on different frequency domain resources. In this case, the UE may consider that average gains of DMRSs in the frequency domain resources corresponding to the same QCL information are the same.

Further, the terminal may consider that average gains of DMRSs from different TRPs do not exceed a threshold. The threshold may be a capability reported by the terminal. This indicates that although power of receiving signals from a plurality of TRPs to the terminal is different, the difference should not exceed a threshold, where exceeding of the threshold causes a case in which the terminal may completely fail to receive signals from some TRPs or that signal receiving quality is poor.

For example, when delay spreads of a plurality of TRSs indicated by a plurality of TCI states are associated with a delay spread of a same DMRS, and the terminal calculates a covariance matrix by using formula (1), power gains corresponding to the plurality of TCI states need to be used. For example, the terminal needs to perform, by using power as a coefficient, weighted summation on delay power spectrums corresponding to the plurality of TCI states, to obtain the delay spread of the DMRS. Optionally, the terminal may obtain channel correlation by using the delay power spectrums corresponding to the plurality of TCI states, and then perform weighted summation on channel correlation of the plurality of TRPs, to obtain a total channel correlation of channels.

In addition, any one of the QCL indication method 1100 to the QCL indication method 1900 or any one of the QCL indication method 2100 to the QCL indication method 2900 may be applied to receiving of a physical downlink control channel (PDCCH). In this way, the DMRS may be a DMRS on the PDCCH. Details are not described herein again.

In addition, this application further provides a signal transmission method 4000. In the signal transmission method 4000, a terminal receives QCL indication information, where an association relationship indicated by the QCL indication information is any association relationship in the QCL indication method 1100 to the QCL indication method 1900, or an association relationship indicated by the QCL indication information is any association relationship in the QCL indication method 2100 to the QCL indication method 2900. Further, the terminal may send an uplink signal based on the QCL indication information.

That the terminal may send the uplink signal based on the QCL indication information may be: The terminal determines at least a reference frequency offset or a reference delay of downlink transmission based on the QCL indication information; the terminal determines at least a sending frequency or sending time of uplink transmission based on at least the reference frequency offset or the reference delay of the downlink transmission; and the terminal sends the uplink signal based on at least the sending frequency or the sending time of the uplink transmission.

Optionally, the QCL indication information in this implementation may include only content related to at least a Doppler shift or an average delay in the QCL indication information in the QCL indication method 1100 to the QCL indication method 1900 and the QCL indication method 2100 to the QCL indication method 2900, and content related to a Doppler spread and a delay spread does not need to be considered.

In an implementation, in a TDD case, uplink and downlink transmission is performed on a same frequency. That the terminal determines the sending frequency of the uplink transmission based on the reference frequency offset of the downlink transmission may be: The terminal determines a receiving frequency based on the reference frequency offset of the downlink transmission, and applies the receiving frequency to the sending frequency of the uplink transmission, to send the uplink signal.

In another implementation, in an FDD case, uplink and downlink transmission is not at a same frequency. That the terminal determines the sending frequency of the uplink transmission based on the reference frequency offset of the downlink transmission may be: The terminal determines a receiving frequency based on the reference frequency offset of the downlink transmission, and then determines the sending frequency of the uplink transmission based on the receiving frequency and a difference between uplink and downlink frequencies, to send the uplink signal. The difference between the uplink and downlink frequencies may be notified by a network device side.

That the terminal determines the sending time of the uplink transmission based on the reference delay of the downlink transmission may be: The terminal determines receiving time based on the reference delay of the downlink transmission, and determines the sending time of the uplink transmission based on the receiving time and a timing advance (TA), to send the uplink signal.

Figure 26:
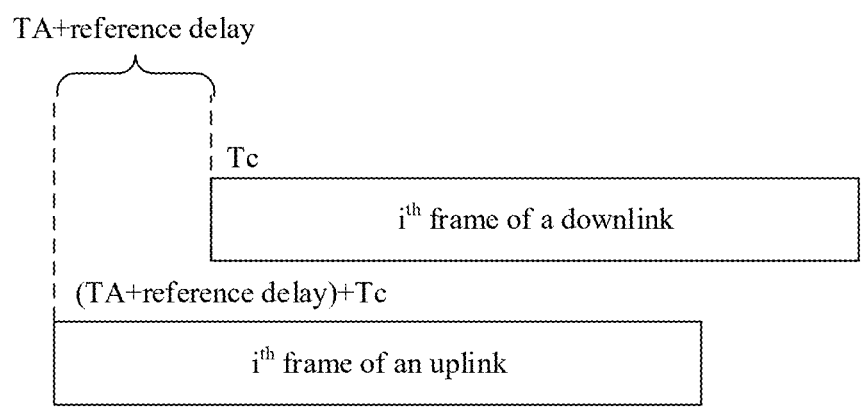
FIG. 26 is a schematic diagram of an uplink signal sending time according to an embodiment.

In other words, for a time unit, a terminal adds a corresponding TA and an adjustment amount of a reference delay to downlink receiving time, to determine sending time for sending a signal in an uplink time unit. For example, as shown in FIG. 26, an $i^{th}$ frame of a downlink and an $i^{th}$ frame of an uplink represent a relationship between uplink and downlink time, and the $i^{th}$ frame of the uplink needs to advance an adjustment amount of a sum of a TA and a reference delay based on downlink receiving time Tc.

In this application, the uplink signal may include a physical uplink shared channel (PUSCH), a sounding reference signal (Sounding reference signal, SRS), a physical uplink control channel (PUCCH), a physical random access channel (PRACH), or the like.

It can be learned that in the signal transmission method 4000, the terminal may obtain, with reference to the QCL indication information, the sending frequency or the sending time of the uplink signal, to send the uplink signal, so that channels arriving at a plurality of TRPs have a same large-scale channel parameter, to avoid carrier interference and symbol interference, and improve coordinated multistation transmission performance.

In embodiments provided in this disclosure, the methods provided in embodiments of this application are described from perspectives of the network device, the terminal, and interaction between the network device and the terminal. To implement the functions of the methods provided in embodiments of this application, both the network device and the terminal may include a hardware structure and a software module, to implement the functions in a form of the hardware structure, the software module, or a combination of the hardware structure and the software module. One of the foregoing functions may be performed by using the hardware structure, the software module, or the combination of the hardware structure and the software module.

Figure 27:
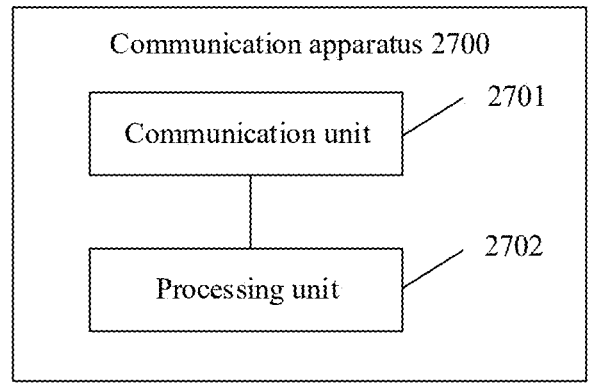
FIG. 27 is a schematic diagram of a structure of a communication apparatus according to an embodiment.

FIG. 27 is a schematic diagram of a structure of a communication apparatus according to an embodiment of this application. The communication apparatus 2700 shown in FIG. 27 may include a communication unit 2701 and a processing unit 2702. The communication unit 2701 may include a sending unit and a receiving unit. The sending unit is configured to implement a sending function, the receiving unit is configured to implement a receiving function, and the communication unit 2701 may implement at least the sending function or the receiving function. The communication unit may also be described as a transceiver unit.

The communication apparatus 2700 may be a network device or a terminal device, or may be an apparatus in the network device or the terminal device.

In an implementation, the communication apparatus 2700 includes the communication unit 2701 and the processing unit 2702, and may perform related operations of the terminal in the foregoing embodiments.

The communication unit 2701 is configured to receive quasi co-location QCL indication information, where the QCL indication information indicates that a delay spread of a demodulation reference signal DMRS is associated with delay spreads of N tracking reference signals TRSs, that a Doppler spread of the DMRS is associated with Doppler spreads of the N TRSs, that an average delay of the DMRS is associated with average delays of M TRSs, and that a Doppler shift of the DMRS is associated with Doppler shifts of the M TRSs, N is greater than or equal to 2, and M is greater than or equal to 1. It can be learned that in coordinated multistation transmission, the communication apparatus 2700 tracks Doppler spreads and delay spreads between N network devices and the terminal by using the N TRSs, and obtains the Doppler spread and the delay spread of the DMRS by combining the N Doppler spreads and delay spreads. This is more compliant with a multipath feature of separately sending a same DMRS by the N network devices, and helps improve DMRS channel estimation accuracy.

In addition, the communication apparatus 2700 helps a network device send a DMRS and a physical downlink shared channel PDSCH through delay-frequency offset compensation, so that delays and frequency offsets of DMRSs and PDSCHs from different network devices to the terminal are the same. In addition, the terminal may determine, by using the average delays and the Doppler shifts of the M TRSs, a corresponding reference delay and reference frequency offset to receive the DMRSs and the PDSCHs. This avoids performance deterioration caused by using a wrong reference delay and reference frequency offset by the terminal. Therefore, the communication apparatus 2700 helps improve multistation transmission performance.

For related content of the foregoing implementations, refer to related content of the foregoing method embodiments. Details are not described herein again.

In addition, the communication apparatus 2700 may further perform related operations of the terminal in any method in the foregoing method embodiments. Details are not described herein again.

In another implementation, the communication apparatus 2700 includes the communication unit 2701 and the processing unit 2702, and may perform related operations of the network device in the foregoing embodiments.

The processing unit 2702 is configured to determine quasi co-location QCL indication information, where the QCL indication information indicates that a delay spread of a demodulation reference signal DMRS is associated with delay spreads of N tracking reference signals TRSs, that a Doppler spread of the DMRS is associated with Doppler spreads of the N TRSs, that an average delay of the DMRS is associated with average delays of M TRSs, and that a Doppler shift of the DMRS is associated with Doppler shifts of the M TRSs, N is greater than or equal to 2, and M is greater than or equal to 1.

The communication unit 2701 is configured to send the QCL indication information.

It can be learned that in coordinated multistation transmission, Doppler spreads and delay spreads between N network devices and a terminal are tracked by using the N TRSs, so that the terminal obtains the Doppler spread and the delay spread of the DMRS by combining the N Doppler spreads and delay spreads. This is more compliant with a multipath feature of coordinating to send a same DMRS by the communication apparatus 2700 and another network device, and helps improve accuracy of DMRS channel estimation performed by the terminal.

In a scenario in which a scattering environment of the terminal is complex, for example, a tunnel scenario in a high-speed railway, because scattering conditions from different network devices to the terminal in the scenario are different, frequency selection and delay features are different, and Doppler spreads in frequency domain and delay spreads in time domain are different. Therefore, the communication apparatus 2700 helps the terminal obtain the Doppler spread and the delay spread of the DMRS by using Doppler spreads and delay spreads of a plurality of TRSs, and helps improve accuracy of DMRS channel estimation performed by the terminal in the scenario.

In addition, the communication apparatus 2700 helps send a DMRS and a physical downlink shared channel PDSCH through delay-frequency offset compensation, so that delays and frequency offsets of DMRSs and PDSCHs from different network devices to the terminal are the same. In addition, the communication apparatus 2700 helps the terminal determine, by using the average delays and the Doppler shifts of the M TRSs, a corresponding reference delay and a reference frequency offset to receive the DMRSs and the PDSCHs. This avoids performance deterioration caused by using a wrong reference delay and reference frequency offset by the terminal. Therefore, the communication apparatus 2700 helps improve multistation transmission performance.

For related content of the foregoing implementations, refer to related content of the foregoing method embodiments. Details are not described herein again.

In addition, the communication apparatus 2700 may further perform related operations of the network device in any method in the foregoing method embodiments. Details are not described herein again.

Figure 28:
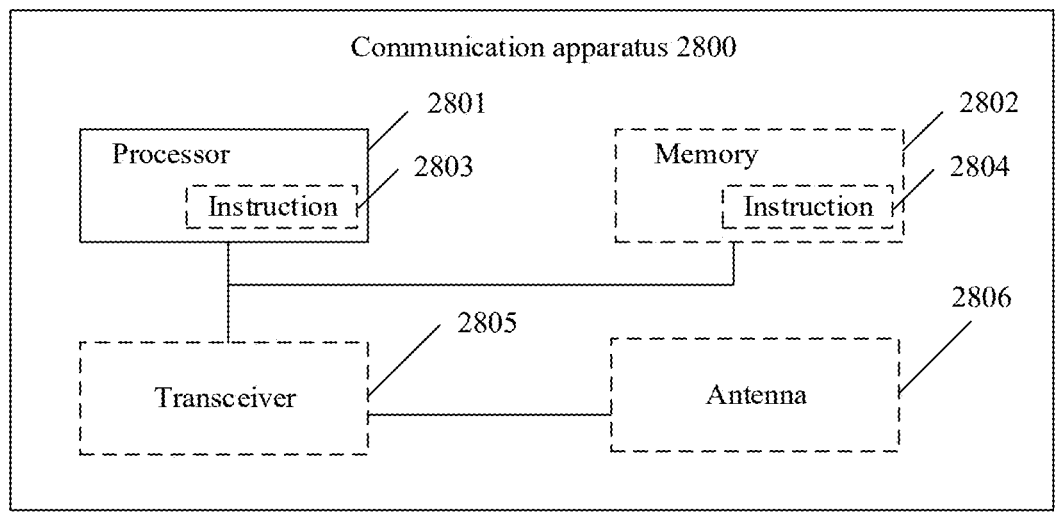
FIG. 28 is a schematic diagram of a structure of another communication apparatus according to an embodiment.

FIG. 28 is a schematic diagram of a structure of another communication apparatus according to an embodiment of this disclosure. The communication apparatus 2800 may be a network device, may be a terminal device, or may be a chip, a chip system, a processor, or the like that supports the terminal device or the network device in implementing the foregoing methods, or may be a chip, a chip system, a processor, or the like that supports the terminal device or the network device in implementing the foregoing methods. The communication apparatus may be configured to implement the methods described in the foregoing method embodiments. For details, refer to the descriptions in the foregoing method embodiments.

The communication apparatus 2800 may include one or more processors 2801. The processor 2801 may be a general purpose processor, a dedicated processor, or the like. The processor 2801 may be configured to control the communication apparatus (for example, the terminal device or the network device), execute a software program, and process data of the software program.

Optionally, the communication apparatus 2800 may include one or more memories 2802 that may store an instruction 2804. The instruction may be run on the processor 2801, so that the communication apparatus 2800 performs the methods described in the foregoing method embodiments. Optionally, the memory 2802 may further store data. The processor 2801 and the memory 2802 may be separately disposed, or may be integrated with each other.

Optionally, the communication apparatus 2800 may further include a transceiver 2805 and an antenna 2806. The transceiver 2805 may be referred to as a transceiver unit, a transceiver circuit, or the like, and is configured to implement a transceiver function. The transceiver 2805 may include a receiver and a transmitter. The receiver may be referred to as a receiver circuit or the like, and is configured to implement a receiving function. The transmitter may be referred to as a transmitter circuit or the like, and is configured to implement a sending function.

In an optional implementation, the communication apparatus 2800 performs related operations of the terminal device in the foregoing method embodiments, and the transceiver 2805 may be configured to perform the operation of S103 in FIG. 7, the operation of S203 in FIG. 13, the operation of S303 in FIG. 18, and the operations of S401 and S404 in FIG. 25.

In another optional implementation, the communication apparatus 2800 performs related operations of the network device in the foregoing method embodiments, and the processor 2801 may be configured to perform the operations of S101 and S102 in FIG. 7, the operations of S201 and S202 in FIG. 13, the operations of S301 and S302 in FIG. 18, and the operations of S402 and S403 in FIG. 25.

For other related content of the communication apparatus, refer to related operations of related content in the foregoing method embodiments. Details are not described herein again.

In another possible design, the transceiver may be a transceiver circuit, an interface, or an interface circuit. The transceiver circuit, the interface, or the interface circuit configured to implement receiving and sending functions may be separated, or may be integrated together. The transceiver circuit, the interface, or the interface circuit may be configured to read and write code/data, or the transceiver circuit, the interface, or the interface circuit may be configured to transmit or transfer a signal.

In still another possible design, optionally, the processor 2801 may store an instruction 2803. The instruction 2803 is run on the processor 2801, so that the communication apparatus 2800 performs the methods described in the foregoing method embodiments. The instructions 2803 may be fixed in the processor 2801. In this case, the processor 2801 may be implemented by hardware.

In still another possible design, the communication apparatus 2800 may include a circuit, and the circuit may implement the sending, receiving, or communication function in the foregoing method embodiments.

The processor and the transceiver that are described in this disclosure may be implemented on an integrated circuit (IC), an analog IC, a radio frequency integrated circuit RFIC, a mixed-signal IC, an application specific integrated circuit (ASIC), a printed circuit board (PCB), an electronic device, or the like.

The communication apparatus described in the foregoing embodiment may be the network device, the terminal device. However, a range of the communication apparatus described in this application is not limited thereto, and a structure of the communication apparatus may not be limited to FIG. 28. The communication apparatus may be an independent device or may be a part of a large device. For example, the communication apparatus may be:

(1) an independent integrated circuit IC, a chip, or a chip system or subsystem;

(2) a set of one or more ICs, where optionally, the IC set may also include a storage component configured to store data and instructions;

(3) an ASIC such as a modem;

(4) a module that can be embedded in another device;

(5) a receiver, an intelligent terminal, a wireless device, a handheld device, a mobile unit, a vehicle-mounted device, a cloud device, an artificial intelligence device, and the like; and (6) others.

Figure 29:
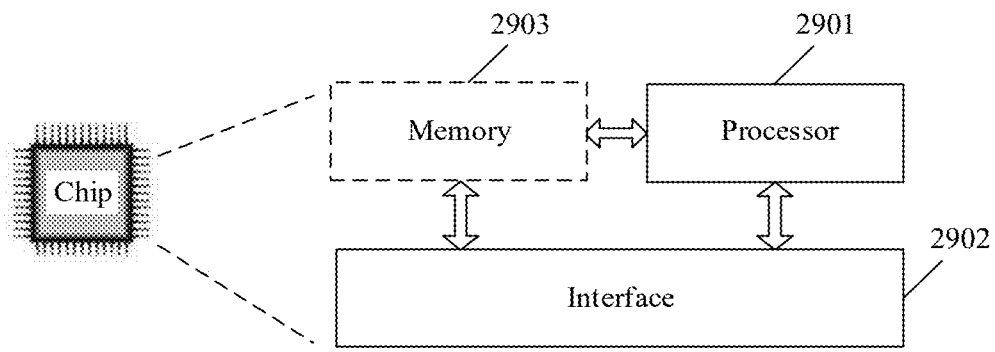
FIG. 29 is a schematic diagram of a structure of a chip according to an embodiment.

When a communication apparatus may be a chip or a chip system, refer to a schematic diagram of a structure of a chip shown in FIG. 29. The chip 2900 shown in FIG. 29 includes a processor 2901, and an interface 2902. There may be one or more processors 2901, and there may be a plurality of interfaces 2902.

When the chip is configured to implement a function of the terminal device in embodiments of this disclosure, the interface 2902 is configured to receive quasi co-location QCL indication information, where the QCL indication information indicates that a delay spread of a demodulation reference signal DMRS is associated with delay spreads of N tracking reference signals TRSs, that a Doppler spread of the DMRS is associated with Doppler spreads of the N TRSs, that an average delay of the DMRS is associated with average delays of M TRSs, and that a Doppler shift of the DMRS is associated with Doppler shifts of the M TRSs, N is greater than or equal to 2, and M is greater than or equal to 1.

Optionally, the chip further includes a memory 2903 coupled to the processor 2901. The memory 2903 is configured to store program instructions and data that are necessary for the terminal device.

Optionally, the processor 2901 may be configured to determine the Doppler spread, the delay spread, the average delay, and the Doppler shift of the DMRS based on the QCL indication information.

For other optional implementations, refer to related content in the foregoing method embodiments. Details are not described herein again.

When the chip is configured to implement a function of the network device in embodiments of this application, the processor 2901 is configured to determine quasi co-location QCL indication information, where the QCL indication information indicates that a delay spread of a demodulation reference signal DMRS is associated with delay spreads of N tracking reference signals TRSs, that a Doppler spread of the DMRS is associated with Doppler spreads of the N TRSs, that an average delay of the DMRS is associated with average delays of M TRSs, and that a Doppler shift of the DMRS is associated with Doppler shifts of the M TRSs, N is greater than or equal to 2, and Mis greater than or equal to 1; and the interface 2902 is configured to send the QCL indication information.

For related content of other optional implementations, refer to related content of the foregoing method embodiments. Details are not described herein again.

A person skilled in the art may further understand that various illustrative logical blocks and operations operation that are listed in embodiments of this application may be implemented by using electronic hardware, computer software, or a combination thereof. Whether the functions are implemented by using hardware or software depends on particular applications and a design requirement of the entire system. The person skilled in the art may use various methods to implement the functions for each particular application, but it should not be considered that the implementation goes beyond the protection scope of embodiments of this disclosure.

This disclosure further provides a computer-readable storage medium storing a computer program. When the computer-readable storage medium is executed by a computer, the function in any one of the foregoing method embodiments is implemented.

This disclosure further provides a computer program product. When the computer program product is executed by a computer, the function in any one of the foregoing method embodiments is implemented.

All or some of the foregoing embodiments may be implemented by using software, hardware, firmware, or any combination thereof. When software is used for implementation, embodiments may be implemented completely or partially in a form of a computer program product. The computer program product includes one or more computer instructions. When the computer instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state disk (SSD), or the like.

A person of ordinary skill in the art may understand that "first", "second", and various numbers in this application are merely used for differentiation for ease of description, and are not for limiting the scope of embodiments of this application or representing a sequence.

The correspondences shown in the tables in this application may be configured, or may be predefined. Values of the information in the tables are merely examples, and other values may be configured. This is not limited in this application. When a correspondence between the information and the parameters is configured, not all the correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this disclosure may be understood as "define", "predefine", "store", "pre-store", "pre-negotiate", "pre-configure", "solidify", or "pre-burn".

A person of ordinary skill in the art may be aware that in combination with the examples described in embodiments disclosed in this specification, units and algorithm operations can be implemented by electronic hardware or a combination of computer software and electronic hardware. Whether the functions are performed by hardware or software depends on particular applications and design constraints of the technical solutions. A person skilled in the art may use different methods to implement the described functions for all particular applications, but it should not be considered that the implementation goes beyond the scope of this disclosure.

It may be clearly understood by a person skilled in the art that for the purpose of convenient and brief description, for a detailed working process of the foregoing system, apparatus, and unit, refer to a corresponding process in the foregoing method embodiments. Details are not described herein again.

The foregoing descriptions are merely specific implementations of this disclosure, but the protection scope is not limited thereto. Any variation or replacement readily figured out by a person skilled in the art within the technical scope provided in this disclosure shall fall within the protection scope of the claims.

What is claimed is:

1. A quasi co-location (QCL) indication method applied to coordinated multistation transmission, the method comprising:
receiving, by a communication apparatus, N transmission configuration indication (TCI) states, wherein each TCI state of the N TCI states indicates a QCL configuration information of a demodulation reference signal (DMRS), wherein the QCL configuration information indicates a tracking reference signal (TRS), time-frequency spread information associated with the TRS and delay-frequency offset information associated with the TRS, delay-frequency offset information indicated by QCL configuration information of M TCI states of the N TCI states is applicable to delay-frequency offset information indicated by QCL configuration information of N-M TCI states, N DMRS ports indicated by the N TCI states are the same, N is greater than or equal to 2, and M is greater than or equal to 1; and
determining, by the communication apparatus, based on the N TCI states, QCL information of N DMRS.

2. The method according to claim 1, wherein the time-frequency spread information comprises at least one of a delay spread or a Doppler spread.

3. The method according to claim 1, wherein the delay-frequency offset information comprises at least one of an average delay or a Doppler shift.

4. The method according to claim 1, wherein the QCL relationship comprises at least one of QCL type A, QCL type B, or QCL type C, wherein
QCL type A comprises following parameters: a Doppler shift, a Doppler spread, an average delay, and a delay spread;

QCL type B comprises following parameters: a Doppler shift and a Doppler spread;

QCL type C comprises following parameters: an average delay and a Doppler shift.

5. The method according to claim 1, wherein N=2, M=1.

6. The method according to claim 1, wherein the DMRS is for demodulating a physical downlink shared channel (PDSCH) or a physical downlink control channel (PDCCH).

7. A communication apparatus, applied to coordinated multistation transmission, comprising:

at least one processor; and one or more memories coupled to the at least one processor and storing programming instructions that, when executed by the at least one processor, cause the communications apparatus to:

receive N transmission configuration indication (TCI) states, wherein each TCI state of the N TCI states indicates a QCL configuration information of a demodulation reference signal (DMRS), wherein the QCL configuration information indicates a tracking reference signal (TRS), time-frequency spread information associated with the TRS and delay-frequency offset information associated with the TRS, delay-frequency offset information indicated by QCL configuration information of M TCI states of the N TCI states is applicable to delay-frequency offset information indicated by QCL configuration information of N-M TCI states, N DMRS ports indicated by the N TCI states are the same, N is greater than or equal to 2, and M is greater than or equal to 1; and determine, based on the N TCI states, QCL information of N DMRS.

8. The communication apparatus according to claim 7, wherein the time-frequency spread information comprises at least one of a delay spread or a Doppler spread.

9. The communication apparatus according to claim 7, wherein the delay-frequency offset information comprises at least one of an average delay or a Doppler shift.

10. The communication apparatus according to claim 7, wherein the QCL relationship comprises at least one of QCL type A, QCL type B, or QCL type C, wherein QCL type A comprises following parameters: a Doppler shift, a Doppler spread, an average delay, and a delay spread;

QCL type B comprises following parameters: a Doppler shift and a Doppler spread;

QCL type C comprises following parameters: an average delay and a Doppler shift.

11. The communication apparatus according to claim 7, wherein N=2, M=1.

12. The communication apparatus according to claim 7, wherein the communications apparatus is configured to process the DMRS to demodulate a physical downlink shared channel (PDSCH) or a physical downlink control channel (PDCCH).

13. A non-transitory computer-readable storage medium, configured to store a computer program, wherein when the computer program is run on a computer, the computer is enabled to perform operations comprising:

receiving N transmission configuration indication (TCI) states, wherein each TCI state of the N TCI states indicates a QCL configuration information of a demodulation reference signal (DMRS), wherein the QCL configuration information indicates a tracking reference signal (TRS), time-frequency spread information associated with the TRS and delay-frequency offset information associated with the TRS, delay-frequency offset information indicated by QCL configuration information of M TCI states of the N TCI states is applicable to delay-frequency offset information indicated by QCL configuration information of N-M TCI states, N DMRS ports indicated by the N TCI states are the same, N is greater than or equal to 2, and M is greater than or equal to 1; and determining based on the N TCI states, QCL information of N DMRS.

14. The non-transitory computer-readable storage medium according to claim 13, wherein the time-frequency spread information comprises at least one of a delay spread or a Doppler spread.

15. The non-transitory computer-readable storage medium according to claim 13, wherein the delay-frequency offset information comprises at least one of an average delay or a Doppler shift.

16. The non-transitory computer-readable storage medium according to claim 13, wherein the QCL relationship comprises at least one of QCL type A, QCL type B, or QCL type C, wherein QCL type A comprises following parameters: a Doppler shift, a Doppler spread, an average delay, and a delay spread;

QCL type B comprises following parameters: a Doppler shift and a Doppler spread;

QCL type C comprises following parameters: an average delay and a Doppler shift.

17. The non-transitory computer-readable storage medium according to claim 13, wherein N=2, M=1.

* * * * *